(12) United States Patent  
Dean-Hendricks et al.

(10) Patent No.: US 9,080,784 B2  
(45) Date of Patent: Jul. 14, 2015

(54) HVAC CONTROLLER WITH COMPONENT CHANGE NOTIFICATION

(75) Inventors: Barbara J. Dean-Hendricks, Woodbury, MN (US); Amy Ragland, Brooklyn Center, MN (US)

(73) Assignee: Honeywell International Inc., Morristown, NJ (US)

( * ) Notice: Subject to any disclaimer, the term of this patent is extended or adjusted under 35 U.S.C. 154(b) by 661 days.

(21) Appl. No.: 13/305,357

(22) Filed: Nov. 28, 2011

(65) Prior Publication Data

US 2012/0323374 A1   Dec. 20, 2012

Related U.S. Application Data

(63) Continuation-in-part of application No. 13/164,647, filed on Jun. 20, 2011, now Pat. No. 8,704,672, and a continuation-in-part of application No. 13/164,662, filed on Jun. 20, 2011, now Pat. No. 8,734,565, and a (Continued)

(51) Int. Cl.
   *G08B 21/00*   (2006.01)
   *G08B 5/00*   (2006.01)
   (Continued)

(52) U.S. Cl.
   CPC ........... *F24F 11/0012* (2013.01); *F24F 3/1603* (2013.01); *F24F 11/0086* (2013.01); *G05B 15/00* (2013.01); *F24F 2011/0093* (2013.01)

(58) Field of Classification Search
   CPC .................. G05B 13/02; G05B 15/00; G05B 2219/2642; G05D 23/00; G05D 23/1902; F24F 11/0086; F24F 2011/0064; F24F 3/1603; F24F 11/0012; F24F 2011/0073; F24F 2011/0093; F24D 19/1084

USPC ........... 700/83, 276–278, 275, 286, 295, 296; 236/51, 46 R, 46 C, 46 F; 702/182–185; 340/500, 540, 584, 588, 589, 603, 606, 340/607, 815.4

See application file for complete search history.

(56) References Cited

U.S. PATENT DOCUMENTS 3,071,914 A   1/1963   Gesmar  
3,928,006 A   12/1975   Martineau  
(Continued)

FOREIGN PATENT DOCUMENTS

EP   1143232   10/2001

OTHER PUBLICATIONS

U.S. Appl. No. 13/305,386, filed Nov. 28, 2011.

(Continued)

*Primary Examiner* — Crystal J Barnes-Bullock  
(74) *Attorney, Agent, or Firm* — Seager Tufte & Wickhem LLC.

(57) ABSTRACT

HVAC methods and systems are provided for issuing a component change notification to a user when an air filter or other replaceable component should be changed. In some instances, an HVAC controller may solicit information from a user that is related to one or more features of the replaceable component (e.g. air filter) of the HVAC system. This can include, size, type, model number and/or any other suitable feature, parameter and/or property. In some cases, the time before a component change notification message is issued by the HVAC controller may be dependent on, determined by, and/or adjusted based on the received information. In some instances, the HVAC controller may display at least some of the received information in a subsequently issued component change notification message.

18 Claims, 45 Drawing Sheets

Related U.S. Application Data continuation-in-part of application No. 13/164,674, filed on Jun. 20, 2011, now Pat. No. 8,613,792, and a continuation-in-part of application No. 13/164,682, filed on Jun. 20, 2011, now Pat. No. 8,574,343.

(51) Int. Cl.
- *G05B 15/00* (2006.01)
- *G06F 11/30* (2006.01)
- *G21C 17/00* (2006.01)
- *F24F 11/00* (2006.01)
- *F24F 3/16* (2006.01)

(56) References Cited

U.S. PATENT DOCUMENTS

| | | |
|---|---|---|
| 5,036,698 A | 8/1991 | Conti |
| 5,351,035 A | 9/1994 | Chrisco |
| 5,429,649 A | 7/1995 | Robin |
| 5,668,535 A | 9/1997 | Hendrix et al. |
| 5,679,137 A | 10/1997 | Erdman et al. |
| 5,711,785 A | 1/1998 | Maxwell |
| 5,810,908 A | 9/1998 | Gray et al. |
| 5,840,094 A | 11/1998 | Osendorf et al. |
| 5,862,737 A | 1/1999 | Chin et al. |
| 5,917,141 A | 6/1999 | Naquin, Jr. |
| 6,013,121 A | 1/2000 | Chin et al. |
| 6,190,442 B1 | 2/2001 | Redner |
| 6,321,637 B1 | 11/2001 | Shanks et al. |
| 6,448,896 B1 | 9/2002 | Bankus et al. |
| 6,507,282 B1 | 1/2003 | Sherwood |
| 6,596,059 B1 | 7/2003 | Greist et al. |
| 7,225,054 B2 | 5/2007 | Amundson et al. |
| 7,261,762 B2 | 8/2007 | Kang et al. |
| 7,419,532 B2 | 9/2008 | Sellers et al. |
| 7,421,911 B2 * | 9/2008 | Desrochers et al. ........ 73/863.03 |
| 7,435,278 B2 * | 10/2008 | Terlson ............... 55/495 |
| 7,452,396 B2 * | 11/2008 | Terlson et al. ............. 55/496 |
| 7,594,960 B2 | 9/2009 | Johansson |
| 7,713,339 B2 | 5/2010 | Johansson |
| 8,280,556 B2 * | 10/2012 | Besore et al. ............. 700/278 |
| 8,574,343 B2 * | 11/2013 | Bisson et al. ............. 95/25 |
| 8,613,792 B2 * | 12/2013 | Ragland et al. ............. 95/25 |
| 8,623,117 B2 * | 1/2014 | Zavodny et al. ............. 95/25 |
| 8,704,672 B2 * | 4/2014 | Hoglund et al. ............. 340/607 |
| 2002/0082746 A1 | 6/2002 | Schubring et al. |
| 2003/0070544 A1 | 4/2003 | Mulvaney et al. |
| 2006/0032379 A1 | 2/2006 | Kates |
| 2006/0058924 A1 * | 3/2006 | Shah .................. 700/276 |
| 2007/0013534 A1 | 1/2007 | DiMaggio |
| 2008/0112845 A1 * | 5/2008 | Dunn et al. ............. 422/24 |
| 2009/0140056 A1 | 6/2009 | Leen |
| 2009/0140062 A1 | 6/2009 | Amundson et al. |
| 2009/0143879 A1 | 6/2009 | Amundson et al. |
| 2009/0143880 A1 | 6/2009 | Amundson et al. |
| 2009/0143916 A1 * | 6/2009 | Boll et al. ............. 700/276 |
| 2009/0143918 A1 | 6/2009 | Amundson et al. |
| 2009/0165644 A1 * | 7/2009 | Campbell ............. 95/25 |
| 2010/0084482 A1 | 4/2010 | Kennedy et al. |
| 2011/0061527 A1 | 3/2011 | Sullivan |
| 2011/0185895 A1 * | 8/2011 | Freen ............... 95/25 |
| 2012/0125592 A1 * | 5/2012 | Fadell et al. ............. 165/201 |
| 2013/0261808 A1 * | 10/2013 | Besore et al. ............. 700/278 |

OTHER PUBLICATIONS

U.S. Appl. No. 13/164,543, filed Jun. 20, 2011.
U.S. Appl. No. 13/164,647, filed Jun. 20, 2011.
U.S. Appl. No. 13/164,662, filed Jun. 20, 2011.
U.S. Appl. No. 13/164,668, filed Jun. 20, 2011.
U.S. Appl. No. 13/164,674, filed Jun. 20, 2011.
U.S. Appl. No. 13/164,682, filed Jun. 20, 2011.

* cited by examiner

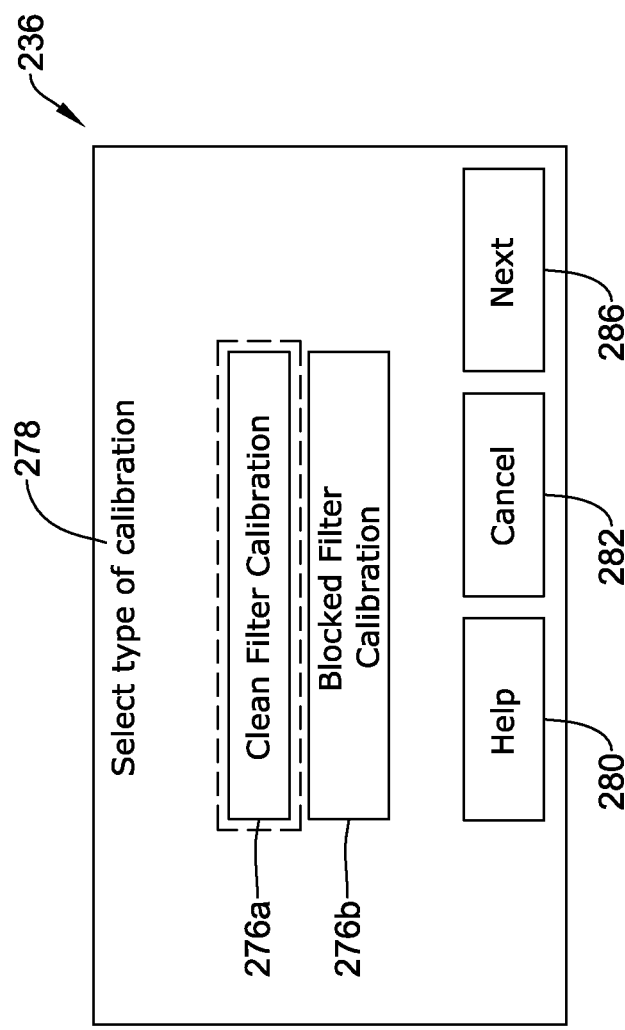

HVAC CONTROLLER WITH COMPONENT CHANGE NOTIFICATION

The present disclosure is a continuation-in-part of U.S. patent application Ser. No. 13/164,647, entitled "Filter Change Alert System For An HVAC System", filed Jun. 20, 2011.

The present disclosure is a continuation-in-part of U.S. patent application Ser. No. 13/164,662, entitled "Methods And Systems Of Verifying a Filter Change In An HVAC System", filed Jun. 20, 2011.

The present disclosure is a continuation-in-part of U.S. patent application Ser. No. 13/164,674, entitled "Methods And System For Setting An Air Filter Change Threshold Value In An HVAC System", filed Jun. 20, 2011.

The present disclosure is a continuation-in-part of U.S. patent application Ser. No. 13/164,682, entitled "Methods And Systems For Setting An Air Filter Change Threshold In An HVAC System Using A Blocking Panel", filed Jun. 20, 2011.

U.S. patent application Ser. No. 13/164,647 is hereby incorporated by reference in its entirety. U.S. patent application Ser. No. 13/164,662 is hereby incorporated by reference in its entirety. U.S. patent application Ser. No. 13/164,674 is hereby incorporated by reference in its entirety. U.S. patent application Ser. No. 13/164,682 is hereby incorporated by reference in its entirety.

TECHNICAL FIELD

This disclosure generally relates to HVAC systems that include an air filter, and more particularly, to methods and systems for monitoring the condition of the air filter and providing an indication of when the air filter should be changed.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. Many HVAC systems, including many forced air HVAC systems, include an air filter to help remove dust and other pollutants from within the building and to protect the HVAC equipment from dust buildup which may negatively impact system performance. The air filter will become dirty over time, and as part of regular maintenance, the air filter should be changed. Continuing to run an HVAC system with an excessively dirty filter can reduce the efficiency of the HVAC system and, in some cases, can cause damage and/or reduce the expected lifetime of some of the HVAC components.

SUMMARY

The present disclosure relates generally to methods and systems for monitoring the condition of an air filter of an HVAC system, and to provide an indication of when the air filter should be changed. While air filters are used here as an example, it is contemplated that the same principles can be applied to any replaceable component of an HVAC system, such as humidifier pads, UV lamps, etc.

In one illustrative example, a method and system is provided for monitoring the status of an air filter of an HVAC system and displaying information related to the monitored air filter. In some cases, the HVAC system may have a number of controllable HVAC components, and the HVAC system may be operated in a normal operating mode to control a temperature in the building. Occasionally (e.g. periodically, intermittently, from time-to-time, and/or when instructed to by a user), however, the HVAC system may enter an air filter monitoring mode. While the HVAC system is in the air filter monitoring mode, a measure related to an amount of flow restriction presented by the air filter may be received, and a current status of the air filter may be determined based at least in part on the received measure related to the amount of flow restriction presented by the air filter. The measure related to an amount of flow restriction presented by the air filter may include, for example, a differential pressure across the air filter, a flow rate of air passing through the air filter, a temperature measured at an output of a heat exchanger of the HVAC system, a temperature change parameter across a heat exchanger of the HVAC system, or any other suitable measure, as desired. In some instances, the determined status of the air filter may be displayed on a display. In some cases, the status of the air filter may be estimated by merely tracking how long the air filter has been in service.

An illustrative HVAC controller may include a controller, a memory coupled to the controller, and a user interface having a display, the user interface being coupled to the controller. The controller may be configured to display one or more screens of a sequence of screens on the display to interact with a user of an HVAC controller. In some cases, the displayed one or more screens may solicit the user for information related to one or more features of one or more replaceable components (e.g., air filters) of an HVAC system, and accept a response to the solicitation(s) from the user. In some cases, the controller may be configured to adjust an air filter change notification indicator setting based on the user response to the solicitation for information related to the one or more features of the one or more replaceable components. The one or more features of the one or more air filters may include, but is not limited to, a total number of air filters in the HVAC system, a depth of the one or more air filters, a height of one of the one or more air filters, a width of one of one or more air filters, a Minimum Efficiency Reporting Value ("MERV") rating of one of one or more air filters, a model number of one of one or more air filters, a brand name of one of one or more air filters, and/or any other suitable parameters related to the air filters, as desired.

In some instances, the controller may be configured to display at least some of the entered information related to the one or more features of the air filters on or about an air filter change notification screen or message after an air filter change threshold has been surpassed. Illustratively, if a timer has expired and/or any other air filter change threshold value has been surpassed (e.g., a differential pressure threshold value across an air filter in the HVAC system, an intermediate timer threshold, etc.), the air filter change notification may display information related to the one or more features of the one or more air filters.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various embodiments in connection with the accompanying drawings, in which:

FIGS. 11A-11J provide illustrative examples of different screens that may be displayed by an HVAC controller following exemplary methods of calibrating an HVAC system filter monitor;

Figure 1:
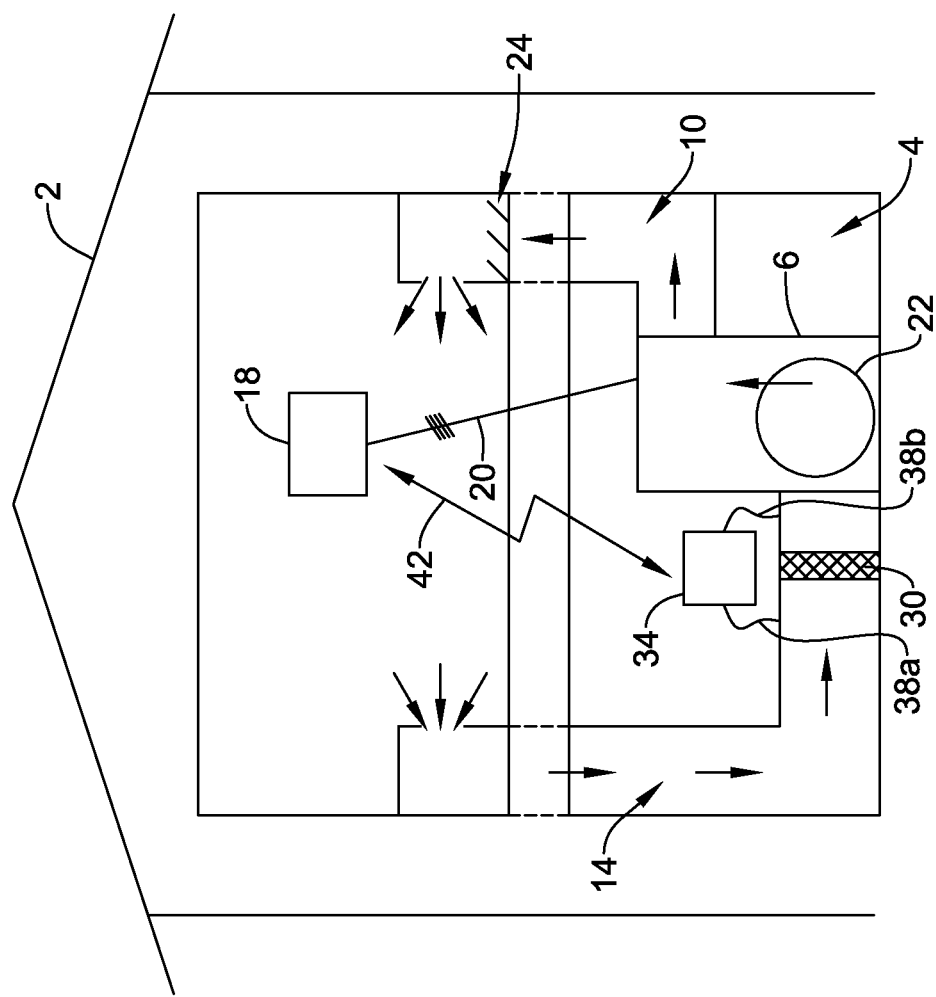
FIG. 1 is a schematic view of an illustrative HVAC system located within a building or structure.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative of the claimed disclosure.

For convenience, the present disclosure may be described using relative terms including, for example, left, right, top, bottom, front, back, upper, lower, up, and down, as well as others. It is to be understood that these terms are merely used for illustrative purposes and are not meant to be limiting in any manner.

FIG. 1 is a schematic view of a building or other structure 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, or any other suitable type of HVAC system, as desired. The HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, and/or the like.

It is contemplated that the HVAC controller(s) 18 may be configured to control the comfort level in the building or structure by activating and deactivating the HVAC component(s) 6. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. In some embodiments, the one or more HVAC controllers 18 may include multiple zone controllers, each monitoring and/or controlling the comfort level within a particular zone in the building or other structure. An illustrative HVAC controller, which is not meant to be limiting in any way, is disclosed in: US Published Patent Application No. 20090140062, entitled "HVAC CONTROLLER THAT SELECTIVELY REPLACES OPERATING INFORMATION ON A DISPLAY WITH SYSTEM STATUS INFORMATION"; US Published Application No. 20090143880, entitled "HVAC CONTROLLER WITH CONTEXT SENSITIVE HELP SCREENS"; US Published Application No. 20090143918, entitled "METHOD AND APPARATUS FOR CONFIGURING AN HVAC CONTROLLER"; US Published Application No. 20090143916, entitled "HVAC CONTROLLER HAVING A PARAMETER ADJUSTMENT ELEMENT WITH A QUALITATIVE INDICATOR"; US Published Application No. 20090143879, entitled "HVAC CONTROLLER WITH PARAMETER CLUSTERING"; US Published Application No. 20090140056, entitled "HVAC CONTROLLER WITH QUICK SELECT FEATURE," the entireties of which are incorporated herein by reference for all purposes.

In the illustrative HVAC system 4 shown in FIG. 1, the HVAC component(s) 6 may provide heated air (and/or cooled air) via the ductwork throughout the building or other structure 2. As illustrated, the HVAC component(s) 6 may be in fluid communication with every room and/or zone in the building or other structure 2 via the ductwork 10 and 14. In operation, when a heat call signal is provided by the HVAC controller(s) 18, an HVAC component 6 (e.g., forced warm air furnace) may be activated to supply heated air to one or more rooms and/or zones within the building or other structure 2 via supply air ducts 10. The heated air may be forced through supply air duct 10 by a blower or fan 22. In this example, the cooler air from each zone may be returned to the HVAC component 6 (e.g., forced warm air furnace) for heating via return air ducts 14. Similarly, when a cool call signal is provided by the HVAC controller(s) 18, an HVAC component 6 (e.g., air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g., air conditioning unit) for cooling via return air ducts 14.

In some cases, the system of vents or ductwork 10 and/or 14 can include one or more dampers 24 to regulate the flow of air. For example, one or more dampers 24 may be coupled to one or more of the HVAC controllers 18 and can be coordinated with the operation of one or more HVAC components 6. The one or more HVAC controllers 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receive(s) conditioned air from the HVAC components 6.

In many instances, one or more replaceable components such as one or more air filters 30 may be used to remove dust and other pollutants from the air inside the building or other structure 2. In the illustrative example shown in FIG. 1, the air filter(s) 30 is installed in the return air duct 14 to filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

The air filter 30 may restrict the air flow within the HVAC system 4. The level of restriction may be characterized by, for example, a differential pressure drop across the air filter 30, a static pressure on one or both sides of the air filter, an air flow through the air filter, a current draw by the fan or blower 22 at a given fan speed, etc. The differential pressure drop across a new, clean air filter 30 may be low, but may increase as the air filter 30 progresses from a clean air filter condition to a dirty air filter condition and catches dust and other particulate matter during the operation of the HVAC system 4. After a period of time, the differential pressure drop across the air filter may become significantly higher and replacement of the air filter 30 may be required to avoid potential damage to the HVAC system 4 and its various components.

The rate at which the air filter 30 may become dirty and needs replacement is often dependent on a variety of factors, some of which include the ductwork characteristics, equipment specifications, age and/or condition of the HVAC component(s) 6, the duty cycle of the HVAC component(s) 6, the type of filter, elapsed time, among others. One approach is to replace the air filter 30 on a regular basis (e.g. every three months). However, this may lead to excessive cost due to more frequent air filter replacement than needed, or may lead to a decrease in the efficiency and/or expected lifetime of the HVAC component(s) 6 in the case of less frequent replacements than needed.

In some cases, and as shown in FIG. 1, the illustrative HVAC system 4 may include an air filter monitor 34. The air filter monitor 34 may be configured to measure or detect a change in a given parameter that is related to the amount of flow restriction presented by the air filter 30, such as a static pressure or differential pressure drop across the air filter 30, an air flow through the air filter 30, the amount of current drawn by the fan or blower 22 at a given fan speed, etc. In some cases, the air filter monitor 34 may include a differential pressure sensor including a first pressure tap 38a located in the return (incoming) air duct 14 and a second pressure tap 38b located in the supply (outgoing) air duct 10. In some cases, the pressure tap 38a may be located outside the return air duct 14 and may reference the ambient or atmospheric pressure. In some cases, the air filter monitor 34 may include a flow sensor that is capable of providing a measure that is related to the amount of air flow restriction through the air filter 30. For example, the air filter monitor 34 may be adapted to measure a flow rate, pressure, or a combination of flow rate and pressure through the air filter 30. These are just some examples.

The air filter monitor 34 may be configured to communicate with the HVAC controller 18 via, for example, a wired or wireless communication link 42. The air filter monitor 34 may communicate, relay or otherwise transmit data regarding the selected parameter related to the amount of flow restriction presented by the air filter 30 to the HVAC controller 18. The HVAC controller 18 may use the data from the air filter monitor 34 to evaluate the filter status. In some cases, the HVAC controller 18 may be configured to display information regarding the status of the air filter 30 to a user, based on data received from the air filter monitor 34. Also, and in some cases, the HVAC controller 18 may be configured to indicate to the user when a filter change may be necessary or desired.

Figure 2:
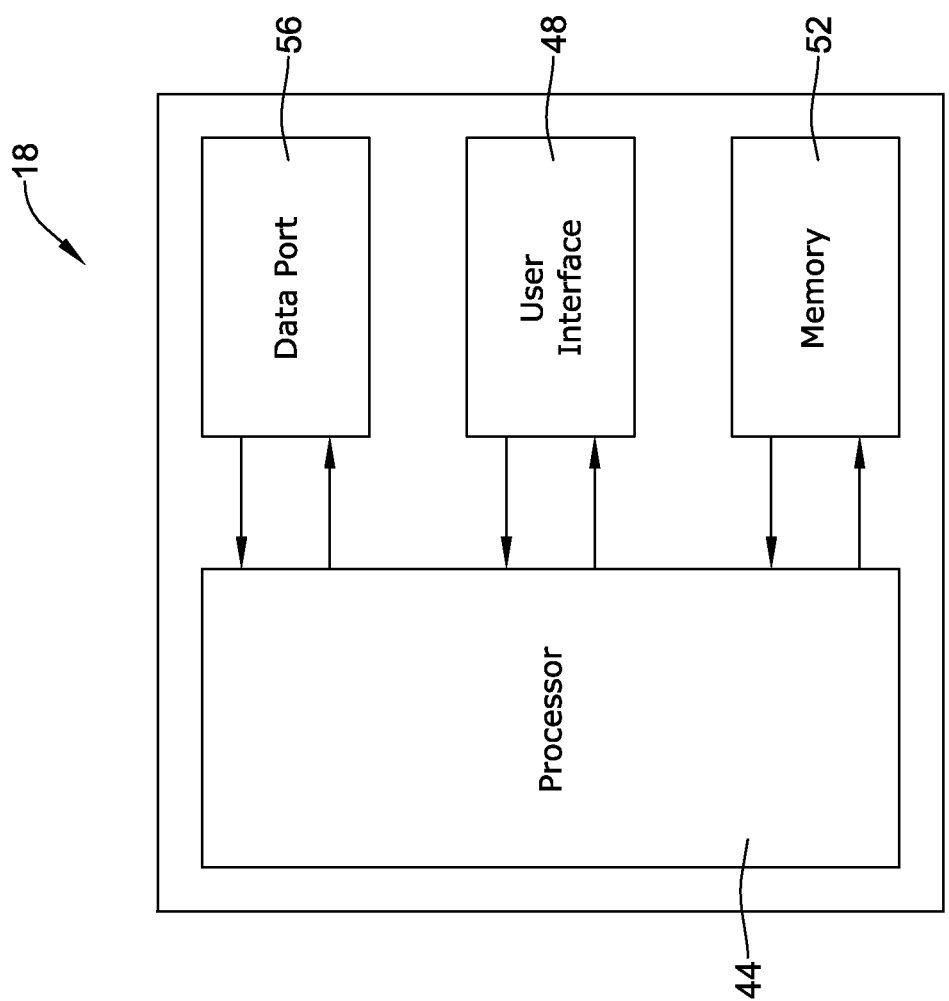
FIG. 2 is a schematic view of an illustrative HVAC controller.

FIG. 2 is a schematic view of an illustrative HVAC controller 18. Illustratively, HVAC controller 18 may be configured to issue one or more control signals to HVAC system 4, such that the one or more control signals may place one or more components of the HVAC system 4 into one of one or more operating states (e.g. fan only mode; heat mode, with first stage active; heat mode, with first and second stages active and humidifier on; cool mode, with first stage active; etc.). In some instances, for example, HVAC controller 18 may be a thermostat, but this is not required. In the illustrative embodiment of FIG. 2, HVAC controller 18 includes a controller/processor (e.g., microprocessor, microcontroller, etc.) 44 and a user interface 48. The processor 44 may be adapted to operate in accordance with an algorithm that controls or at least partially controls one or more HVAC components 6 of an HVAC system such as, for example, HVAC system 4 shown in FIG. 1. The processor 44 may, for example, operate in accordance with an algorithm that provides temperature set points, starting and/or ending times, and the like. In some cases, HVAC controller 18 may include a timer (not shown). The timer may be integral to the processor 44 or may be provided as a separate component.

In the illustrative embodiment, user interface 48 may be any suitable interface that permits controller 18 to display and/or solicit information as well as permit a user to enter data such as temperature set points, humidity set points, starting times, ending times, HVAC component measurements and metrics (e.g., filter sizes, filter model numbers, filter Minimum Efficiency Reporting Value (MERV) ratings, etc.), parameters relating to user habits, other parameters and the like. In some cases, user interface 48 may include a display 62 (see FIG. 3) and in some cases a distinct keypad. Display 62 may be any suitable display. In some instances, a display 62 may include or may be a liquid crystal display (LCD). If desired, user interface 48 may be a touch screen LCD panel that functions as both display and keypad. In some instances, a touch screen LCD panel may be adapted to solicit information and/or values for a number of operating parameters or other parameters and/or to receive and/or accept said information and/or values, but this is not required.

The illustrative HVAC controller 18 includes a memory block 52 that may be considered as being electrically connected to processor 44. Memory block 52 may be used to store any desired information, such as the aforementioned control algorithm, set points, differential pressure limits, and the like. Processor 44 may store information within memory block 52 and may subsequently retrieve the stored information. Memory block 52 may be any suitable type of storage device including, but not limited to, RAM, ROM, EPROM, flash memory, a hard drive, and the like.

In some cases, as illustrated, HVAC controller 18 may include a data port 56. Data port 56 may be configured to communicate with processor 44 and may, if desired, be used to either upload information to processor 44 or to download information from processor 44. Information that can be uploaded or downloaded may include values of operating parameters. In some instances, data port 56 may be used to upload a previously-created thermostat configuration into HVAC controller 18, thereby hastening the programming process. In some cases, data port 56 may be used to download a thermostat configuration that has been created using HVAC controller 18, so that the thermostat configuration may be used in other thermostats. In some cases, data port 56 may be used to upload and/or download information pertaining to an HVAC dealer or contractor. In some cases, data port 56 may be a wireless port such as a Bluetooth™ port or any other wireless protocol. In other cases, data port 56 may be a wired port such as a serial port, a parallel port, a CAT5 port, a USB (universal serial bus) port, or the like. In some instances, data port 56 may be a USB port and may be used to download and/or upload information from a USB flash drive. Other storage devices may also be employed, as desired.

Figure 3:
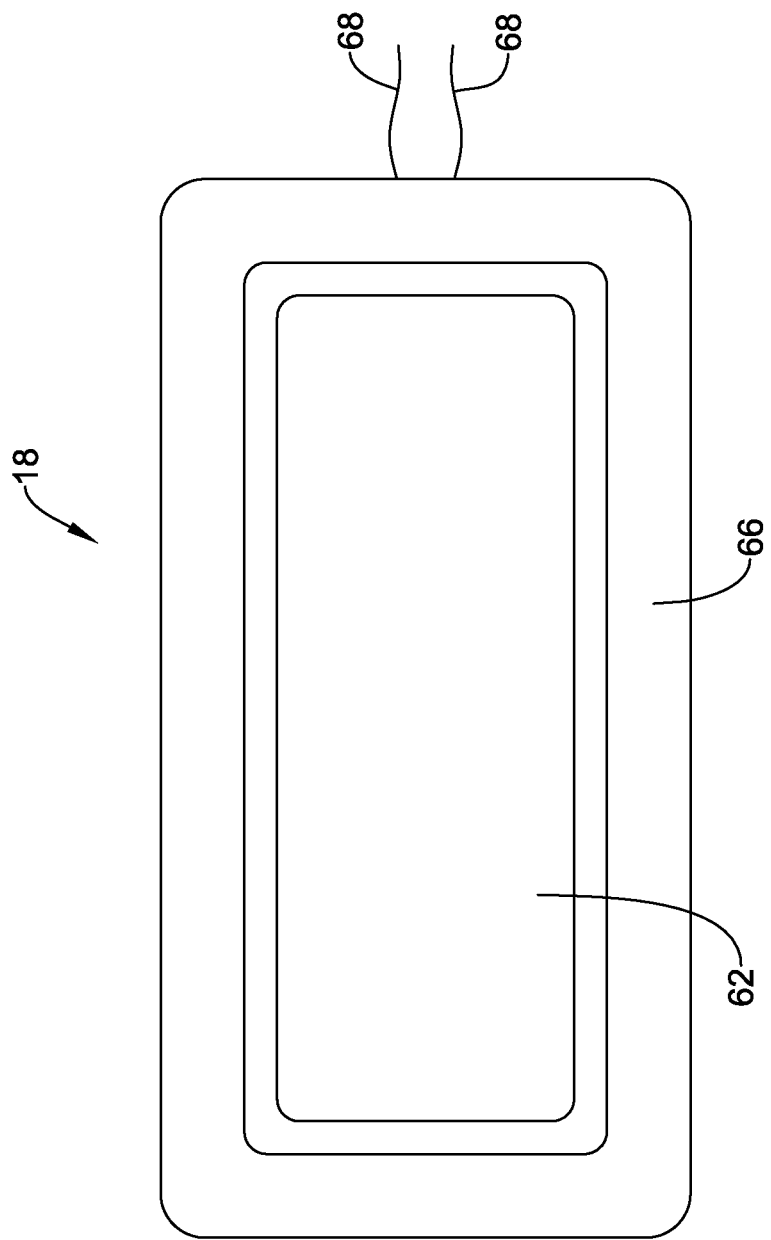
FIG. 3 is a front view of an illustrative HVAC controller.

FIG. 3 is a front view of HVAC controller 18 according to an illustrative embodiment. As depicted in FIG. 3, HVAC controller 18 may include a display 62 that is disposed within a housing 66. In some cases, display 62 may be a touch screen LCD display. If desired, display 62 may be a dot matrix touch screen LCD display. A dot matrix touch screen LCD display is a touch screen LCD that permits images such as letters, numbers, graphics, and the like to be displayed anywhere on the LCD, rather than being confined to predetermined locations such as is the case with a fixed segment LCD. Housing 66 may be formed of any suitable material, such as a polymeric material. In some cases, the housing 66 may be formed such that it defines data port 56 (FIG. 2). The housing 66 may also include suitable wiring and/or other electrical connections 68 such that the controller 18 may be electrically coupled to the building 2 and/or HVAC system 4.

Figure 4:
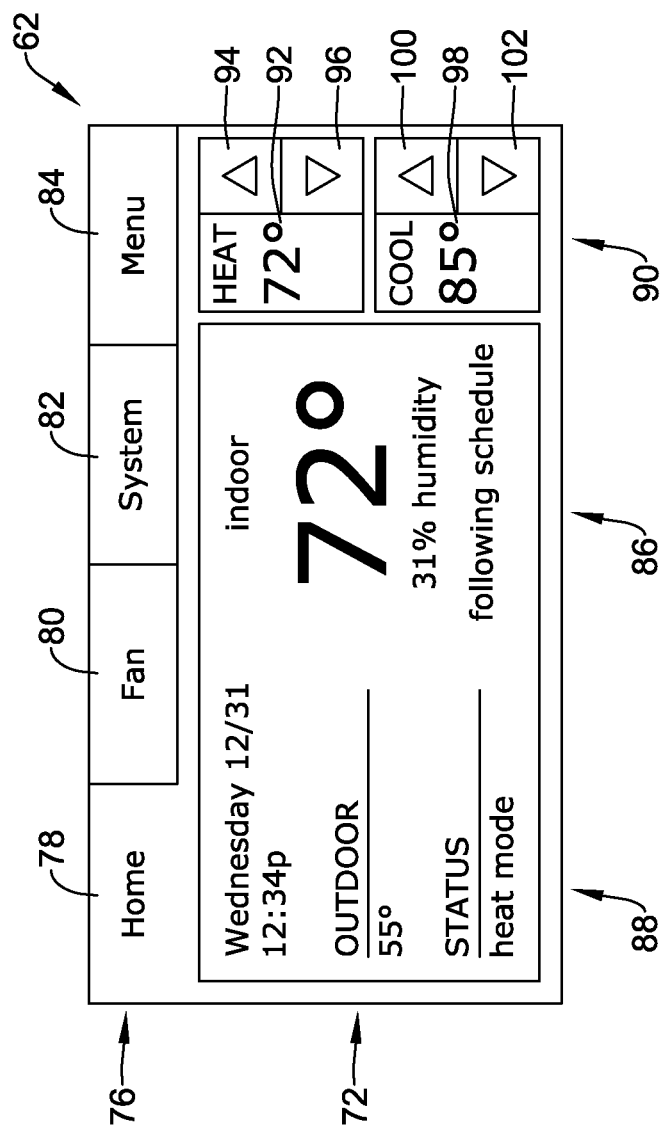
FIGS. 4-7 provide illustrative examples of various home screens that may be displayed upon the HVAC controllers of FIGS. 2 and 3.

In some cases, HVAC controller 18 may be configured to provide substantial display and/or programming functionality, but this is not required. For example, HVAC controller 18 may include one or more setup wizards for configuring and/or programming operations and features of HVAC system 4, such as configuring a calibration of an air filter monitor 34, programming metrics of air filters 30, and/or the like. In some cases, HVAC controller 18 may be configured to display a default display, also referred to herein as a home screen that is displayed by HVAC controller 18 when no other data entry is underway. FIG. 4 provides an example of a home screen 72 that may be displayed by HVAC controller 18. In some cases, home screens may include screens that can be accessed by a top level navigational menu. A home screen may, if desired, display one or more parameters relating to environmental conditions such as indoor and/or outdoor temperature and/or humidity, expected weather conditions, and/or the status of any equipment that is at least partially controlled by HVAC controller 18.

As shown in FIG. 4, the display 62 may display an illustrative home screen 72 that includes a navigational bar 76. Navigational bar 76 may be considered as providing top level navigation, but this is not required. In some cases, if desired, navigational bar 76 may include one or more of a HOME button 78, a FAN button 80, a SYSTEM button 82 and/or a MENU button 84. FIG. 4 is an example of a screen that may be displayed after a user has pushed HOME button 78.

In some cases, home screen 72 may be considered as having two or more regions. For example, home screen 72 may include a first region 86 and a second region 88. In some instances, first region 86 may be considered as displaying or otherwise providing primary information while second region 88 may be considered as displaying or otherwise providing secondary information. In some cases, primary information may be information that is considered to be more important, more interesting and/or more useful than secondary information. To illustrate, first region 86 may display one or more of a current temperature reading, a current indoor humidity, a schedule status, and the like. Second region 88 may display one or more of a date and time, an outdoor temperature reading, an outdoor humidity reading, an equipment status, and the like.

Home screen 72 may also include a third region 90 that may be used for displaying and/or adjusting a parameter value such as a parameter that is displayed within first region 86 of home screen 72. In some cases, for example, third region 90 may, as illustrated, display both a heating temperature set point and a cooling temperature set point, but this is not required. Third region 90 may include a first parameter 92, a first up arrow 94 and a first down arrow 96. Third region 90 may include a second parameter 98, a second up arrow 100 and a second down arrow 102. First parameter 92 may be adjusted up or down using first up arrow 94 and/or first down arrow 96, as appropriate. Second parameter 98 may be adjusted up or down using second up arrow 100 and/or second down arrow 102, as desired.

Figure 5:
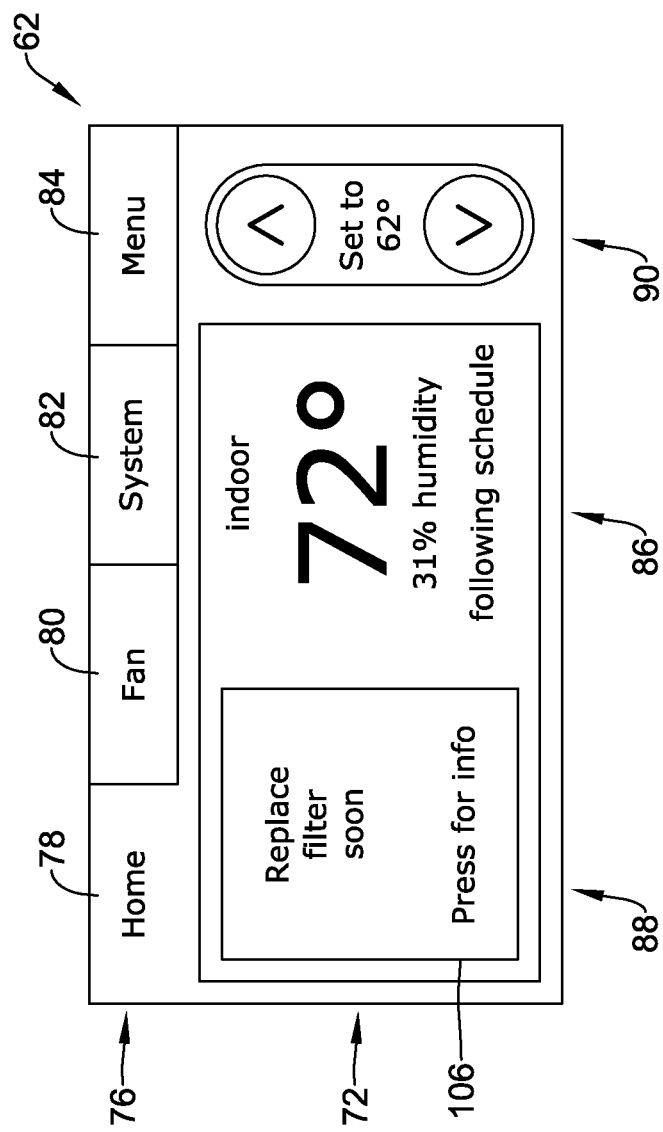
Figure 6:
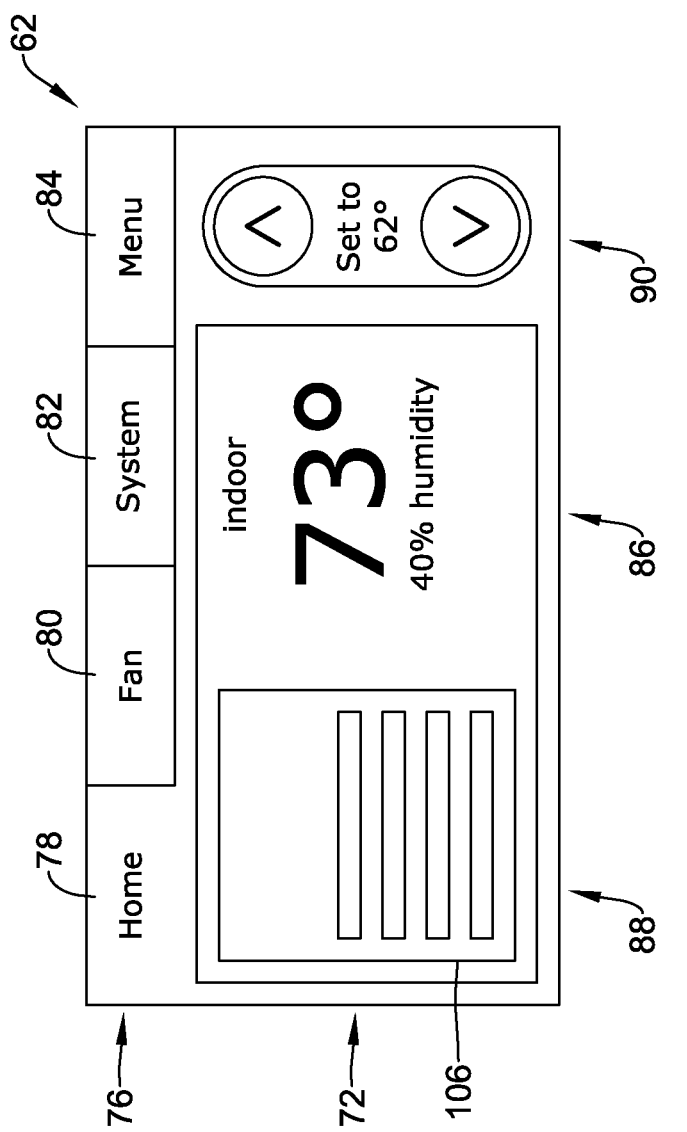

In some cases, home screen 72 may be configured to display information regarding the status of the air filter 30 (FIG. 1) of the HVAC system 4, and/or may be configured to indicate to a user when a filter change may be necessary or desired. For example, in FIGS. 5 and 6, information regarding the filter status may be displayed in the second region 88 of the home screen 72, but this is not required. In some cases, a filter status indicator 106 may be displayed in place of the information previously displayed in that second region 88 or the filter status indicator 106 may overlay the information that was previously displayed in the second region 88 of the home screen 72. In some cases, the filter status indicator 106 may be configured to display quantitative terms relating to the current status and/or metrics of the air filter 30 and other HVAC system components and/or qualitative terms indicative of the current status of the air filter 30. As illustrated in FIG. 5, exemplary qualitative terms that may be used to indicate the status of the air filter may include, but are not limited to, "CLEAN", "GOOD", "DIRTY", "CHANGE FILTER SOON", "REPLACE FILTER SOON" "CHANGE AIR FILTER NEEDED", "REPLACE AIR FILTER NOW" and "FILTER CHANGE REQUIRED", among others. In other cases, as illustrated in FIG. 6, the filter status indicator 106 may be configured to display a graphical representation indicating the current status of the air filter 30. For example, a maximum number of bars displayed on a graph may represent that the status of the air filter 30 is good, while only a few bars displayed on a graph may indicate that a filter change is needed soon. A single bar or no bar at all displayed on a graph may represent that a filter change is need. In still other cases, as will be described in more detail below, the filter status indicator 106 may be color coded or may employ color-coded labels or indicators. In some cases, the filter status indicator 106 may be configured to produce an audible signal (e.g., intermittent beeps) that may indicate that a filter change is needed or desired.

Figure 7:
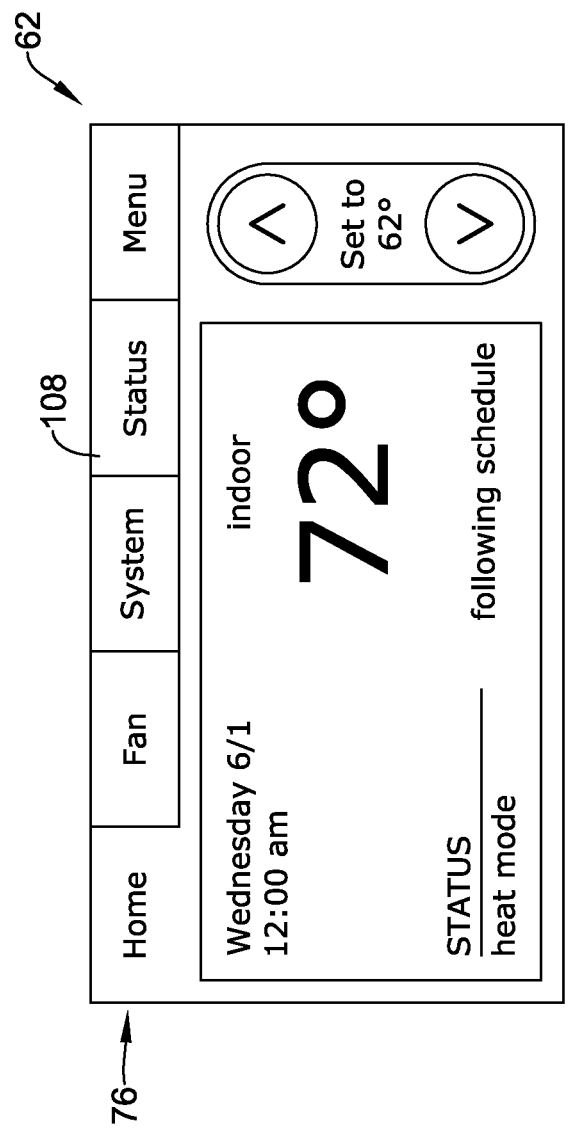

In some instances, information regarding the filter status may be accessed by selecting the appropriate button, icon or tab provided, for example, along the navigational bar 76. For example, as shown in FIG. 7, the user may access information regarding the filter status by selecting STATUS button 108 provided along the navigational bar 76. Pressing the STATUS button 108 may result in a status screen 112 being displayed on the display 62 (FIG. 3). The status screen 112 may be configured to display information regarding the filter status.

Figure 8:
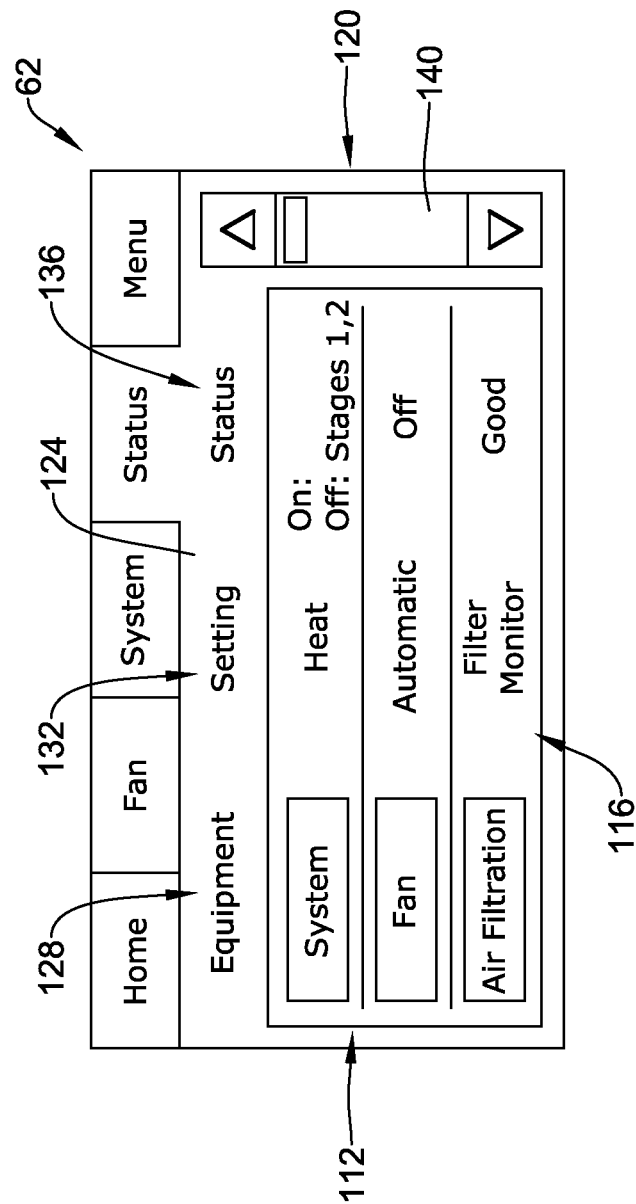
FIGS. 8-9 provide illustrative examples of various screens that may be displayed by an HVAC controller showing a status of one or more components of the HVAC system.
Figure 9:
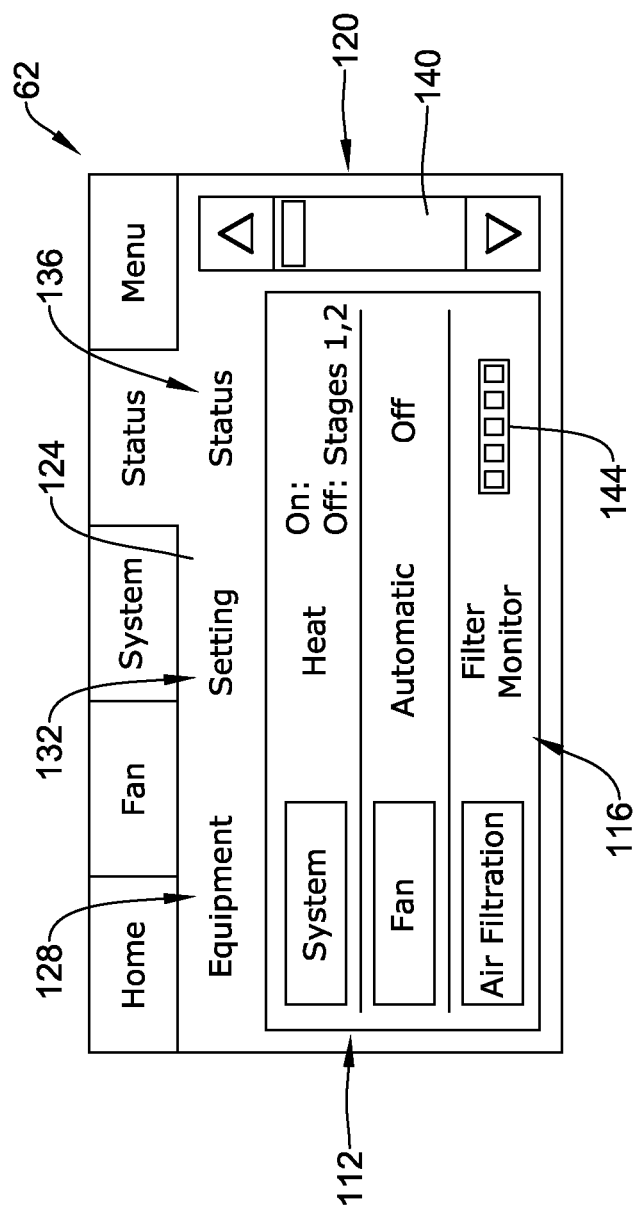

In some cases, as illustrated in FIGS. 8 and 9, the status screen 112 also may be configured to display information regarding other HVAC system components. In some examples, the status screen 112 may include a first region 116 and a second region 120. The first region 116 may be configured to display a table 124 that contains select information regarding various system components of the HVAC system. Depending upon how much information the table 124 is configured to contain, the table 124 may be a scrollable table, but this is not required. In some cases, the table 124 may include at least one column and one row of information. For example, different system components are listed in a first column 128 labeled "EQUIPMENT." The second column 132 labeled "SETTING" may provide the current setting for a select piece of equipment listed in the first column 128. The third column 136 labeled "STATUS" may provide the current status for a select piece of equipment listed in the first column. The table 124 can be configured to contain a different number of columns and row containing information about the HVAC system as desired. The second region 120 may include a scroll bar or sliding bar 140 that permits the user to move up and/or down within the table 124 to view select information regarding the system. For example, a system user may manipulate the sliding bar 140 up or down until information regarding the air filter is displayed.

In some cases, the table 124 may be configured to display qualitative information regarding the air filter 30. The identifier or label "AIR FILTRATION" or "AIR FILTER" may appear in the table 124 in the first column 128 labeled "EQUIPMENT". This may indicate to the user that information pertaining to the air filter 30 appears in this row. Next, in the second column 132 labeled "SETTING", information regarding the current setting pertaining to the air filter 30 may be displayed.

In some cases, as shown in FIG. 8, the table 124 may be configured to display qualitative terms in the third column 136 indicative of the current status of the air filter 30, such as a change component notification (e.g., an air filter change notification) status indicator or any other similar or dissimilar status indicator. Exemplary qualitative terms that may be used to indicate the status of the air filter include, but are not limited to, "CLEAN", "GOOD", "DIRTY", "CHANGE FILTER SOON", "REPLACE FILTER SOON" "CHANGE FILTER NEEDED", "REPLACE FILTER NOW" and "FILTER CHANGE REQUIRED", among others. In other cases, as illustrated by the example provided in FIG. 9, a graphical representation 144 indicating the current status of the air filter 30 may be displayed. For example, a maximum number of bars displayed on a graph may represent that the air filter 30 is clean, while only a few bars displayed on a graph may indicate that a filter change is needed soon. A single bar or no bar at all displayed on a graph may represent that a filter change is needed. In still other cases, color-coded labels or indicators may be used to indicate if a filter change is needed. In some cases, table 124 may be configured to display quantitative and/or qualitative information relating to one or more metrics of the air filter 30. For example, table 124 may display the brand of air filters 30, the size of air filters 30, the MERV ratings of air filters 30, the model number of air filters 30 and/or other characteristics and/or metrics of air filters 30.

To help the HVAC controller 18 display relatively accurate information regarding the current status of the air filter 30, the air filter monitor 34 may be calibrated and/or the controller 18 may be configured to receive air filter 30 specific information. In some cases, for example, controller 18 may be configured to provide a guided programming routine or setup wizard for receiving information particular to air filter 30, and/or for configuring an air filter change notification feature of HVAC controller 18, where the air filter change notification is triggered when one or more air filters 30 of HVAC system 4 is to be changed. Illustratively, such a guided programming routine or setup wizard may be configured to query and accept information and/or metrics related to one or more air filters 30 including, but not limited to, a number of air filters 30 in the HVAC system, a depth, a height and/or a width of the one or more air filters 30, a MERV rating of the one or more air filters 30, a model number of the one or more air filters 30, and/or any other feature(s), characteristic or metric related to the one or more air filters 30, as desired.

Figure 19:
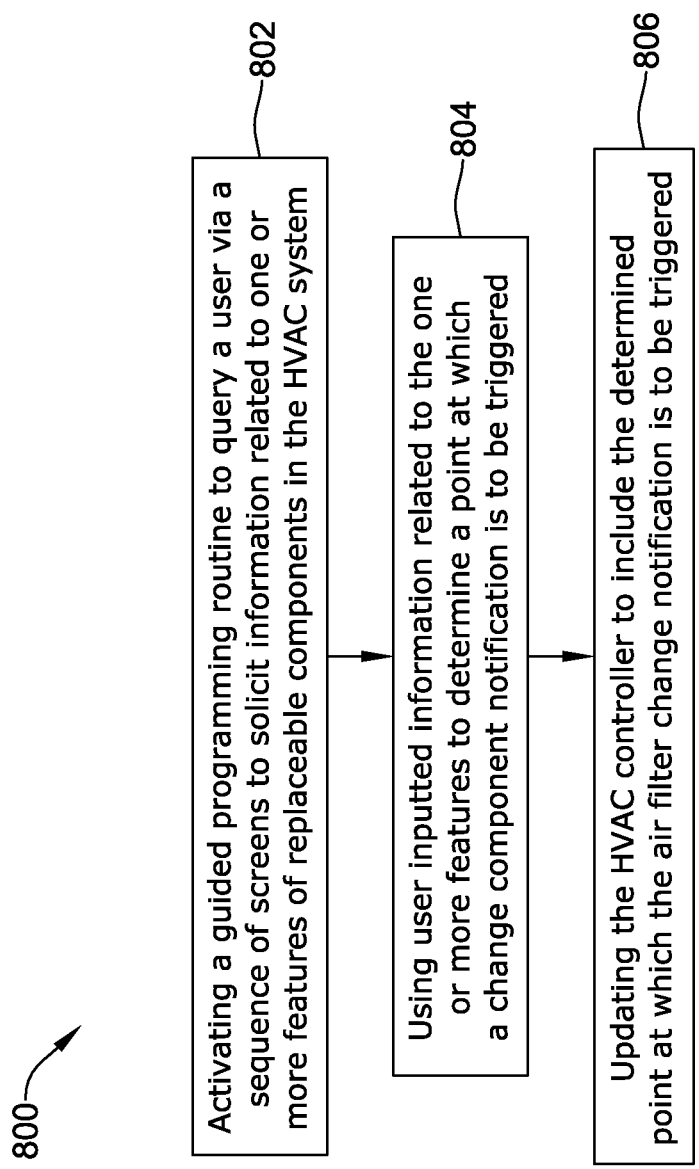
FIG. 19 is a flow chart of an example method of determining and adjusting a point at point at which it is desirable to replace an air filter.

FIG. 19 is a flow chart of a method 800 for entering air filter 30 information using an illustrative guided programming routine or setup wizard. The illustrative method 800 may include activating the guided programming routine or setup wizard programmed in controller 18, where the guided programming routine may be activated via a menu or screen of the controller 18. Once activated, the guided programming routine may provide and display on display 62 one or more queries to a user via a sequence of screens, where one or more of the queries may solicit information related to one or more features of the one or more replaceable components (e.g., air filters 30) of the HVAC system 4 (block 802) and/or information related to one or more features of other components of HVAC system 4. Illustratively, the presented queries may directly or indirectly solicit information related to, but not limited to, the number of the one or more air filters 30 in HVAC system 4, a depth of the one or more air filters 30, a width of the one or more air filters 30 and a height of the one or more air filters 30, and/or other metrics or characteristics of the one or more air filters 30.

In some instances, a user may interact with the guided programming routine or setup wizard. For example, a user may enter air filter 30 related information by pressing a touch screen display 62 and/or typing the information into controller 18 via a keyboard, and/or speaking the information, where the controller 18 may be configured to use voice recognition techniques to record the information, etc. Once a user has inputted at least some information in response to the one or more queries provided by the guided programming routine or setup wizard, controller 18 may use the user inputted information to calculate and/or adjust a point or time (e.g., a time may be a specific time and/or a threshold value, which once surpassed indicates a time at which an air filter notification is to be triggered (block 804). Once the point or time has been calculated, the point or time may be updated in controller 18 and saved (block 806).

Figure 20A:
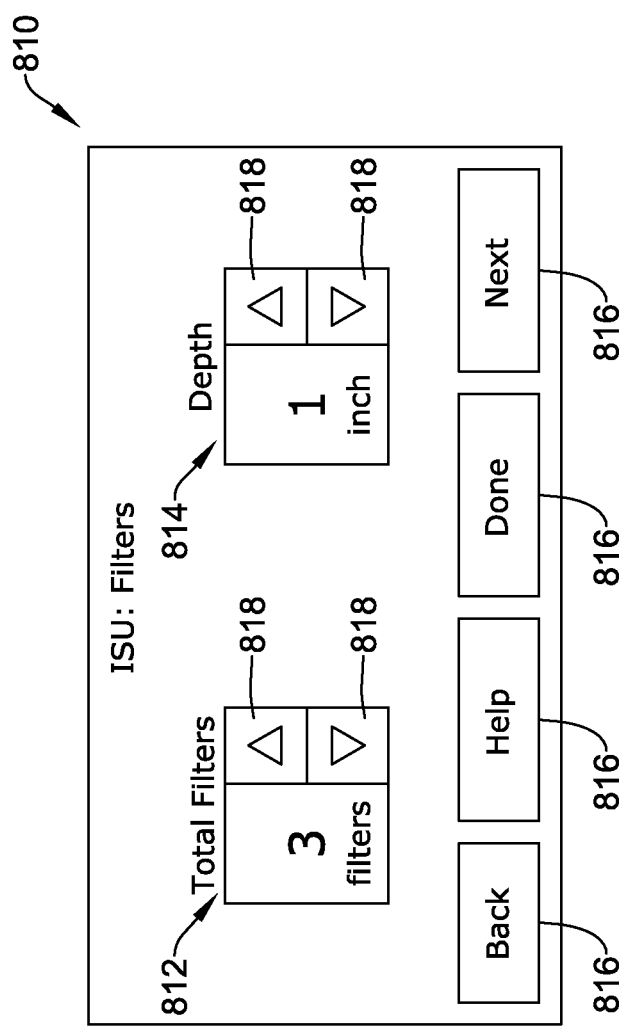
FIGS. 20A and 20B provide illustrative examples of different screens that may be displayed by an HVAC controller that is configured to solicit input of air filter metrics from a user.

Illustratively, the guided programming routine or the setup wizard may be activated through navigating a menu and/or installer options sequence of screens until arriving at one or more screens of a sequence of screens displaying a query soliciting a user for information related to one or more features of the one or more air filters 30 of the HVAC system 4. For example, as seen in FIG. 20A, a first screen 810 soliciting a user for information related to the one or more air filters 30 may be depicted on display 62 of user interface 48. Illustrative first screen 810 has at least a first area 812 soliciting air filter 30 related information from a user (e.g., a total number of filters 30 in HVAC system 4, which may include up to 4 air filters 30 or more), and a second area 814 soliciting other air filter 30 related information (e.g., a depth of the one or more air filters 30 of HVAC system 4, which may include a depth in the range of one (1) to six (6) inches or a different range including, but not limited to, greater than zero (>0) to ten (10) inches, one (1) to ten (10) inches, greater than one (1) inch). First area 812 and second area 814 of screen 810 may allow a user to directly input quantitative information into the respective areas, and screen 810 may include arrows 818 and/or a scroll bar (not shown) to help easily adjust the quantitative information in areas 812, 814. In some cases, screen 810 may further include navigational buttons 816, which may include a BACK button for returning to a previous screen, a HELP button for receiving more information concerning the use of screen 810, a DONE button for indicating the user is done with screen 810 and/or done inputting information related to the one or more air filters 30, and a NEXT button for moving onto a next screen of a sequence of screens, and indicating to controller 18 to accept the user response and air filter information.

Figure 20B:
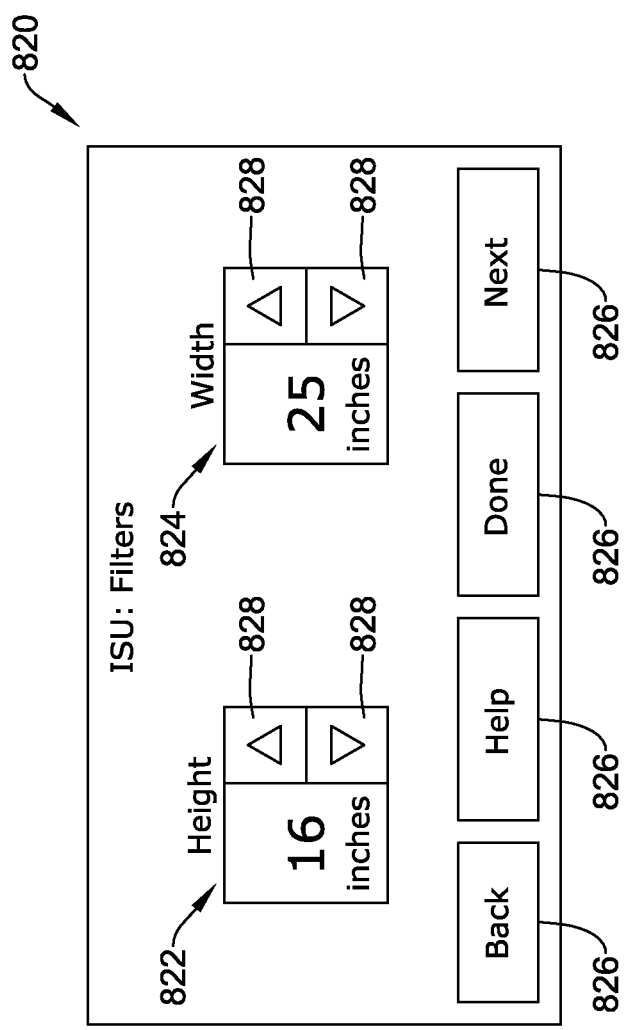

A next, second or subsequent screen 820 of an illustrative sequence of screens may solicit further information related to the one or more air filters 30 in HVAC system 4. For example, screen 820 may include at least a first area 822 soliciting air filter 30 related information (e.g., a height of an air filter 30, as seen in FIG. 20B) and a second area 824 soliciting other air filter 30 related information (e.g., a width of an air filter 30, as also seen in FIG. 20B). First area 822 and second area 824 of screen 820 may aid a user in directly inputting quantitative information into the respective areas, and screen 820 may include arrows 828 and/or a scroll bar to help the user easily adjust the quantitative information in areas 822, 824. Screen 820 may further include navigational buttons 826, which may include a BACK button for returning to a previous screen, a HELP button for receiving more information concerning screen 820, a DONE button for indicating the user is done with screen 820 and/or is done inputting information related to the one or more air filters 30, and a NEXT button for moving onto a next screen and indicating to controller 18 to accept the user response and air filter information. It is contemplated that the guided programming routine and/or setup wizard may include a screen 820 or a similar screen for each of the one or more air filters 30 of HVAC system 4 and/or information particular to each air filter 30 may be inputted on a single screen, if desired.

In addition to the information solicited in screens 810, 820, the guided programming routine may include further screens soliciting further information related to air filters 30. For example, the guided programming routine may solicit information related to MERV ratings of the one or more air filters 30, model numbers of the one or more air filters, brand names of the one or more air filters and any other size or different information identifying or related to the one or more air filters 30. In response to receiving information from a user relating to the one or more air filters 30 in HVAC system 4, controller 18 may be configured to adjust an air filter change notification indicator setting (e.g., a length of time of a timer set to indicate and/or display a filter change notification on the display 62 upon expiration of the timer indicating that air filter 30 replacement is desired, a filter threshold value against which a sensed measure is compared where when the sensed measure surpasses the filter threshold value a filter change notification is displayed, and/or any other air filter change notification settings, as desired). In one example, the controller 18 may set a shorter time for a filter change notification when a filter has a smaller size, less depth or higher MERV rating than for a filter with a larger size, more depth or lower MERV rating. Similarly, the controller 18 may set a higher filter threshold value against which a sensed measure is compared to determine when a filter change notification is to be issued for a filter has a smaller size, less depth or higher MERV rating than for a filter with a larger size, more depth or lower MERV rating. Also, certain air filter model numbers may be associated with corresponding air filter change notification indicator settings. In some cases, certain air filter model number and/or HVAC system combinations may have corresponding air filter change notification indicator setting. These are just some examples.

In some cases, the controller 18 may be programmed to help calibrate an air filter monitor 34 out in the field. This may help account for system variables/variations including, but not limited to, ductwork characteristics, equipment specifications, equipment set up, the condition of the equipment, HVAC system environment, user habits and environment, among other system variable/variations. Also, calibration may help ensure that the filter monitor 34 will work properly with the selected filter type and the particular HVAC system (e.g., HVAC system 4 in FIG. 1). The filter monitor 34 may be capable of working with a variety of filter types and sizes and a variety of HVAC systems, as well as different set-ups from different manufacturers. In some cases, calibration may be used to help provide a threshold value against which a parameter monitored (e.g., differential pressure drop across the air filter 30) may be compared to determine when an air filter notification should be issued.

In some instances, for example, controller 18 may be configured to initiate a calibration test for the air filter monitor 34 by activating one or more control signals that put the HVAC system 4 into a particular one of one or more operating states, where once in the particular one of the one or more operating states, the controller 18 may be configured to monitor one or more parameters related to a current condition of the air filter 30. The one or more operating states may include, for example: (1) fan only mode; (2) heat mode, with first stage active; (3) heat mode, with first and second stages active and humidifier on; (4) cool mode, with first stage active; and/or (5) any other suitable mode. These are just some examples. Once in the particularly one of the one or more operating states, the controller 18 may monitor one or more parameters that are related to a current condition of the air filter 30. The controller 18 may then determine a filter change threshold value based on the calibration test, and store the filter change threshold value in a memory. During subsequent operation of the HVAC system 4, the controller 18 may display a filter change notification message on the display when the current condition of the air filter 30 passes the filter change threshold.

Figure 10:
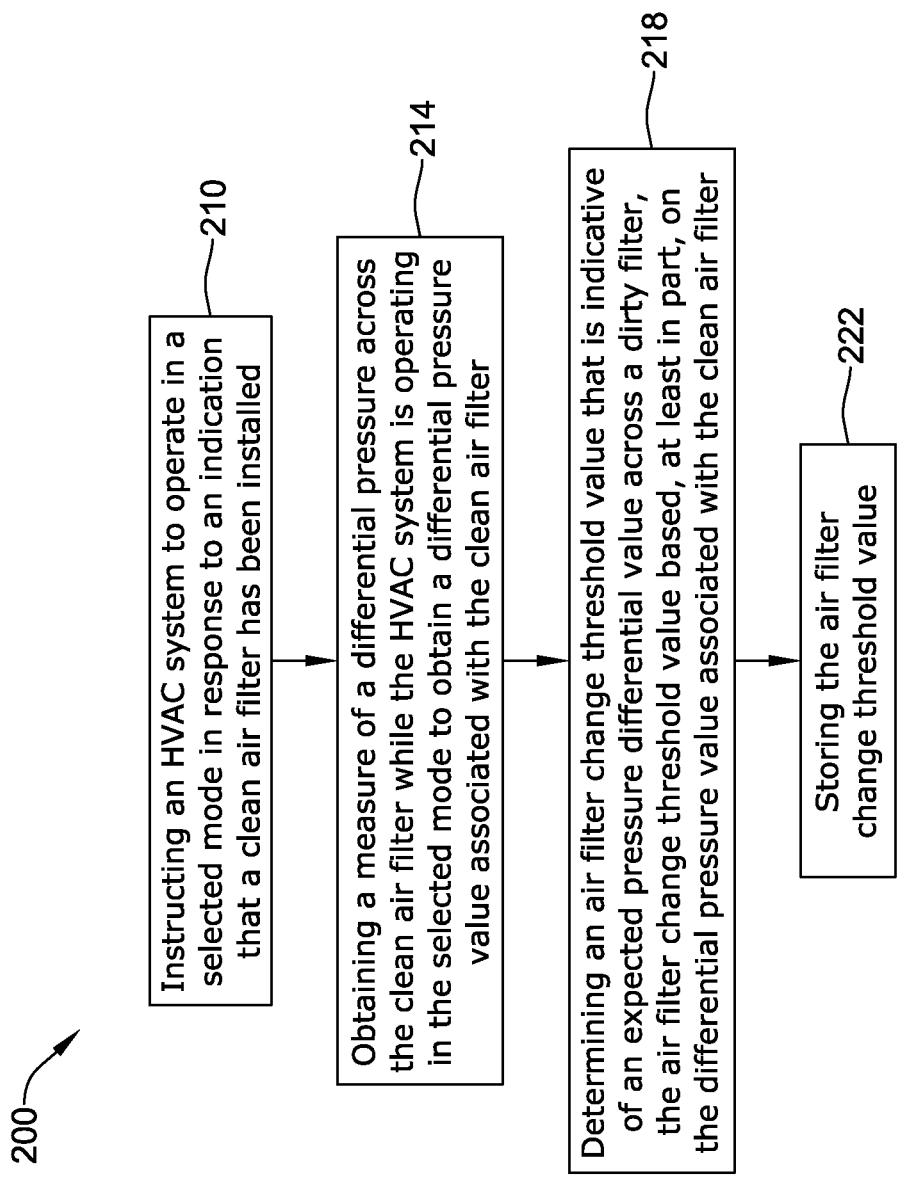
FIG. 10 is a flow chart of an exemplary method of calibrating an HVAC system filter monitor using a clean air filter.

FIG. 10 is a flow chart of an illustrative method 200 of setting an air filter change threshold value for an HVAC system with a first filter monitor calibration test (e.g., a clean filter monitor calibration test), which may be implemented on HVAC controller 18 with a programmed setup wizard. In such a case, a clean air filter may be first installed in the HVAC system and used in combination with controller 18 to determine and set an air filter change threshold value. During subsequent operation of HVAC system 4, the controller 18 may then use the air filter change threshold value to determine when to trigger an alert or filter change notification message on display 62, notifying the user that the air filter 30 is dirty and may need to be replaced.

To determine and set an air filter change threshold value for the HVAC system 4, and in some cases, a system user (e.g., installer or HVAC contractor or other user) may install a clean air filter in the system. Next, in response to an indication that a clean air filter has been installed, the controller may instruct the HVAC system to operate in a selected mode or state (Block 210). The HVAC system may be operated in a mode or state in which the fan is "on" and drives air through the air filter. In some cases, this may be a "fan only" mode or state in which the heating and/or cooling element is "off" and only the fan is operated at a selected speed. In other cases, the HVAC system may be operated in a heating mode (e.g., HEAT 1) or a cooling mode (e.g., COOL 2). In another case, the HVAC system may be operated in a ventilation mode. In still other cases, the HVAC system may be operated in a humidifying mode or dehumidifying mode. Typically, the mode or state having the highest fan speed may be selected, but this is not always the case. In some cases, the mode or state may be selected based on which mode or state may provide the greatest negative impact on equipment life from a dirty filter.

While the HVAC system is operating in the selected mode, the controller (e.g., controller 18) may command or require the air filter monitor 34 to measure one or more parameters related to the current condition of the one or more air filters 30 of the HVAC system 4 with one or more sensors (not shown), where the one or more parameters may include, but are not limited to, the differential pressure drop across the air filter 30 to obtain a system differential pressure measurement that is related to an amount of flow restriction presented by the air filter 30 (Block 214). The differential pressure measurement may then be displayed to the user on an appropriate screen of the display 62 of controller 18. In some cases, the user may operate the HVAC system 4 in various different modes or states, obtaining a differential pressure or other parameter or measure related to an amount of flow restriction (e.g. air flow for a given fan speed) associated with the clean air filter for each mode or state. However, each time a new measurement is obtained, it may replace the previous measurement for a given mode or state, but this is not required. When so provided, the differential pressure measurement (or other measure related to an amount of flow restriction) may be based on the last state in which the HVAC system is operated, but this is also not required. Other parameters and measures that may be sensed or obtained by the controller 18 and/or the one or more sensors may include a temperature parameter measured at an output of a heat exchanger of the HVAC system 4, a temperature change parameter across a heat exchanger of the HVAC system 4, an air flow measurement through the air filter 30, and/or any other similar or dissimilar parameter related to a component of HVAC system 4.

Regardless of whether the user obtains a system differential pressure measurement from operating the HVAC system 4 in a single or multiple modes or states, the resulting system differential pressure measurement(s) may be used to determine one or more air filter change threshold value(s) (Block 218). The air filter change threshold value(s) may be indicative of an expected differential pressure across what is considered to be a dirty filter. For example, an air filter change threshold value for a particular operating mode or state may be an offset from a differential pressure measurement made while operating the HVAC system in the particular operating mode or state. The air filter change threshold value may be used to determine the current status of the filter 30 (e.g., clean or dirty or other status). In some cases, the user may use their own knowledge of the system variables that may affect the air filter change threshold value for the specific application to determine or modify the air filter change threshold value, as desired. Alternatively, or in addition, a processor 44 or the like may be programmed with an algorithm that may determine an air filter change threshold value using a measure related to the amount of flow restriction presented by the clean air filter. In some cases, the algorithm may rely on only the differential pressure measurement, but this is not required in all embodiments.

While not required, the algorithm used to determine the air filter change threshold value may employ one or more inputs that may be provided by the user. In some cases, the user may input information regarding the HVAC system components in response to one or more questions provided by the processor 44. For example, through the user interface 48 of the HVAC Controller, the user may input information regarding the HVAC system 4 including, but not limited to, the MERV rating of the filter, the size of the filter, the model number of the filter, the brand of the filter, the fan type (e.g., variable speed fan), the number of dampers, whether or not the HVAC system is a zone system, the location of the HVAC components, the age of the components, and/or the size of the building or dwelling, among others. Using the data provided by the user and/or the system, sometimes including a measure related to the amount of flow restriction presented by the clean air filter (e.g. differential pressure measurement), the controller 18 may calculate and sometimes subsequently display an air filter change threshold value (or timer value) for the HVAC system 4.

In some cases, the air filter change threshold value may be set such that it is about 25%-400% higher than that measured for the clean air filter. In some cases, the air filter change threshold value may be set such that it is about 5-300% higher than a differential pressure measurement associated with the clean air filter. In other cases, the air filter change threshold value may be set such that it is about 5-200% higher than a differential pressure measurement associated with the clean air filter. In other cases, the air filter change threshold value may be set such that it is about 5-150% higher than a differential pressure measurement associated with the clean air filter. In still yet other cases, the air filter change threshold value may be set such that it is about 1-50% higher than a differential pressure measurement associated with the clean air filter.

While the air filter change threshold value for indicating a dirty filter may be determined or adjusted by the user based on their own knowledge and/or by the controller using an algorithm for that purpose, the air filter change threshold value may nonetheless be limited by an upper threshold value and/or a lower threshold value. For example, the industry accepted standard for an air filter change threshold value indicating a dirty air filter may be about 0.6 inches of water (w.c.). In some cases, the air filter change threshold value for indicating a dirty filter determined by the user and/or the controller 18 may be limited to not exceed this or some other value. Similarly, the lower threshold value for the air filter change threshold value may be limited to be no less than the system differential pressure measurement obtained using a clean air filter. For example, if the system differential pressure measurement for a clean air filter is measured to be 0.1 w.c., an exemplary range in which the air filter change threshold value for indicating a dirty filter may be confined to a range of 0.2 w.c. to about 0.6 w.c., but this is not required.

In some instances, the air filter change threshold value may be stored in the memory 52 of the controller 18 (FIG. 2) (Block 222). In some cases, the processor 44 may be programmed with an algorithm that uses the air filter change threshold value stored in the memory 52 to determine the status of the air filter 30 by comparing, for example, a current differential pressure measurement to the air filter change threshold value, and based on the results of this comparison, may trigger an alert indicating that that the air filter is dirty and needs to be replaced.

In some cases, setting an air filter change threshold value using a clean air filter may be initiated by a user through the user interface 48 of the controller 18, and sometimes activating and/or using a guided programming routing or setup wizard that presents a sequence of screens (e.g., one or two or more screens) or other tool programmed on controller 18. FIGS. 11A-11J provide several illustrative examples of various display screens 230, 232, 234, 236, 238, 240, 242, and 244 that may be displayed by the controller 18 while setting an air filter change threshold value using a clean air filter.

Figure 11A:
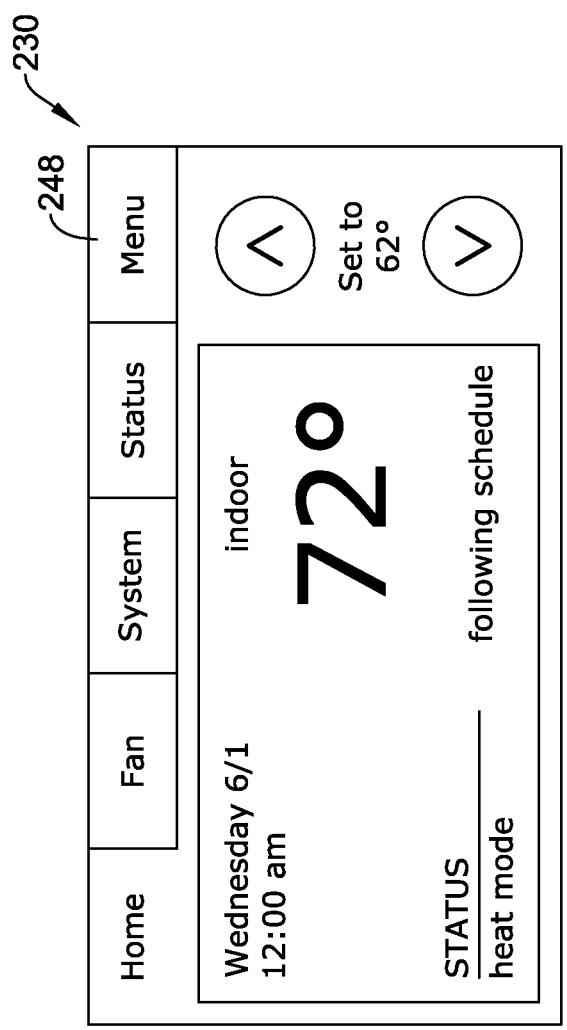
Figure 11B:
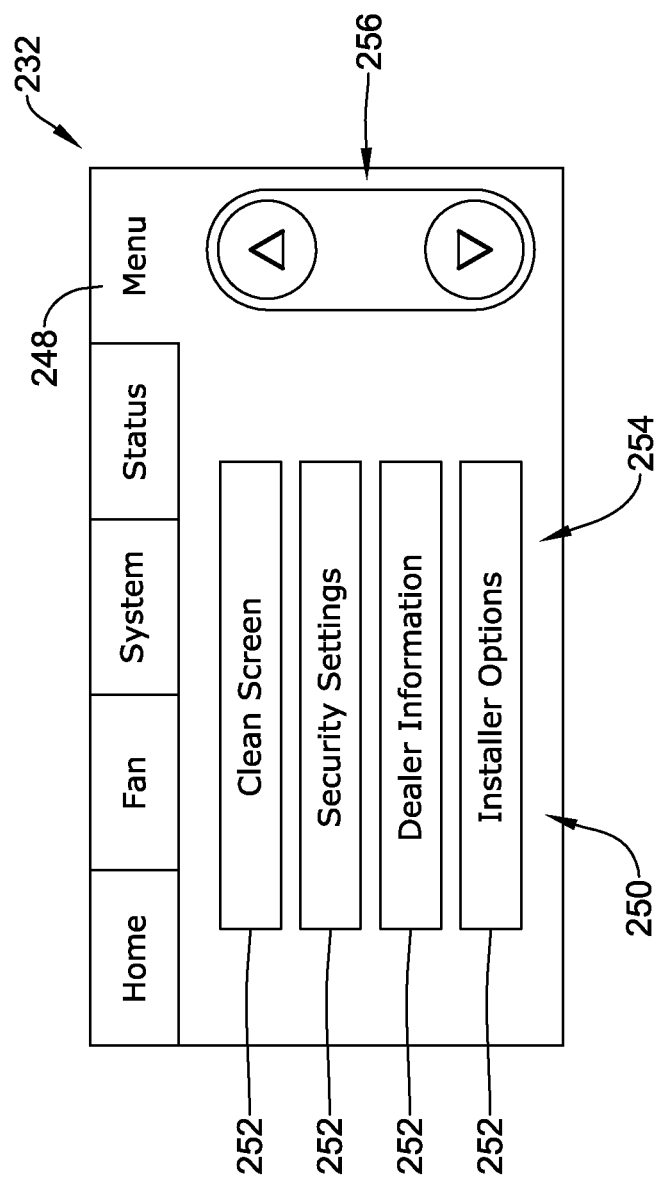

To initiate the protocol for setting an air filter change threshold value, the user may first select the MENU button 248 displayed on the display screen 230 of the controller 18 (FIG. 11A). In response, a menu screen 232 may be displayed (FIG. 11B). The menu screen 232 may be configured to display a menu 250 listing at least one menu option 252. The menu 250 may display multiple menu options 252 in the form of a table 254. The table 254 may be a scrollable table in which case, a scroll bar 256 may also be provided to enable to the user to navigate up and/or down within the table 254 to view the different menu options 252. Exemplary menu options 252 may include, but are not limited to, a clean screen option, a security settings menu option, a dealer information option, and/or installer options menu option.

Figure 11C:
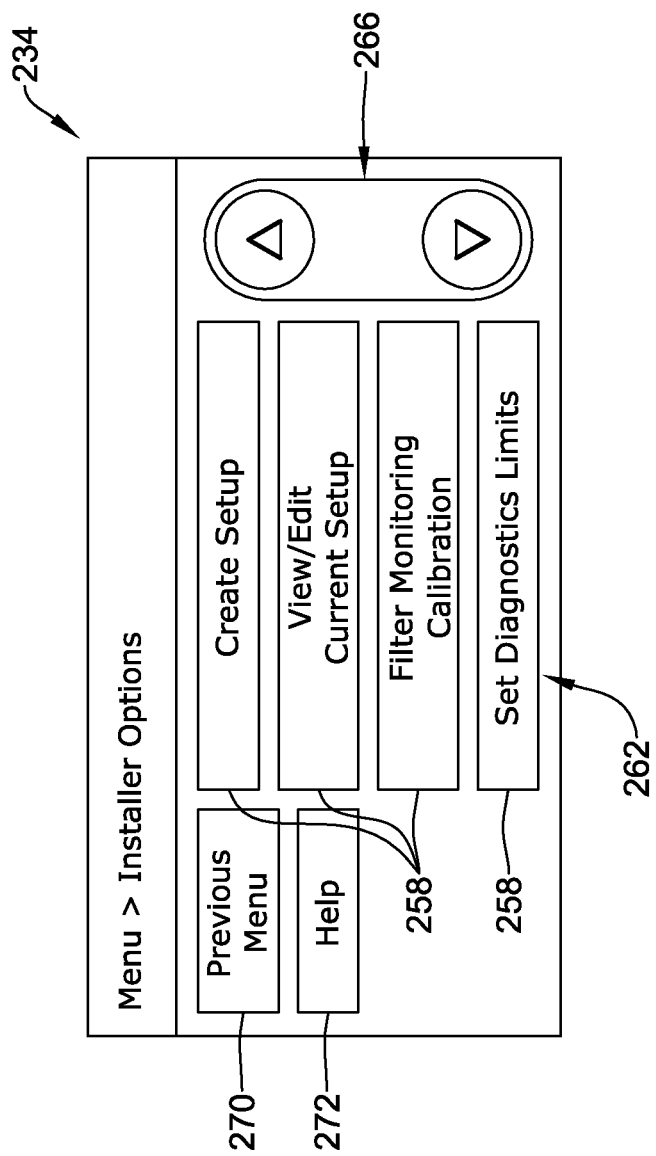

In some cases, the calibration protocol may be accessed by selecting the menu option 252 labeled INSTALLER OPTIONS. Selection of the INSTALLER OPTIONS menu option 252 may cause the controller 18 to display an INSTALLER OPTIONS menu screen 234 (FIG. 11C). In some cases, after selecting INSTALLER OPTIONS, the setup wizard may display on user interface 48 a query for a user to enter an installer personal identification number (e.g., PIN) or password prior to moving to the next screen in the sequence of screens of the setup wizard, but this is not required. The INSTALLER OPTIONS menu screen 234 of the sequence of screens may be configured to display one or more menu options 258 listing at least one installer option accessible via the INSTALLER OPTIONS menu screen 234. The menu options 258 may be provided in the form of a table 262. The table 262 may be a scrollable table in which case, a scroll bar 266 may be provided to enable the user to navigate up and/or down within the table 262 to view the different installer options available to the user. Illustrative installer options available to the user may include, but are not limited to, CREATE SETUP, VIEW/EDIT CURRENT SETUP, FILTER MONITORING CALIBRATION, INSTALLER TEST, and SET DIAGNOSTIC LIMITS, among others. The INSTALLER OPTIONS menu screen 234 may also be configured to display a PREVIOUS MENU button 270 that, upon its selection, may be programmed to return the user to the previous display screen, and a HELP button 272 that upon its selection may be configured to display a HELP menu listing various help topics to the user.

The protocol for setting an air filter change threshold value may be initiated by selecting the button 258 labeled FILTER MONITORING CALIBRATION on the INSTALLER OPTIONS menu screen 234. Selecting the FILTER MONITORING CALIBRATION button 258 on the INSTALLER OPTIONS menu screen 234 may cause a CALIBRATION menu screen 236 to be displayed (FIG. 11D). The CALIBRATION menu screen 236 may display one or more buttons 276a, 276b labeled with the different filter calibration methods that may be employed by the user to determine and set an air filter change threshold value. For example, as shown in FIG. 11D, the CALIBRATION menu screen 236 may be configured to display a first button 276a labeled CLEAN FILTER CALIBRATION and a second button 276b labeled BLOCKED FILTER CALIBRATION. In some cases, the CALIBRATION menu screen 236 may be configured to display a user prompt 278 that may prompt the user to select a calibration method from the different calibration method options that may be displayed by the CALIBRATION menu screen 236. The CALIBRATION menu screen 236 may be also configured to display a HELP button 280 and/or a CANCEL button 282 which, if selected, may return the user to the previous INSTALLER OPTIONS menu screen 234. Selection of the calibration method may be initiated by pressing either the CLEAN FILTER CALIBRATION button 276a or the BLOCKED FILTER CALIBRATION button 276b. In this example, as shown in FIG. 11D, the CLEAN FILTER CALIBRATION METHOD button 276a is highlighted indicating to the user that the CLEAN FILTER METHOD option has been selected. Selection of the CLEAN FILTER CALIBRATION METHOD may be confirmed and/or initiated by pressing the NEXT button 286 displayed on the CALIBRATION menu screen 236.

Figure 11E:
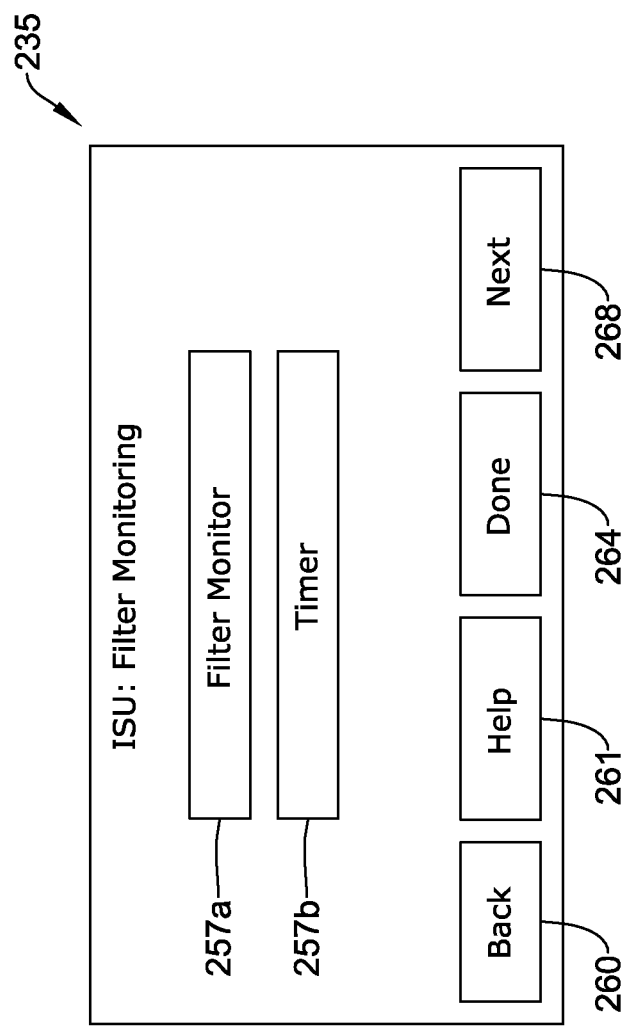

Alternatively, or in addition, the protocol for setting an air filter change threshold value may be initiated by selecting button 258 labeled CREATE SETUP on the INSTALLER OPTIONS menu screen 234. Selecting the CREATE SETUP button 258 on the INSTALLER OPTIONS menu screen 234 may cause the setup wizard to display none, one or several screens of the sequence of screens querying a user for information relating HVAC system 4 setup prior to arriving at a FILTER MONITORING menu screen 235 shown in FIG. 11E. The FILTER MONITORING menu screen 235 may include one or more buttons 257a, 257b labeled with different types of filter monitoring techniques. For example, a first filter monitoring technique button may be labeled FILTER MONITOR 257a, signifying a filter monitoring technique of comparing a filter monitor threshold value to a sensed differential pressure across one or more air filters 30 (or other suitable parameter). A second filter monitoring technique button may be labeled TIMER 257b, signifying a filter monitoring technique of comparing an amount of time one or more air filters 30 have been in use to a threshold time at which the air filters 30 should be replaced. FILTER MONITORING menu screen 235 may also be configured to display a BACK button 260 which, if selected, may return the user to the previous INSTALLER OPTIONS screen 234, a HELP button 261 for further information related to FILTER MONITORING menu screen 235, a DONE button 264, and/or a NEXT button 268. Selection of the filter monitoring technique may be initiated by pressing either the FILTER MONITOR button 257a or the TIMER button 257b. In this example, as shown in FIG. 11E, the FILTER MONITOR button 257a is highlighted indicating to the user that the FILTER MONITOR option has been selected. Although highlighting of the selected button is shown, it is not required. Selection of the FILTER MONITOR technique may be confirmed and/or initiated by pressing the NEXT button 268 displayed on the FILTER MONITORING menu screen 235. After confirming and/or otherwise initiating the FILTER MONITORING technique, the setup wizard may display one or more screens in a sequence of screens, if desired. For example, and in the example shown, if one or more air filters 30 have not yet been calibrated, the user interface 48 may display a user message indicating "YOU WILL BE DIRECTED TO FILTER MONITORING CALIBRATION WHEN YOU FINISH CREATE SETUP", or if the one or more air filters 30 have been calibrated through a CLEAN FILTER CALIBRATION METHOD, the user interface 48 may display a screen querying a user to adjust a clean filter monitoring threshold value, where the screen is similar or identical to the screen depicted in FIG. 11I and described in further detail below, or if the one or more filters 30 have been calibrated through a DIRTY FILTER CALIBRATION METHOD, the user interface 48 may display a screen querying a user to adjust a dirty filter monitoring threshold value, where the screen is similar or identical to the screen depicted in FIG. 14I and described in further detail below.

When the filter monitor 34 has not been calibrated and a next button is selected on the screen display displaying the user message indicating the user will be directed to filter monitoring calibration after finishing user set up, the setup wizard may display a screen (not shown) in the sequence of screens querying a user to select a YES button or NO button in response to a query concerning whether to save changes made during installer setup. After receiving and accepting a response to the query regarding saving changes or after a predetermined amount of time, the setup wizard will display CALIBRATION menu screen 236, as seen in FIG. 11D.

Figure 11F:
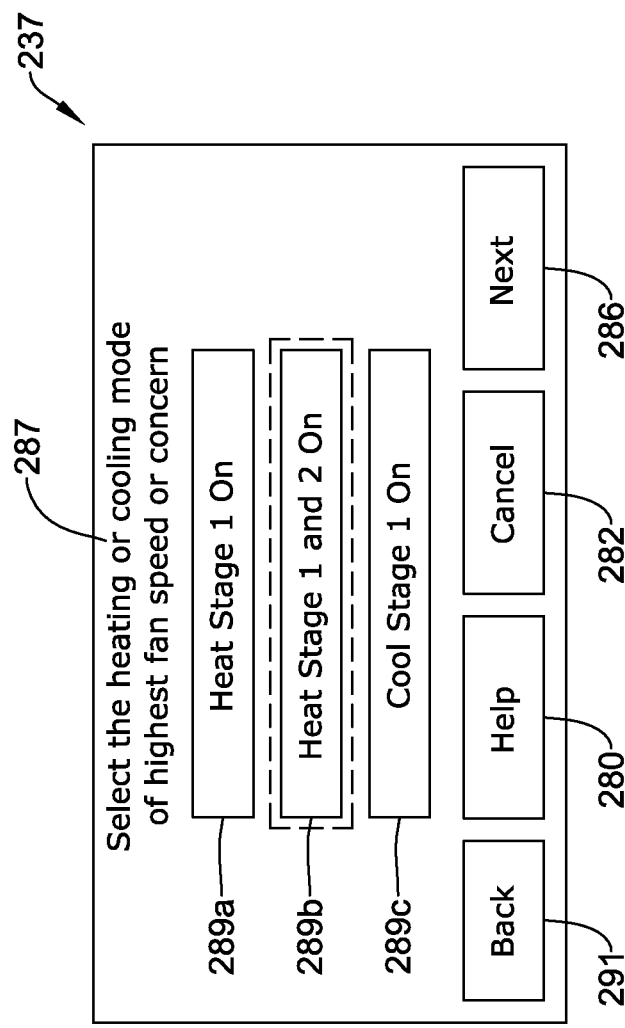

Selection of the calibration method (e.g., the CLEAN FILTER CALIBRATION method), may cause a first user prompt screen 237 to be displayed (FIG. 11F). Here, in this example, upon selection of the CLEAN FILTER CALIBRATION method on the previous CALIBRATION menu screen 236 in response to a query to the user concerning which calibration method is to be used, a first user prompt screen 237 may be displayed including a user prompt 287 prompting or querying the user to select a mode or state in which to operate the HVAC system 4 during the selected calibration method from at least two different operation mode or state options 289a, 289b, and 289c that may be displayed by the first user prompt screen 287. For example, as shown in FIG. 11F, the user may select from a Heat Stage 1 mode, a Heat Stage 1 and 2 mode, or a Cool Stage 1 mode or other mode. The operation mode for calibration may be selected based on the state or mode that may provide the greatest negative impact on equipment life and/or the state or mode that may return the highest fan speed and/or any other desired state or mode, as desired. The controller 18 may then issue one or more control signals to an HVAC system 4 to put the HVAC system 4 into the selected operating state or mode, and will test or measure the pressure drop across the one or more air filters 30.

In the example shown, selection of the desired state or mode may be initiated by pressing the corresponding button or icon 289a, 289b or 289c. In this example, as shown in FIG. 11F, button 289b associated with Heat Stage 1 and 2 is highlighted, indicating to the user that this is the selected mode in which the HVAC system 4 will operate during the selected calibration method. Selection of the desired mode may be confirmed and/or initiated by pressing the NEXT button 286 displayed on the first user prompt screen 287. A button or icon 291 labeled BACK or RETEST may be displayed by the first user prompt screen 237 and may permit a user to return to this screen 237 or a previous screen when executing the selected calibration method in multiple states or modes.

Figure 11G:
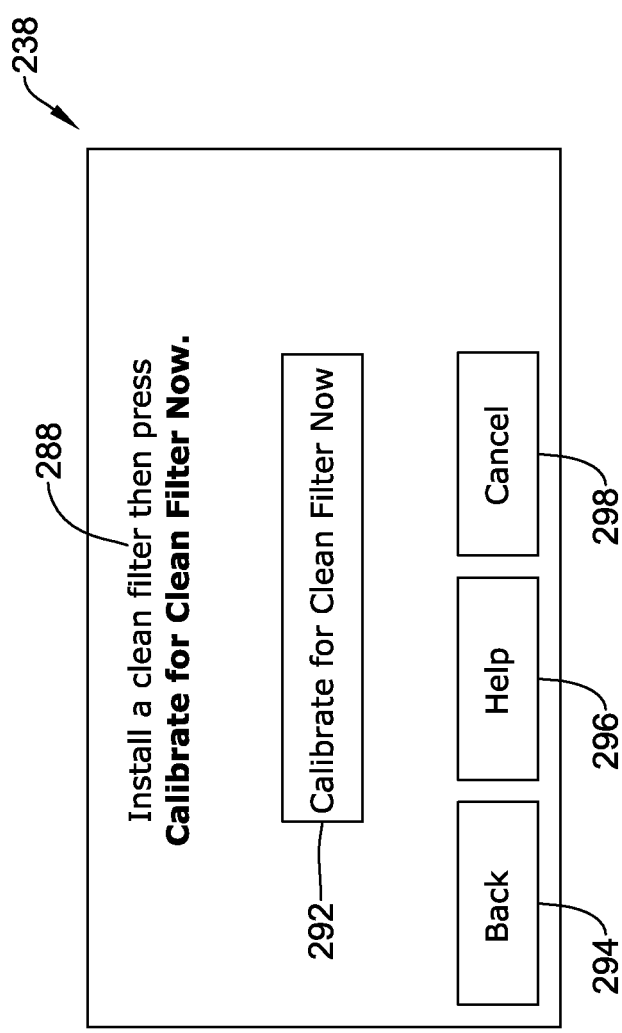

After the state or mode in which to operate the HVAC system 4 during the desired calibration method has been selected and confirmed, a next user message or prompt screen 238 may be displayed (FIG. 11G). Here, in this example, upon selection of the Heat Stage 1 and 2 mode on the previous user prompt screen 237, a next user prompt screen 238 of the sequence of screens of the setup wizard may be displayed including a user query or prompt 288, prompting the user to install a clean air filter into the HVAC system. The user prompt 288 may also provide certain instructions to the user.

In this example, as shown in FIG. 11G, the user prompt 288 may also instruct or query the user to press a button 292 labeled "Calibrate for Clean Filter Now" which may also appear on the first user prompt screen 238. Selecting the "Calibrate for Clean Filter Now" may finalize initiation of the calibration protocol and may cause the controller 18 to initiate a calibration protocol. The user prompt screen 238 may also be configured to display a BACK button 294 which may return the user to a previous screen (e.g., screen 236), a HELP button 296 which upon its selection may cause a HELP menu to be displayed, and/or a CANCEL button 298, which may cancel the selection of the desired calibration method (e.g., CLEAN FILTER CALIBRATION) and which may return the user to the previous screen (e.g., CALIBRATION menus screen 236) or a home screen.

Figure 11H:
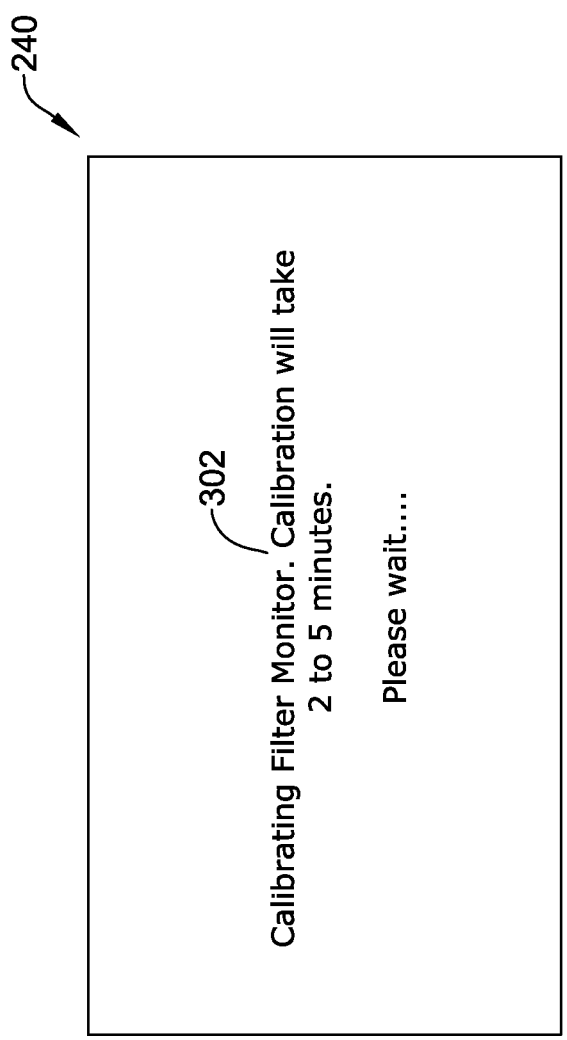

Upon initiation of the selected calibration method, the display may be configured to display a STATUS screen 240 (FIG. 11H). The STATUS screen 240 may be configured to display a message 302 to the user indicating the current status of the calibration. The STATUS screen 240 may also indicate to the user that the controller 18 is busy.

Upon initiation of the clean air filter calibration method, the controller 18 may be configured to instruct or command the air filter monitor 34 to measure, for example, a differential pressure across the clean air filter 30 installed by the user in response to the selection of the appropriate calibration method displayed by the first user prompt screen 238. Rather than a differential pressure measurement, it is contemplated that a static pressure measurement, an air flow measurement, or any other suitable measurement that is related to an amount of flow restriction presented by the air filter 30 may be used. In some cases, after a measurement is made with the clean air filter, the controller 18 may be configured to display the measured value (e.g. differential pressure measurement value) on a further user prompt screen 242 (FIG. 11I) of the sequence of screens. The further user prompt screen 242 may include multiple regions for conveying a variety of information to the user and querying the user for information. For example, the further user prompt screen 242 may display a differential pressure measurement value obtained during calibration in a first region 306, and a user message or prompt 308 in a second region 310. The further user prompt screen 242 may be configured to display the selected calibration method in the first region 306 adjacent the differential pressure measurement value. The user query or prompt 308 may instruct or prompt or ask the user to set or adjust an air filter change threshold value which may indicate a dirty filter based on, for example, the differential pressure measurement displayed in the first region 306. In some cases, the controller may automatically provide a default air filter change threshold value by, for example, adding an offset to the differential pressure measurement value.

Figure 11I:
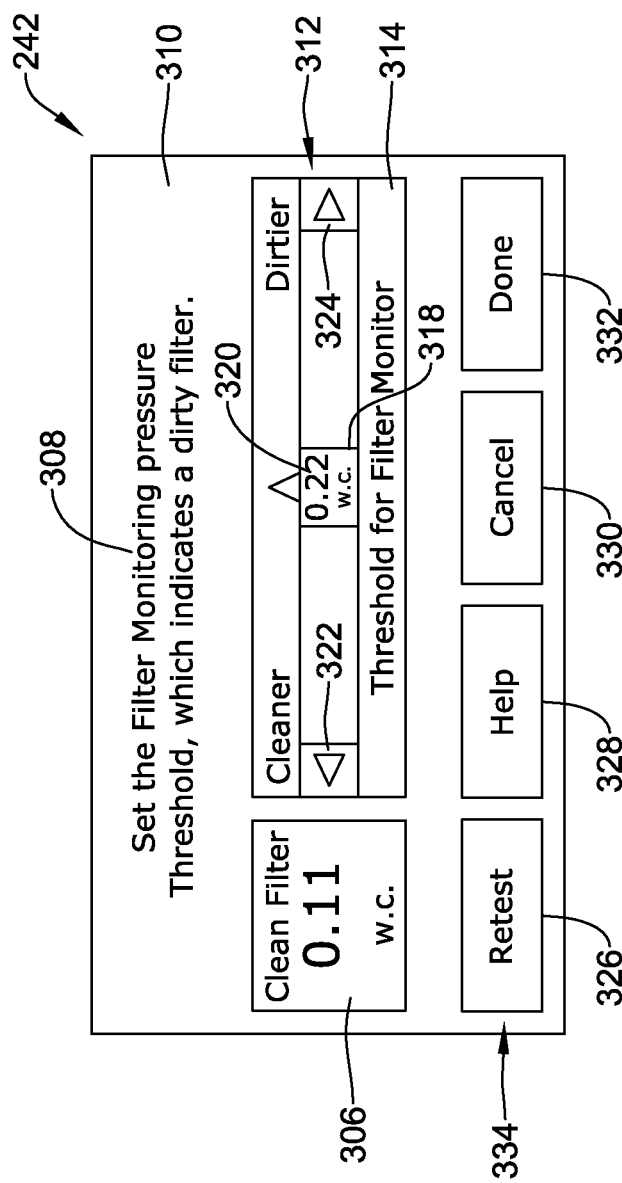

In some cases, an adjustment bar 312 for adjusting or setting the air filter change threshold value may be provided in a third region 314 of the third user prompt screen 242 situated below the second region 310 containing the user prompt 308 and adjacent to the first region 306 displaying the differential pressure measurement value obtained during calibration. The adjustment bar 312 may be either a horizontal adjustment bar as depicted in FIG. 11I or may be a vertical adjustment bar. The adjustment bar 312 may include a slider 318 adapted to display a label 320 indicating a current quantitative setting of the air filter change threshold value. Additionally, the adjustment bar 312 may include a first button 322 and a second button 324 for increasing and decreasing the setting for the air filter change threshold value. In some cases, as the user increases and/or decreases the air filter change threshold value displayed by the controller using the first and/or second button 322, 324, the label 320 may indicate the current setting of the air filter change threshold value, and may continuously or incrementally change the value as it is increased or decreased. The air filter change threshold value may be adjusted at this point to set a final air filter threshold value for the filter change notification feature and/or a user may reenter the menu to adjust the air filter change threshold value at a later and/or different time. Alternatively, user interface 48 may display one or more different screens of the sequence of screens indicating the air filter monitor calibration failed. For example, the user interface 48 of HVAC controller 18 may display a screen of the sequence of screens with the user message indicating that the filter monitor 34 has encountered an error, or a user message indicating that it is not possible to achieve zero airflow, which may be indicative of an installation issue. In either event, the user may be prompted, when a help button has been selected or otherwise, to check installation of the one or more air filters 30 and select the back button to rerun the calibration.

In some cases, the further user query or prompt screen 242 may also include at least one of a RETEST button 326, a HELP button 328, a CANCEL button 330, and a DONE button 332 located in a fourth region 334 of the display screen 242. Upon selection of the RETEST button 326, the controller 18 may be configured to re-execute the selected calibration method (e.g., clean filter calibration). The user may select the RETEST button 326 if they are dissatisfied with or question the differential pressure (or other) measurement that was obtained during the calibration that was just conducted. Selecting the HELP button 328 may cause a HELP menu to be displayed. Selecting of the CANCEL button 330 may cancel the current operation (e.g., adjustment of the threshold value) and may return the user to a previous screen (e.g., CALIBRATION menu screen 236) or a home screen (e.g., Home Screen 230).

After setting the air filter change threshold value to a final air filter threshold value, the user may select the DONE button 332 to indicate that the air filter change threshold value has been set. This may cause the controller 18 to store the air filter change threshold value in its memory for reference during operation of the HVAC system. Additionally, this is the value upon which the controller 18 may use to determine the status of the air filter during subsequent operation of the HVAC system, and which may be used to trigger an alert to the user indicative of the status of the air filter.

Figure 11J:
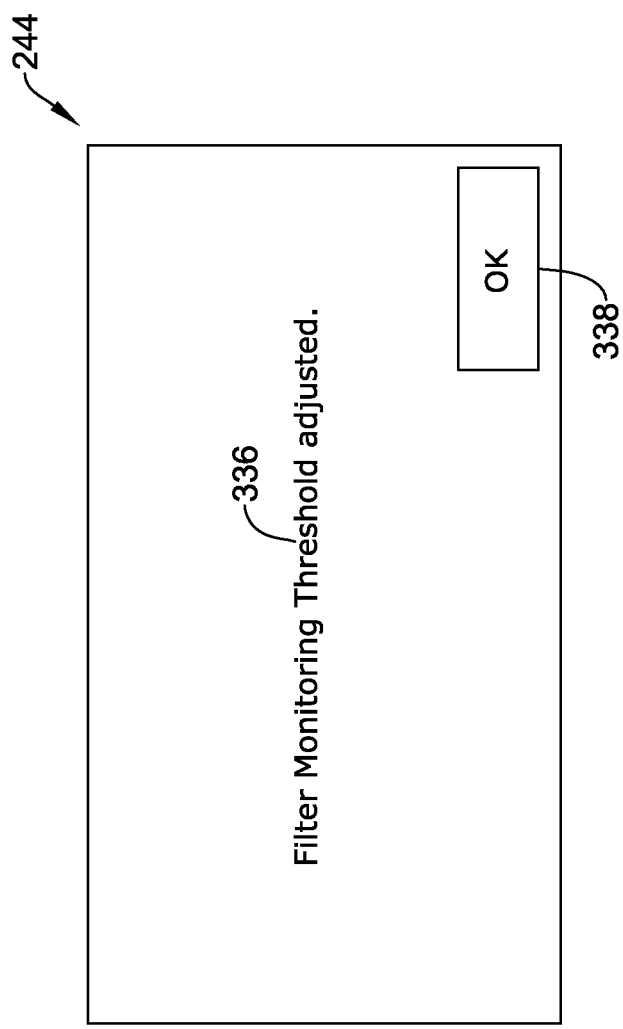

Additionally, selection of the DONE button 332 may cause a confirmation screen 244 to be displayed (FIG. 11J). The confirmation screen 244 may include one or more user messages 336 that may indicate to the user that the threshold value has been set. The confirmation screen 244 may also be configured to display an OK button 338 prompting the user to acknowledge the message displayed by the confirmation screen 244. Upon selecting the OK button 338, the INSTALLER OPTIONS menu screen 234 (FIG. 11C) or the HOME screen 230 (FIG. 11A) may be displayed.

The air filter change threshold value also may be set using a blocked air filter (and/or blocking panel). When so provided, an at least partially blocked air filter (and/or blocking panel) may be used to determine and set an air filter change threshold value. Like above, the air filter change threshold value may then be used to indicate the status of the filter, and in some cases, may trigger an alert to the user that the air filter 30 is dirty and may need to be replaced.

Figure 12:
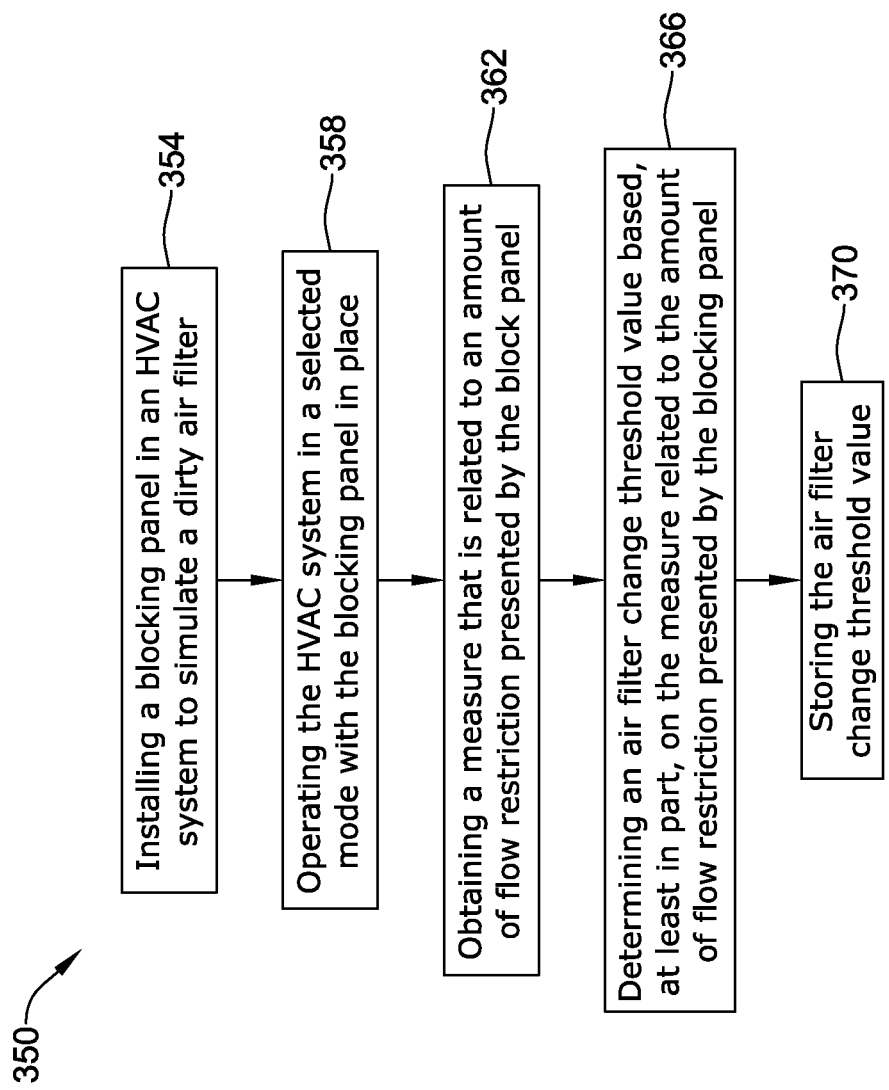
FIG. 12 is a flow chart of an exemplary method of calibrating an HVAC system filter monitor using a blocking panel.

FIG. 12 is a flow chart of a method 350 in which an at least partially blocked air filter (and/or blocking panel) is used to determine and set an air filter change threshold value for an HVAC system. An at least partially blocked air filter (and/or blocking panel) may be used in this method to simulate a dirty air filter, and in some cases, may provide a more accurate assessment of the performance of the HVAC system when the air filter is considered dirty.

To determine and set an air filter change threshold value for an HVAC system using an at least partially blocked air filter (and/or blocking panel), a system user (e.g., installer or HVAC contractor or other user) may install a clean air filter in the system (Block 354). Next, the user may install a blocking panel into the system to at least partially block the clean air filter to simulate a dirty air filter (Block 354). The blocking panel may be a piece of cardboard, cardstock, poster board, or similar materials that may be inserted into the system to at least partially block the air filter in order to simulate a dirty air filter. The blocking panel may be installed in the system such that it at least partially blocks the return air side or the supply air side of the filter. The blocking panel may be sized using a template for that purpose. The template may be provided with the installation guide for the air filter monitor. In some cases, the blocking panel may also be provided with an installation guide. In some cases, a blocking panel may be used without a clean air filter installed. That is, the blocking panel may replace the air filter in the HVAC system, at least temporarily during calibration.

In some cases, a kit for installing an air filter monitor may include an installation guide or manual including instructions for installing and calibrating the air filter monitor. The installation guide may be a tangible paper guide or manual, or may be an installation guide or manual that is programmed on HVAC controller 18 and which may take the form of a setup wizard or guided programming routine having a sequence of screens querying the user and soliciting information from the user, along with providing user messages to the user, such that the user is informed about the air filter installation process and may be able to interact with the sequence of screens through the user interface 48. The kit may also include a template for sizing a blocking panel to achieve a desired reduction in air flow (% air flow blockage) in the HVAC system. In certain cases, a blocking panel may be initially provided with the kit. The template and the blocking panel may be discarded after successful installation and calibration of the air filter monitor.

Figure 13A:
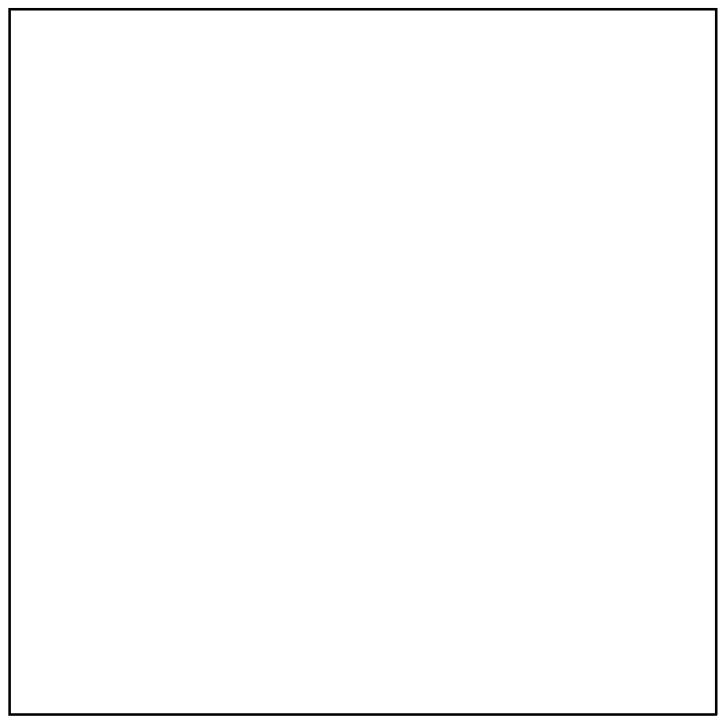
FIG. 13A is a schematic view of an illustrative blocking panel used to at least partially block an air filter opening following the method outlined in FIG. 12.
Figure 13B:
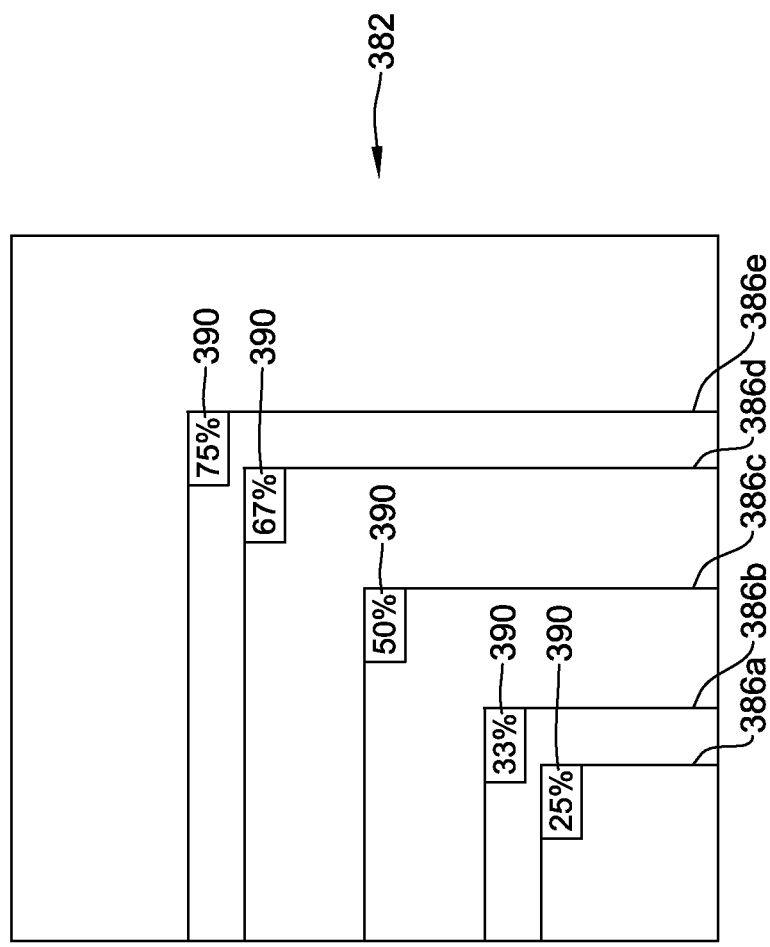
FIG. 13B is a schematic view of an illustrative template used to size a blocking panel such as shown in FIG. 13A.

FIGS. 13A and 13B are schematic diagrams of a blocking panel 378 and template 382 that may be used to size the blocking panel 378, respectively. In some cases, the template 382 may be a part of and printed on the blocking panel 378. In other cases, the template 382 may be provided separately from the blocking panel. The template 382 may be used to size the blocking panel such that when the blocking panel 378 is inserted into the HVAC system 4, it results in at least a 25% air flow blockage, at least a 33% air flow blockage, at least a 50% air flow blockage, at least a 67% air flow blockage, or at least a 75% blockage. These are just some examples. The amount of blockage used to simulate a dirty filter may be selected by the user. In some cases, a 50% air flow blockage may be used.

In some cases, as shown in FIG. 13B, the template 382 may be a piece of paper or thin cardstock including at least one set of horizontal and vertical measurement lines 386a-386e that may be used to size the blocking panel 378 such that it results in a desired amount of air flow blockage. The template 382 may also include one or more labels 390 for indicating to the user the approximate percent air flow blockage that may result when a particular set of measurement lines 386a-386e are used to size the blocking panel 378. For example, as shown in FIG. 13B, the template 382 may include a first set of measurement lines 386a that when used to size the blocking panel 378, may result in about a 25% air flow blockage. In some cases, the template 382 may include additional sets of measurement lines 386b-386e that when used to size a blocking panel, may result in at least a 33% air flow blockage, at least a 50% air flow blockage, at least a 67% air flow blockage, or at least a 75% blockage, respectively. In some cases, different sets of lines may be provided on the template, where each set of lines corresponds to a corresponding size air filter. This way, one blocking panel and template may be suitable for calibrating HVAC systems with different size air filters and/or different air flow blockages, as desired. In some cases, the blocking panel 378 may be sized by placing the template on the blocking panel 378 and using a cutting tool such as, for example, a pair of scissors, a razor blade, or an X-ACTO® knife to cut along the selected set of measurement lines 386a-386e.

Referring again to FIG. 12, after the blocking panel has been sized to achieve the desired amount of air flow blockage and inserted into the system, the user may select a system mode or state in which to operate the HVAC system (Block 362). The HVAC system may be operated in a mode or state in which the fan is "on" and drives air through the blocking panel and/or air filter. In some cases, this may be a "fan only" state or mode in which the heating and/or cooling element is "off" and only the fan is operated at a selected speed. In other cases, the HVAC system may be operated in a heating mode (e.g., HEAT 1) or a cooling mode (e.g., COOL 2). In some cases, the HVAC system may be operated in a ventilation mode. In still other cases, the HVAC system may be operated in a humidifying mode or a dehumidifying mode. Typically, the mode having the highest fan speed is selected, but this is not always the case. In some cases, the mode may be selected based on which mode may provide the greatest negative impact on equipment life from a dirty filter. The HVAC system may then be operated in the selected mode with the blocking panel to obtain, for example, a differential pressure or other measure related to an amount of flow restriction presented by the blocking panel (Blocks 358 and 362). In some cases, the user may operate the HVAC system in various different modes, obtaining a differential pressure or other measure related to an amount of flow restriction presented by the blocking panel for each mode. In some cases, each time a new measurement is obtained it may replace the previous measurement. Thus, the system differential pressure measurement associated with the at least partially blocked air filter may be based on the last mode in which the HVAC system is operated, but this is not required.

In some cases, after the system differential pressure measurement (or other measure related to an amount of flow restriction presented by the blocking panel) is obtained, the user may verify that the change in air temperature across the heat exchanger and the discharge air temperature are within an acceptable range suitable for the particular system (Block 370). This verification may be accomplished in any suitable way. For example, and in a first method, a return air sensor and a discharge air sensor may be connected to the HVAC controller 18. The HVAC system may then be configured to display the change in air temperature across the heat exchanger. In a second illustrative method, a discharge air sensor may be connected to the HVAC system controller and the HVAC system controller may be configured to display the discharge air temperature. The user may then measure the change in air temperature across the heat exchanger using standard HVAC air temperature measurement tools. In a third illustrative method, neither a return air temperature nor a discharge air temperature is utilized. Instead, the user may simply measure the change in air temperature across the heat exchanger and the discharge air temperature using standard HVAC air temperature measurement tools. These are merely illustrative.

If the change in temperature across the heat exchanger and/or the discharge air temperature are not within acceptable limits, then the user may adjust the amount of blockage by re-sizing the blocking panel or by using a different blocking panel, and may repeat the steps outlined in Blocks 362, 366, and 370. If the change in temperature across the heat exchanger and/or the discharge air temperature are found to be within the acceptable limits, the user may repeat the steps outlined in Blocks 362, 366, and 370 for multiple system modes, if desired. In some cases, the differential pressure measurement (or other measure related to an amount of flow restriction presented by the blocking panel) that is obtained may be based on the last mode in which the system was operated.

In some cases, the differential pressure measurement (or other measure related to an amount of flow restriction presented by the blocking panel) may be displayed to the user by the controller 18. It is contemplated that the system differential pressure measurement (or other measure related to an amount of flow restriction presented by the blocking panel) may be used, at least in part, to determine an air filter change threshold value (Block 366). Subsequently, the air filter change threshold value may be used to determine the status of the filter (e.g., clean or dirty). In some cases, the user may use their knowledge of the system variables that may affect the differential pressure threshold value for the specific HVAC system to determine or alter the air filter change threshold value, but this is not required.

In many cases, the air filter change threshold value may be set such that it is substantially equal to the measure that is related to the amount of air flow restriction presented by the at least partially blocked air filter. In this instance, the user may accept the measure as the default air filter change threshold value.

While the air filter change threshold value for indicating a dirty filter may be adjusted by the user based on their knowledge or by the controller using an algorithm for that purpose, the air filter change threshold value may be limited by an upper threshold value and a lower threshold value, as described above.

The air filter change threshold value may be stored in the memory 52 of the controller 18 (Block 370). In some cases, the processor 44 may be programmed with an algorithm that uses the air filter change threshold value stored in the memory 52 to determine the status of the air filter by comparing a current measure related to an amount of flow restriction presented by the air filter to the air filter change threshold value, and that, based on the results of this comparison, may trigger an alert indicating that the filter is dirty and needs to be replaced. After the air filter change threshold value is set, the blocking panel may be removed from the HVAC system (Block 376).

The protocol for setting an air filter change threshold value and configuring a filter change notification using an at least partially blocked air filter may be initiated by a user through the user interface 48 and display 62 of the controller 18 (FIGS. 1 and 2) by, for example, activating a guided programming routine. FIGS. 14A-14J provide examples of various illustrative display screens 402, 406, 410, 414, 418, 422, and 426 of a sequence of screens that may be displayed by a guided programming routine or setup wizard of the controller 18 while setting an air filter change threshold value using an at least partially blocked air filter following a method such as, for example, described above with reference to FIG. 12.

Figure 14A:
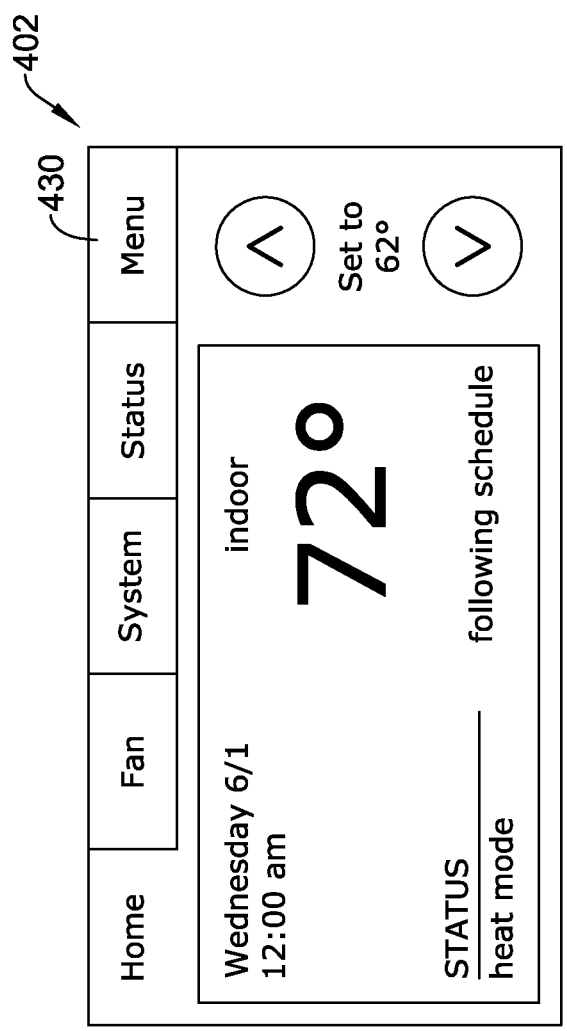
FIGS. 14A-14J provide illustrate examples of different screens that may be displayed by an HVAC controller following the exemplary method of calibrating an HVAC system filter monitor outlined in FIG. 12.
Figure 14B:
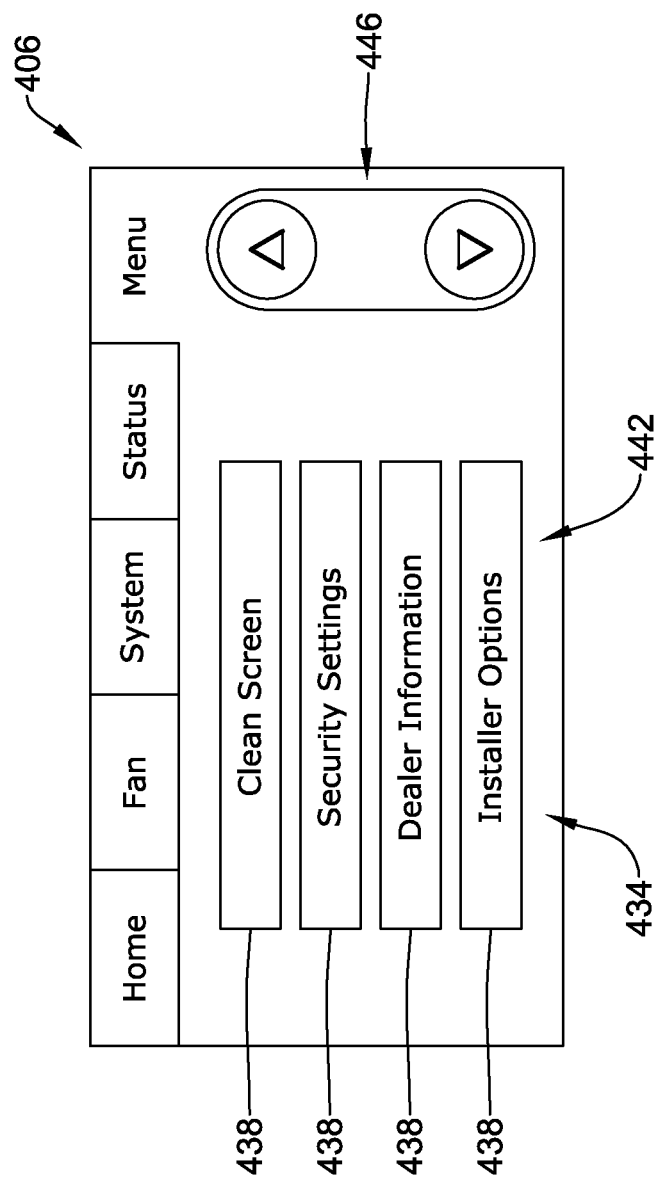

To initiate the protocol for setting an air filter change threshold value using an at least partially blocked air filter (and/or blocking panel), the user may first select the MENU button 430 displayed on the display screen 402 of the controller (FIG. 14A). In response, a menu screen 406 may be displayed (FIG. 14B). The menu screen 406 may be configured to display a menu 434 listing at least one menu option 438. The menu 434 may display multiple menu options 438 in the form of a table 442. The table 434 may be a scrollable table in which case, a scroll bar 446 may also be provided to enable the user to navigate up and/or down within the table 442 to view the different menu options 438. Exemplary menu options 438 may include a SECURITY SETTINGS menu option, a DEALER INFORMATION menu option, and/or INSTALLER OPTIONS menu option.

Figure 14C:
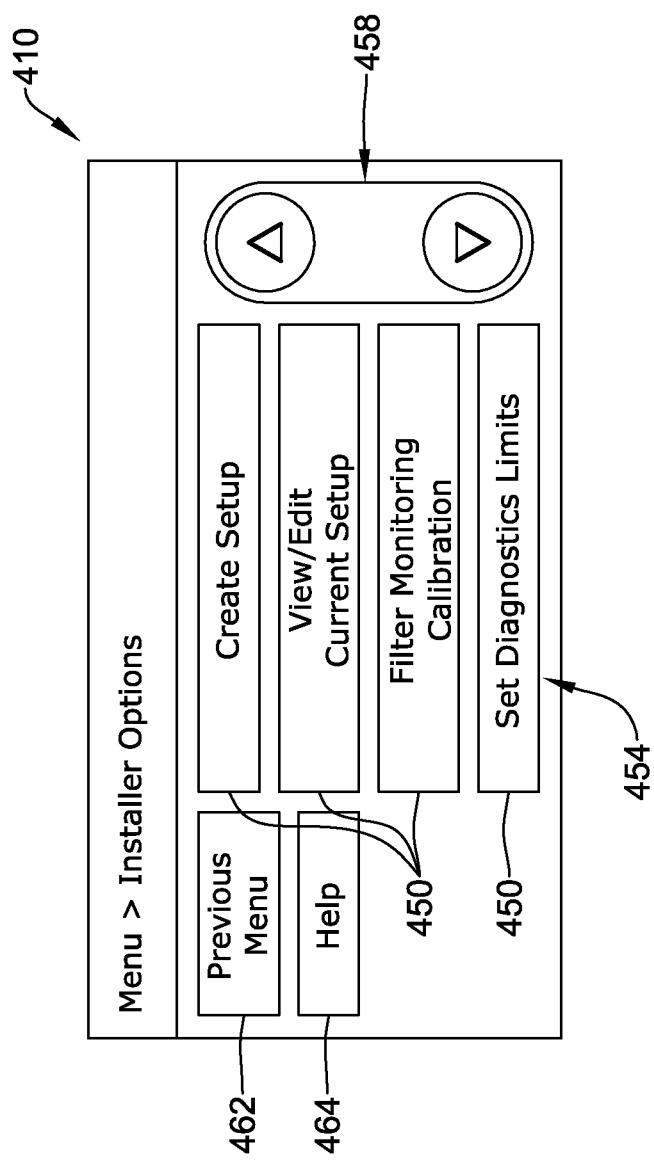

In some cases, the protocol for setting the air filter change threshold value may be accessed by selecting the menu option 438 labeled INSTALLER OPTIONS. Selection of the INSTALLER OPTIONS menu option 438 may cause the controller to display an INSTALLER OPTIONS menu screen 410 (FIG. 14C). The INSTALLER OPTIONS menu screen 410 may be configured to display one or more menu options 450 listing at least one installer option accessible via the INSTALLER OPTIONS menu screen 410. The menu options 450 may be provided in the form of a table 454. The table 454 may be a scrollable table in which case, a scroll bar 458 may be provided to enable the user to navigate up and/or down within the table 454 to view the different installer options available to the user. Exemplary installer options available to the user may include, but are not limited to, CREATE SETUP, VIEW/EDIT CURRENT SETUP, FILTER MONITORING CALIBRATION, and SET DIAGNOSTIC LIMITS, among others. The INSTALLER OPTIONS menu screen 410 may also be configured to display a PREVIOUS MENU button 462 that upon its selection, may be programmed to return the user to the previous display screen or home screen 402, and a HELP button 464 that upon its selection may be configured to display a HELP menu listing various help topics to the user.

Figure 14D:
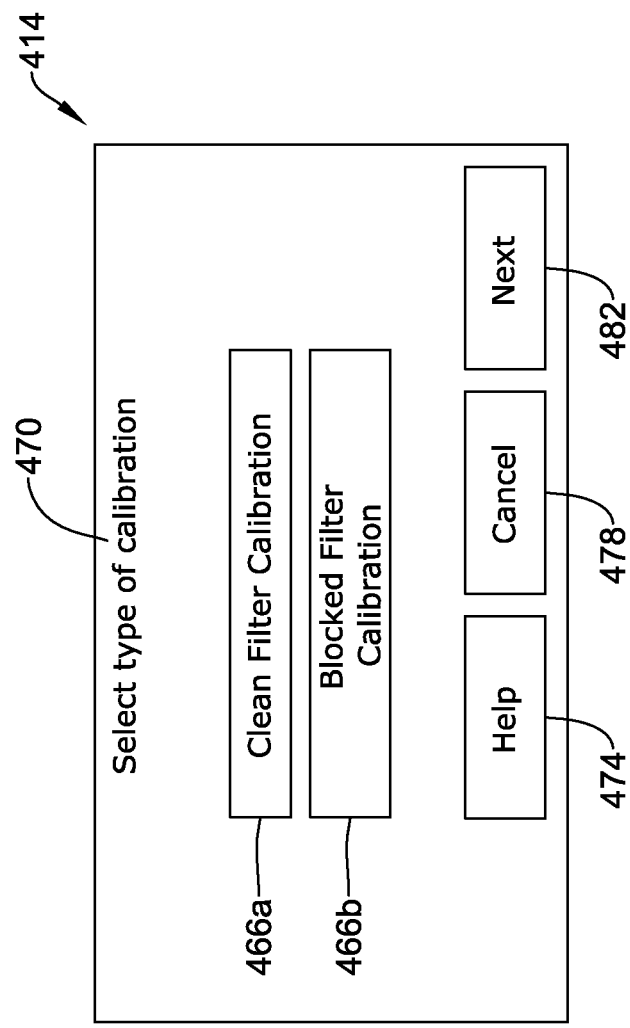

The protocol for setting the air filter change threshold value may be initiated by selecting the button 450 labeled FILTER MONITORING CALIBRATION on the INSTALLER OPTIONS menu screen 410. Selecting the FILTER MONITORING CALIBRATION button 450 on the INSTALLER OPTIONS menu screen 410 may cause a CALIBRATION menu screen 414 to be displayed (FIG. 14D). The CALIBRATION menu screen 414 may display one or more buttons 466a, 466b labeled with the different filter calibration methods that may be employed by the user to determine and set the air filter change threshold value. For example, as shown in FIG. 14D, the CALIBRATION menu screen 414 may be configured to display a first button 466a labeled CLEAN FILTER CALIBRATION and a second button 466b labeled BLOCKED FILTER CALIBRATION. In some cases, the CALIBRATION menu screen 414 may be configured to display a user prompt 470 that may prompt the user to select a calibration method from the different calibration method options that may be displayed by the CALIBRATION menu screen 414. The CALIBRATION menu screen 414 may be also configured to display a HELP button 474 and/or a CANCEL button 478 which, if selected, may return the user to the previous INSTALLER OPTIONS menu screen 410 or home screen 402. Selection of the calibration method may be initiated by pressing either the CLEAN FILTER CALIBRATION button 466a or the BLOCKED FILTER CALIBRATION button 466b. In this example, as shown in FIG. 11D, the BLOCKED FILTER CALIBRATION METHOD button 466b is highlighted indicating to the user that the BLOCKED FILTER METHOD option has been selected. Selection of the BLOCKED FILTER CALIBRATION METHOD may be confirmed and/or initiated by pressing the NEXT button 482 displayed on the CALIBRATION menu screen 414.

Figure 14E:
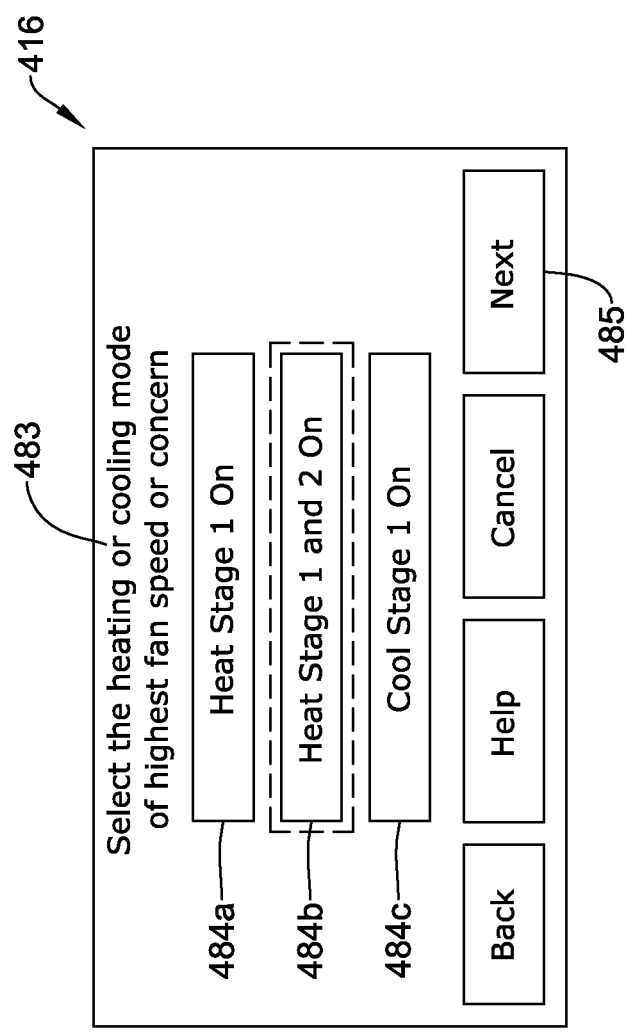

Alternatively, or in addition, the protocol for setting an air filter change threshold value may be initiated by selecting button 450 labeled CREATE SETUP on the INSTALLER OPTIONS menu screen 410 in FIG. 14C, as discussed above with respect to the CLEAN FILTER CALIBRATION METHOD. Selecting the CREATE SETUP button 450 on the INSTALLER OPTIONS menu screen 410 may cause the setup wizard to display none, one or several screens of the sequence of screens querying a user for information relating to HVAC system 4 setup (as discussed above with response to the CLEAN FILTER CALIBRATION METHOD) prior to arriving at FILTER MONITORING menu screen 414 seen in FIG. 14D. Selection of the calibration method (e.g., the BLOCKED FILTER CALIBRATION method) in response to the query on screen 414, may cause a user query or prompt screen 416 to be displayed (FIG. 14E). Here, in this example, upon selection of the BLOCKED FILTER CALIBRATION method on the CALIBRATION menu screen 414, a user query or prompt screen 416 may be displayed including a user message or prompt 483 soliciting the user to select a mode or state in which to operate the HVAC system during the selected calibration method from at least two different operation mode or state options 484a, 484b, and 484c that may be displayed by the user prompt screen 416 (FIG. 14E). For example, and as shown in FIG. 14E, the user may select from a Heat Stage 1 mode, a Heat Stage 1 and 2 mode, or a Cool Stage 1 mode, but these are just examples. The operation state or mode for calibration may be selected based on the state or mode that may provide the greatest negative impact on equipment life and/or the state or mode that will return the highest fan speed and/or any other mode.

Selection of the desired state or mode may be initiated by pressing the button or icon 484a, 484b or 484c associated with the desired state or mode of operation. In this example, as shown in FIG. 14E, button 484b associated with Heat Stage 1 and 2 is highlighted indicating to the user that this is the selected mode in which the HVAC system will operate during the selected calibration method. Selection of the desired mode may be confirmed and/or initiated and/or accepted by controller 18 by pressing the NEXT button 485 displayed on the user prompt screen 416. Alternatively, once the desired mode is pressed, the selection of the desired mode may be automatically initiated and/or accepted by controller 18.

Figure 14F:
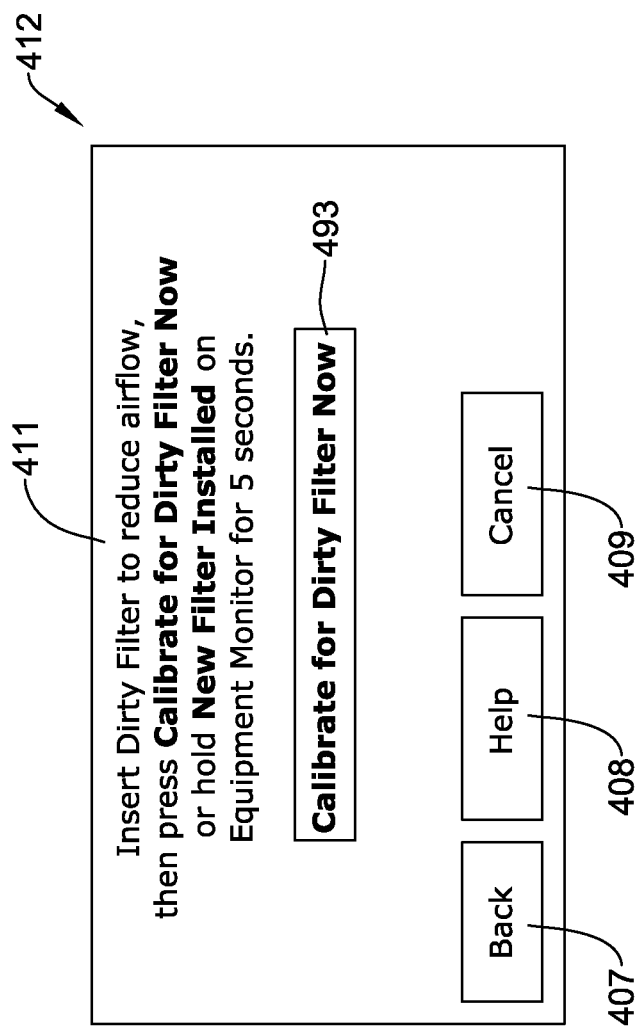

After the state or mode in which to operate the HVAC system 4 during the desired calibration method has been selected and confirmed by the user, the controller 18 may be configured to display an INSERT DIRTY FILTER screen 412 of the sequence of screens, as seen in FIG. 14F. INSERT DIRTY FILTER screen 412 may include a user message 411 soliciting the user to insert a dirty filter and then soliciting the user to press the CALIBRATE FOR DIRTY FILTER NOW button 413 on screen 412. Alternatively, or in addition, user message 411 may query the user to hold and/or press a NEW FILTER INSTALLED button on or about filter monitor 34 for a set period of time (e.g., 5 seconds or 10 seconds or 1 minute or any other time period). Additionally, screen 412 may include a back button 407, a help button 408 and/or a cancel button 409.

Figure 14G:
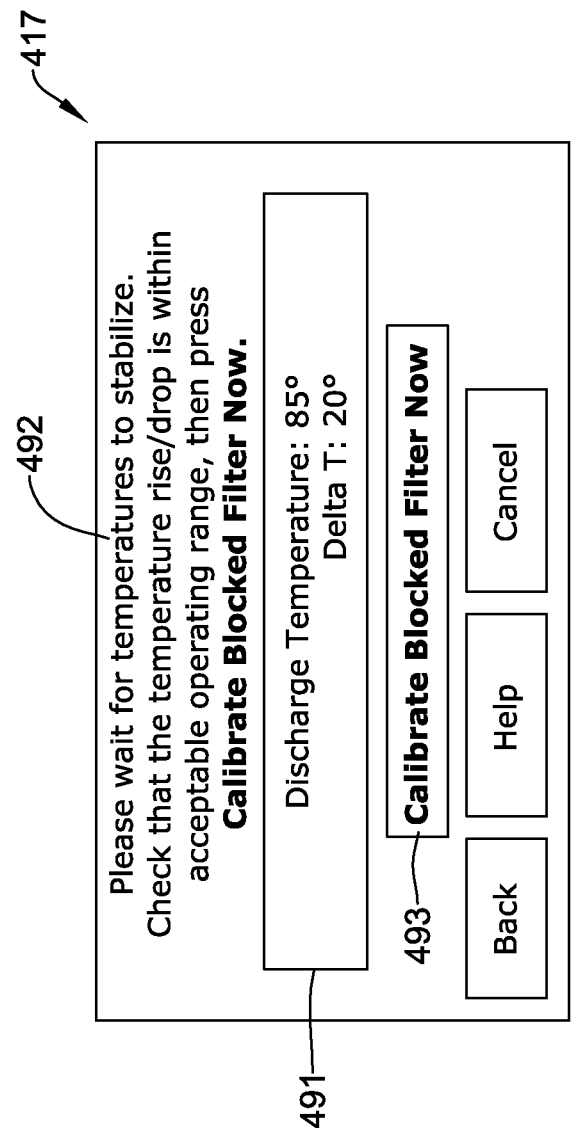
Figure 14H:
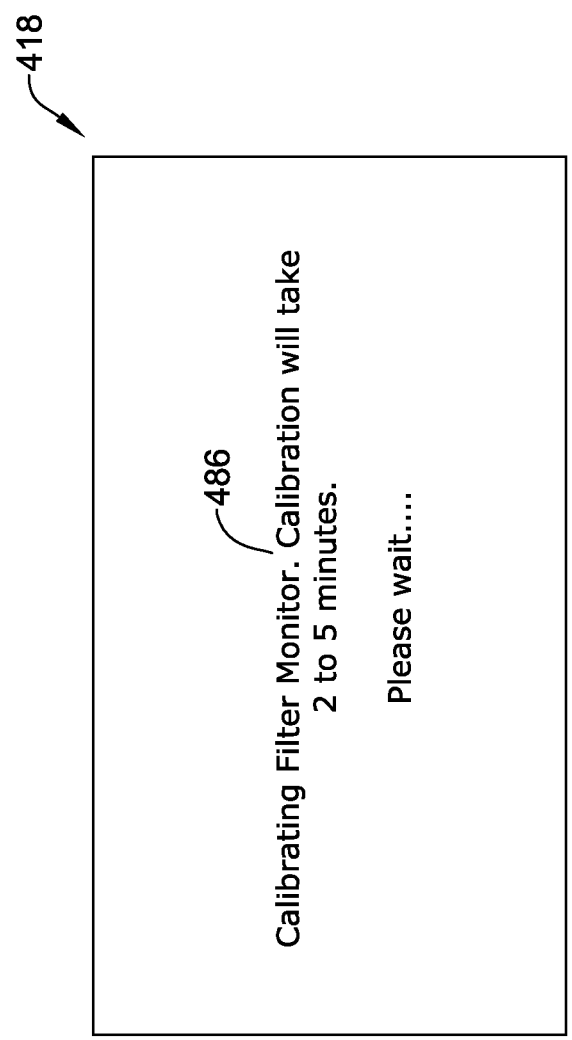

After the state or mode in which to operate the HVAC system 4 during the desired calibration method has been selected and confirmed, and a dirty filter or blockage has been placed in the HVAC system 4, the controller 18 may, in some cases, be configured to measure a discharge air temperature and/or a change in air temperature across the heat exchanger to verify that these values are still within an acceptable range for the particular HVAC system 4 when an at least partially blocked air filter is installed within the system. In some cases, the controller 18 may be configured to display a discharge air temperature verification screen 417 displaying a user message indicating the discharge air temperature and/or change in air temperature across the heat exchanger in a first region 491 of the screen 417 (FIG. 14G). Alternatively, the user message displayed on screen 417 may include only a user message indicating the controller 18 is waiting for temperatures to stabilize, while not including any discharge temperature or a change in air temperature across the heat exchanger. The screen 417 may include a user query or prompt 492 soliciting the user to verify that the displayed discharge air temperature and/or change in air temperature is within an acceptable range for the HVAC system before final initiation of the BLOCKED FILTER CALIBRATION method. The BLOCKED FILTER CALIBRATION method may be initiated by a user selecting a button 493 labeled CALIBRATE BLOCKED FILTER NOW or START TEST or other label provided on the discharge air temperature verification screen 417 of the sequence of screens, when provided.

Upon initiation of the selected BLOCKED FILTER CALIBRATION method, the controller 18 may be configured to display a STATUS screen 418 (FIG. 14H) of the sequence of screens. The STATUS screen 418 may be configured to display a user message 486 indicating to the user the current status of the calibration. The user message of the STATUS screen 418 may also indicate to the user that the controller is busy.

Upon initiation of the blocked filter calibration method, the controller 18 may be configured to measure, for example, a differential pressure via the air filter monitor 34 across the at least partially blocked air filter (and/or blocking panel) to obtain a measurement related to an amount of air flow restriction presented by the blocking panel. After a differential pressure measurement has been obtained by the controller (e.g., calibration is successful), the controller 18 may be configured to display a user message including the differential pressure measurement value obtained during the blocked air filter calibration on a CALIBRATION RESULTS screen 422 (FIG. 14I) of the sequence of screens. Alternatively, if the differential pressure measurement was not successfully obtained, a next screen of the sequence of screens may display a user message indicating the calibration failed and indicating the filter monitor 34 has encountered an error and/or that there is an air filter 30 installation issue and/or that there is any other issue relating to the HVAC system preventing proper filter monitor 34 calibration. These screens indicating the calibration has failed may include a back button, a help button and a cancel button, among other buttons, to assist a user in navigation through the setup wizard. Pressing the help button may solicit the user to ensure the one or more air filters 30 are installed properly and query the user to re-run the calibration test.

The CALIBRATION RESULTS screen 422 may include multiple regions for conveying a variety of information to the user through user messages and soliciting information from the user via queries. For example, the CALIBRATION RESULTS screen 422 may display a user message with the differential pressure measurement value obtained during calibration in a first region 490 and a user message 494 in a second region 498. The CALIBRATION RESULTS screen 422 may also be configured to display a user message with the calibration method in the first region 490 adjacent the differential pressure measurement value. The user message 494 may query or solicit the user to set or adjust an air filter change threshold value which may indicate a dirty filter based on the differential pressure measurement displayed in the first region 490, where the dirty filter may need to be replaced.

Figure 14I:
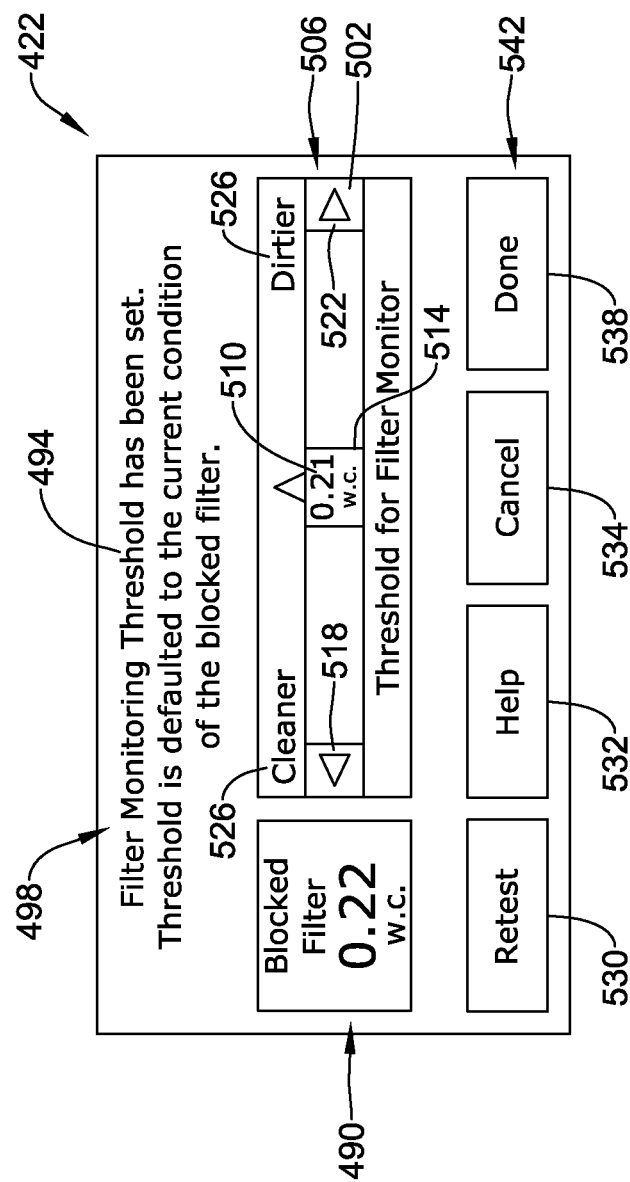

An adjustment bar 502 soliciting a user to adjust or set the air filter change threshold value may be provided in a third region 506 of the screen 422 situated below the second region 498 containing the user message 494 and adjacent to the first region 490 displaying the differential pressure measurement value obtained during calibration. The adjustment bar 502 may be either a horizontal adjustment bar as depicted in FIG. 14I or may be a vertical adjustment bar. The adjustment bar 502 may include a slider 510 adapted to display a label 514 indicating a current setting of the differential pressure threshold value. Additionally, the adjustment bar 502 may include a first button 518 and a second button 522 for increasing and decreasing the setting for the differential pressure threshold value. In some cases, as the user increases and/or decreases the air filter change threshold value using the first and/or second button 518, 522 the label 514 indicating the current setting of the air filter change threshold value may also continuously or incrementally change to indicate the current setting of the air filter change threshold value as it is increased or decreased. In some cases, one or more user messages with one or more qualitative labels 526 may be provided over the adjustment bar indicating in which direction the slider 510 may be moved indicating a clean or dirty filter. Exemplary qualitative labels include the terms CLEAN, DIRTY, CLEANER, DIRTIER, GOOD, BAD, OK, REPLACE, and REPLACE SOON, among others. Similarly, the buttons 518, 522 may also include directional arrows indicating in which direction the slider 510 may be moved to indicate a clean or dirty filter.

The CALIBRATION RESULTS screen 422 of the sequence of screens may also include at least one of a RETEST button 530, a HELP button 532, a CANCEL button 534, and a DONE button 538 located in a fourth region 542 of the display screen 422. Upon selection of the RETEST button 530, the controller may be configured to re-execute the selected calibration method (e.g., BLOCKED FILTER CALIBRATION). The user may select the RETEST button 530 if they are dissatisfied with or question the differential pressure measurement that was obtained by calibration that was just conducted. Selecting the HELP button 532 may cause a HELP menu to be displayed. Selecting of the CANCEL button 534 may cancel the current operation (e.g., adjustment of the threshold value) and may return the user to a previous screen (e.g., CALIBRATION menu screen 414) or a home screen (e.g., HOME screen 402).

In the example shown, the user may choose to either accept the differential pressure measurement as the default air filter change threshold value or may choose to adjust the differential measurement value to set a final air filter change threshold value. After setting the air filter change threshold value, the user may select the DONE button 538 to indicate that that the air filter change threshold value has been selected. This may cause the controller to store the air filter change threshold value in its memory for reference during operation of the HVAC system. Additionally, this is the value upon which the controller 18 may use to determine whether or not an air filter is clean or dirty, and which may be used to trigger an alert to the user that may indicate that the filter needs to be replaced.

Figure 14J:
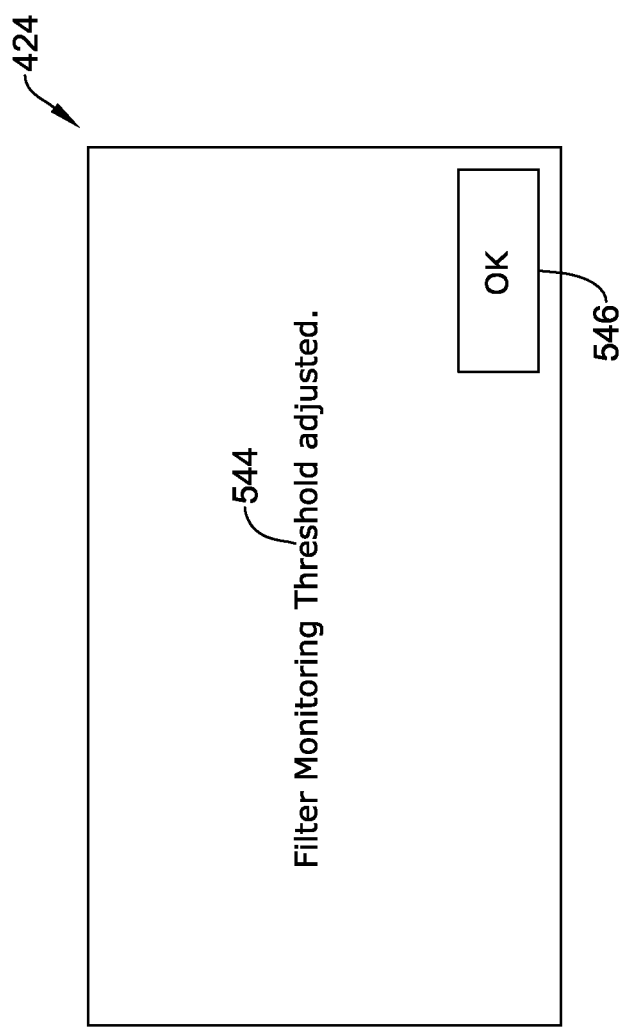

Additionally, selection of the DONE button 538 may cause a CONFIRMATION screen 426 to be displayed (FIG. 14J). The CONFIRMATION screen 426 may include one or more user messages 546 that may indicate to the user that the threshold value has been adjusted. The CONFIRMATION screen 426 may also be configured to display an OK button 552 prompting the user to acknowledge the message displayed by the confirmation screen 426. Upon selecting the OK button 552, the INSTALLER OPTIONS screen 410 (FIG. 14C) or the HOME screen 402 (FIG. 14A) may be displayed.

Referring again to FIG. 1, the air filter monitor 34 may be used to monitor the air filter 30 during operation of the HVAC system 4. For the purposes of this discussion, the air filter monitor 34 will be described as being adapted to measure a differential pressure across the air filter 30 between the supply air side and the return air side of the air filter 30. However, it must be understood, that the air filter monitor 34 may be adapted to measure a different physical parameter or to detect a change in a different physical parameter, such as air flow through the air filter, a static pressure on one or both sides of the air filter, current draw by the fan or blower 22 at a given fan speed, etc., as previously discussed.

In many cases, the air filter monitor 34, as described herein, may include a differential pressure sensor, which may experience a sensor offset and/or sensor drift over time and with temperature and/or over other environmental conditions. Sensor offset and/or sensor offset drift may decrease the accuracy of the differential pressure measurement. To improve accuracy of the differential pressure measured by the air filter monitor 34, sensor offset and/or sensor drift may be taken into account.

To determine sensor offset and/or sensor offset drift over time, the differential pressure between an upstream side and a downstream side of the air filter 30 may be measured at or near zero system pressure (e.g. with substantially no air flowing through the air filter). While differential pressure is used here as an example, it is contemplated that offsets for other sensors may be removed in a similar manner. It should be generally recognized that it is possible that a minimal amount of pressure may be present in the system, but that this minimal pressure may be considered to be negligible. In an ideal system, the differential pressure between the upstream side and the downstream side of the air filter 30 at zero system pressure should be equal to zero. However, this is not always the case for a variety of reasons. As such, the differential pressure measurement at zero pressure may be indicative of a sensor offset, which may drift with time and may reduce the accuracy of the differential pressure value. As such, and to improve the accuracy of the system, it is contemplated that the sensor offset may be measured from time to time and eliminated when determining the status of the air filter 30.

Figure 15:
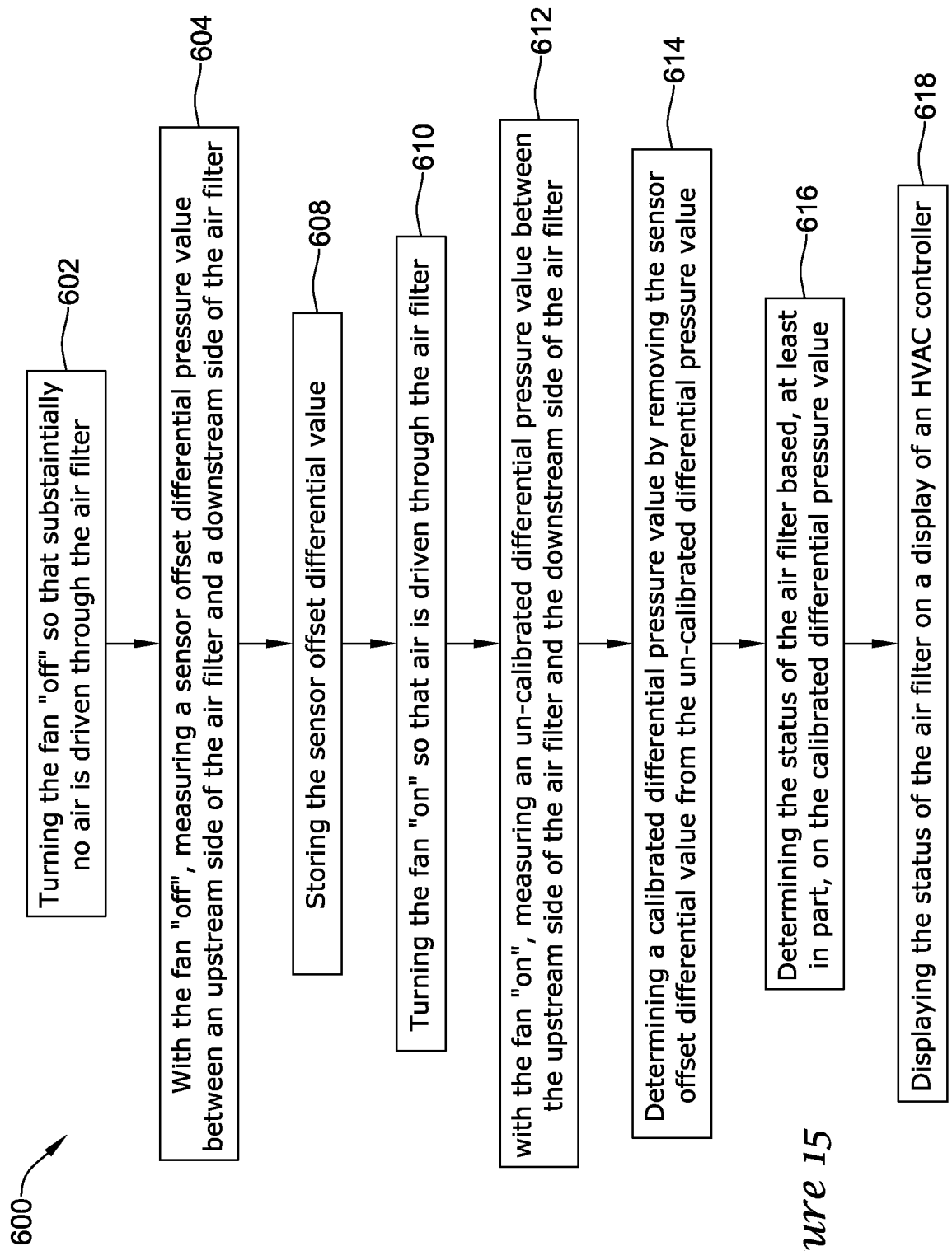
FIG. 15 is a flow chart of an example method of determining a sensor offset drift for an HVAC system filter monitor.

FIG. 15 outlines a method 600 of monitoring a status of an air filter (e.g., air filter 30) using a sensor offset differential pressure value for a differential pressure sensor (e.g., air filter monitor 34). While a differential pressure sensor is used here as an example, it is contemplated that sensor offsets from other types of sensors may be removed in a similar manner. As discussed above, the air filter monitor 34 may be in communication with the controller 18 via a wired or wireless communication link 42. In some cases, the controller 18 and/or processor 44 may be adapted to send a command to the HVAC system to turn off the fan or blower 22 so that substantially no air is driven through the air filter 30 (Block 602). Once the fan or blower 22 has been turned off, air stops circulating through the ductwork (e.g., supply air duct 10 and return air duct 14), and the system pressure may approach zero. Once the fan is "off" and the system pressure is at or near zero, the controller 18 and/or processor 44 may send a command to the air filter monitor 34 to measure a sensor offset differential pressure value between an upstream side of the air filter 30 and a downstream side of the air filter 30 (Block 604). The sensor offset differential pressure value may then be delivered to and stored within the memory 52 of the controller 18 (Block 608). In some cases, the controller may be configured to display the differential pressure measurement on the display, but this is not required. The controller 18 may then return the HVAC system 4 to a previous or selected operating mode in which the fan is turned "on" so that air is driven through the air filter (Block 610). In some cases, the previous or selected operating mode or state may be a cooling mode, a heating mode, a ventilation mode, a humidifying mode, a dehumidifying mode, and the like.

The sensor offset differential pressure value obtained at or near zero system pressure may be indicative of the sensor offset. For example, if the sensor offset differential pressure value measured at or near zero system pressure is 0.1 w.c., then the sensor offset can be considered to be equal to 0.1 w.c. The sensor offset differential pressure value may be monitored by the controller 18 as a function of time and/or ambient temperature. In some cases, when the sensor offset differential pressure value is obtained at or near zero system pressure, the controller 18 may also record the current ambient temperature and/or the amount of time lapsed from the last measurement of the sensor offset differential pressure value. Other physical parameters such as absolute pressure or humidity may also be monitored and recorded by the controller 18 as they may also affect sensor offset and/or sensor drift. This information may help the controller 18 to determine if the sensor offset differential pressure value is still accurate using an algorithm designed for this purpose. In some cases, the controller 18 may use the sensor offset differential pressure value to determine whether or not the current sensor offset differential pressure value calibration has expired. In such a case, the controller 18 may be configured to display a message to the user on the controller display 62 that the sensor offset differential pressure value calibration has expired and/or that a new sensor offset differential pressure value calibration may be necessary.

In some cases, the sensor offset differential pressure value may be obtained immediately or shortly after the initial system setup and calibration. In other cases, the sensor offset differential pressure value may be obtained at any time during operation of the HVAC system, such as occasionally from time-to-time, at regularly scheduled intervals according to an algorithm stored and executed by the controller 18, and/or in response to a user's request. In some cases, the sensor offset differential pressure value may be obtained on a monthly basis, a weekly basis, every five days, every three days, every 48 hours, every 24 hours, every 12 hours, every 6 hours, every 20 hours of fan operation, whenever the temperature changes by more than 2 degrees, etc., as desired.

In some cases, the controller 18 may be configured to operate the HVAC system in a state in which substantially no air flows through the system to generate a new sensor offset differential pressure value. The new sensor offset differential pressure value may replace a previously obtained sensor offset differential pressure value if the new value differs from the previously obtained value by a pre-determined amount. In other cases, the controller 18 may be configured to operate the HVAC system in a state in which substantially no air flows through the system to generate a new sensor offset differential pressure value if the temperature or ambient pressure changes by more than a predetermined threshold amount. The new sensor offset differential pressure value may then be stored in the memory of the controller. In certain cases, the controller may be configured to track the change in sensor offset differential pressure values over time; thereby quantifying the sensor offset drift. If the overall change in sensor offset differential pressure values is greater than a predetermined threshold for a predetermined number of measurements, then the controller may be configured to alert the user that an error has occurred.

In some cases, the sensor offset differential pressure value may be used to more accurately calculate the differential pressure measurement used to evaluate the filter status. Often, this measurement may be obtained during operation of HVAC system, as will be described in greater detail below. In some cases, for example, after the sensor offset differential pressure value has been obtained; the controller 18 may send a command to turn the fan or blower 22 of the HVAC system "on" so that air flow is driven through the air filter. The controller 18 may then send a command or otherwise instruct the air filter monitor 34 to sense a differential pressure between the upstream side and the downstream side of the air filter 30 to obtain an un-compensated differential pressure value (Block 612). A compensated differential pressure measurement may be then obtained by, for example, subtracting the sensor offset differential pressure value (sensor offset) from the differential pressure measurement value according to the equation below (Block 614):

$$\Delta P\text{compensated} = \Delta P\text{measured} - \Delta P\text{sensor offset}$$

The compensated differential pressure measurement ($\Delta P$-compensated) may then be used, at least in part, to evaluate the status of the air filter 30 (Block 616). For example, in some cases, the controller may be programmed with an algorithm that compares the compensated differential pressure value to a predetermined air filter change threshold value to determine a current status of the air filter. In other cases, the controller may be programmed with an algorithm that compares a first compensated differential pressure measurement to a second compensated differential pressure measurement to determine a current status of the air filter. The controller may then be configured to display the status of the air filter to the user (Block 618).

In some cases, the controller 18 may be adapted to control the air filter monitor 34 such that the air filter monitor may periodically or occasionally monitor and measure the differential pressure across the air filter 30 during normal or routine operation of the HVAC system 4. The controller 18 and/or processor 44 may be programmed with an algorithm that uses this measurement to determine the status of the air filter (e.g., clean or dirty), which may trigger a user alert or perform any other suitable action, as desired.

Figure 16:
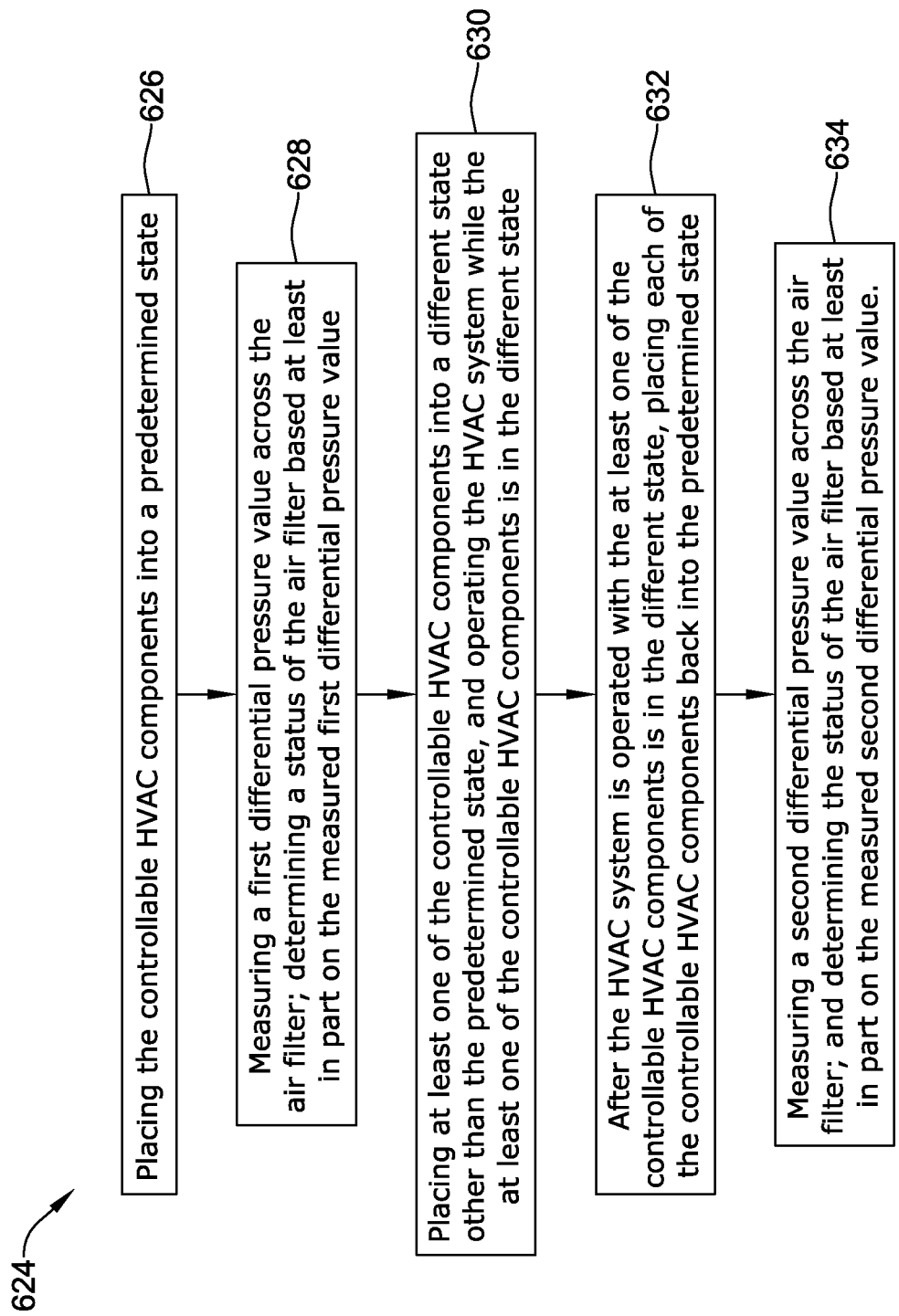
FIG. 16 is flow chart of an example method of monitoring a change in a physical parameter across an air filter during operation of the HVAC system.

FIG. 16 is a flow chart of an illustrative method 624 of monitoring a status of an air filter of an HVAC system during routine or normal operation of the HVAC system. In some cases, the status of the air filter is monitored by comparing a differential pressure measurement obtained when the HVAC system is operating in a predetermined state such as, for example, an air filter monitoring state. This method may be periodically or occasionally repeated during routine or normal operation of the HVAC system, with each new differential pressure measurement used, at least in part, to determine and/or update the status of the air filter. In some cases, the status of the air filter may be displayed by the controller and/or may be used to trigger a user alert.

In some cases, the controller 18 and/or processor 44 may be adapted to control the HVAC system equipment to place the HVAC system 4 in an air filter monitoring mode before commanding the air filter monitor 34 to measure, for example, the differential pressure across the air filter 30 (Block 626). In some cases, the controller 18 and/or processor 44 periodically command the air filter monitor 34 to measure the differential pressure (e.g. at regular scheduled intervals), from time-to-time, and/or "on demand" in response to a user request. In some cases, the controller 18 may be adapted to place the HVAC system in the air filter monitoring mode such that the air filter monitor may measure the differential pressure across the air filter 30 on a monthly basis, a weekly basis, every five days, every three days, every 48 hours, every 24 hours, every 12 hours, or every 6 hours, every 20 hours of fan operation, or at any other suitable time, as desired. Alternatively, or in addition, the controller 18 may be programmed to place the HVAC system in the air filter monitoring mode and to command or instruct the air filter monitor 34 to measure the differential pressure in response to a user input or request (i.e., on demand).

In many cases, the same mode is used each time the air filter monitor 34 is requested to measure the differential pressure across the air filter 30. In some cases, the controller 18 may place the HVAC system in a "fan only" mode prior to commanding the air filter monitor 34 to measure the differential pressure across the air filter 30. In a "fan only" mode, all HVAC system equipment except for the fan may be placed in the "off state," and for a zoned system, all dampers may be placed in the "open" position. In some cases, the heating or cooling element may be turned "off" In other cases, the heating element and/or cooling element may be turned on. In any event, the controller 18 may be adapted to turn on the fan or blower 22. The fan or blower 22 may be operated at the same fan speed each time a differential pressure measurement is made. For variable speed fans, the fan speed may be adjusted such that the fan is operated at the highest fan speed available, but this is not required. What may be desirable is that the fan speed setting should be consistent for each measurement, and all other variable (e.g. the on or off set of the heating and/or cooling element, the damper positions, etc.), should also be constant. Thus, it may provide a more consistent and accurate differential pressure measurement over time.

The differential pressure across the air filter may be measured while the HVAC system is operating in the air filter monitoring (e.g. "fan only") mode to obtain a differential pressure value or other value that is related to the amount of air flow restriction presented by the air filter (Block 628). The differential pressure value obtained while the HVAC system is operating in the air filter monitoring mode may be used, at least in part, to determine the current status of the air filter (Block 628).

The air filter monitor 34 may transmit or deliver data indicative of the differential pressure measurement to the controller 18, which may store the data in the controller memory 52. The controller 18 may be adapted to use this data to determine the status of the air filter 30. As discussed above, the differential pressure measurement used to determine the status of the air filter 30 may be compensated by subtracting a sensor offset differential value from the measured differential pressure value to produce a compensated differential pressure value which may be more accurate over time. In some cases, the controller 18 may be programmed with an algorithm that compares the differential pressure value from the air filter monitor 34 to an air filter change threshold value determined by calibrating the filter monitor using either a clean air filter or an at least partially blocked air filter (and/or blocking panel), as described herein, to determine the current status of the air filter, which may, in turn, be used to trigger a user alert.

After a differential pressure value associated with the HVAC system operating in the air filter monitoring has been obtained, the controller 18 may operate the HVAC system in a different state other than the air filter monitoring mode (Block 630). In this different operating state, at least one of the HVAC components may be operated in a different mode than it was while the HVAC system was operating in the air filter monitoring mode. In some cases, the different operating state may be a previous operating state of the HVAC system. For example, the controller 18 may operate the HVAC system in a cooling mode, a heating mode, a ventilation mode, a humidifying mode, a dehumidifying mode, and the like. After a period of time, the controller may again place the HVAC system in the air filter monitoring mode (Block 632). While the HVAC system is operating in the air filter monitoring mode, the controller may again command or request the air filter monitor 34 to obtain a second or subsequent differential pressure measurement associated with the air filter monitoring mode (Block 634). This second or subsequent value may be used, at least in part, to determine and/or update the status of the air filter after which, the controller may return the HVAC system to a different operating state other than the air filter monitoring mode. In some cases, the HVAC system may continue to operate in the different operating state according to a predetermined schedule. These steps may be occasionally repeated according to a predetermine schedule or in response to a user's request during the normal or routine operation of the HVAC system.

As previously discussed, the differential pressure measurement (or other measure related to the amount of air flow restriction presented by the air filter) may be used to evaluate the status of the air filter 30. In some cases, the controller 18 and/or processor 44 may be configured with an algorithm that compares the differential pressure measurement as measured by the air filter monitor 34 during operation of the HVAC system 4 to the air filter change threshold value. This comparison may then be used to determine the current status of the air filter.

In many cases, the controller 18 and/or processor 44 may be configured to trigger a user alert when the value of a measured physical parameter (e.g. differential pressure value) falls outside of the limits set for that particular parameter. In many cases, as discussed herein, the differential pressure across the air filter 30 may be monitored and detected by the air filter monitor 34. The differential pressure value that is measured by the air filter monitor 34 during operation of the HVAC system is related to an amount of air flow restriction presented by the air filter in the HVAC system. A dirty air filter will present more of an air flow restriction than a clean filter. The controller 18 may be programmed to receive the measured differential pressure value from the air filter monitor and compare the measured differential pressure value to the air filter change threshold value stored in the controller memory. As described above, the air filter change threshold value against which the measured differential pressure is evaluated may be determined using, for example, a clean air filter, an at least partially blocked air filter (and/or blocking panel) according to the methods as described herein, or any other suitable method as desired. If the differential pressure measurement as measured by the air filter monitor 34 during operation of the HVAC system 4 is greater than air filter change threshold value then, in some cases, the controller 18 and/or processor 44 may display the status of the air filter 30 on the user interface 48 (FIG. 2), provide an alarm, or perform any other suitable action, as desired.

In some cases, the controller 18 may be configured to display any one of a number of qualitative terms indicating the status of the air filter 30. Exemplary qualitative terms that may be used to indicate the status of the air filter include, but are not limited to, "CLEAN", "GOOD", "DIRTY", "CHANGE FILTER SOON", "REPLACE FILTER SOON" "CHANGE FILTER NEEDED", "REPLACE FILTER NOW" and "FILTER CHANGE REQUIRED", among others. In other cases, the controller 18 may be configured to display a graphical representation indicating the current status of the air filter 30. For example, a maximum number of bars displayed on a graph may represent that the air filter 30 is clean, while only a few bars displayed on a graph may indicate that a filter change is needed soon. A single bar or no bar at all displayed on a graph may represent that a filter change is needed. Additionally, color-coded labels or filter status indicators may be used to indicate if a filter change is needed. Additionally, the controller 18 may display on user interface 48 terms and/or measures (e.g., quantitative measures) related to the one or more air filters of the HVAC system 4. For example, controller 18 may display the sizes of air filters 30, the number of air filters 30 within HVAC system 4, the MERV rating of the filters 30, the model number and/or brand of the filters, the depth of the one or more filters 30 and other metrics of the one or more filters 30. In some cases, the controller 18 may be configured to use a combination of the various indicators, as described herein, to indicate the status of the air filter 30. In still other cases, the controller 18 may be configured to sound an audible alert (e.g., intermittent beeps, a continuous beep, etc.).

In some cases, the controller 18 may be configured to trigger a user message alert depending upon the status of the air filter 30. In some cases, the user alert may be a part of a three-level user alert system configured to alert the user to the status of the air filter and, if necessary, alert the user to take action (i.e., change the filter, re-calibrate, check connections, calibration expired, etc.). The illustrative three-level user alert system may, in some cases, combine qualitative terms with a color code and/or air filter characteristics and metrics to alert the user to the filter status. In some cases, the three-level alert system may employ a stoplight metaphor. For example, when the differential pressure value across the air filter remains below the air filter change threshold value, the status displayed by the controller may be labeled as "Good" and a green color may be displayed. When the differential pressure value across the air filter remains repeatedly at or above the air filter change threshold value, sometimes for at least two or more consecutive measurements or for a predetermined amount of time, the controller 18 may display a label "Change Filter Soon", along with the color yellow. In some cases, when the filter status changes from "Good" to "Change Filter Soon", the controller 18 may initiate a timer that expires a predetermined amount of time later. The air filter monitor 34 may continue to monitor the differential pressure during this period, but this is not necessary. The controller 18 may include a "snooze" function, which may permit the user to temporarily remove or delay the "Change Filter Soon" user alert for a short period of time. If the user does not replace the filter during this snooze period, the controller may trigger a new user alert.

In some cases, once in the "Change Filter Soon" state, after a predetermined period of time set by the controller 18, the controller 18 may change the filter status from "Change Filter Soon" to "Change Filter Now", and may change the color from yellow to red. In some cases, the "snooze" function may no longer be available to the user.

FIGS. 17A-17F provide illustrative screens 652, 654, 656, 658, and 670 that may be displayed by a controller (e.g., controller 18) configured with a three-level user alert system, as described above. FIGS. 17A, 17B, 17D, and 17F provide illustrative home screens 652, 654, and 658, each including a navigational bar 672, a first region 676, a second region 680, and a third region 684. In some cases, the controller 18 may be configured to display the air filter status 688 in the first region 676 of the home screens 652, 654 and/or 658 as depicted in FIGS. 17A, 17B, 17D, and 17F. The air filter status 688 may be displayed in only a portion of the first region 676 or may be displayed such that it covers the entire first region 676 of the home screen 652, 652, and/or 658. Note, the air filter status 688, when present, may replace the information that was previously displayed in the first region 676 of the home screen or may be positioned adjacent the information that was previously displayed in the first region 676, as desired.

Figure 17A:
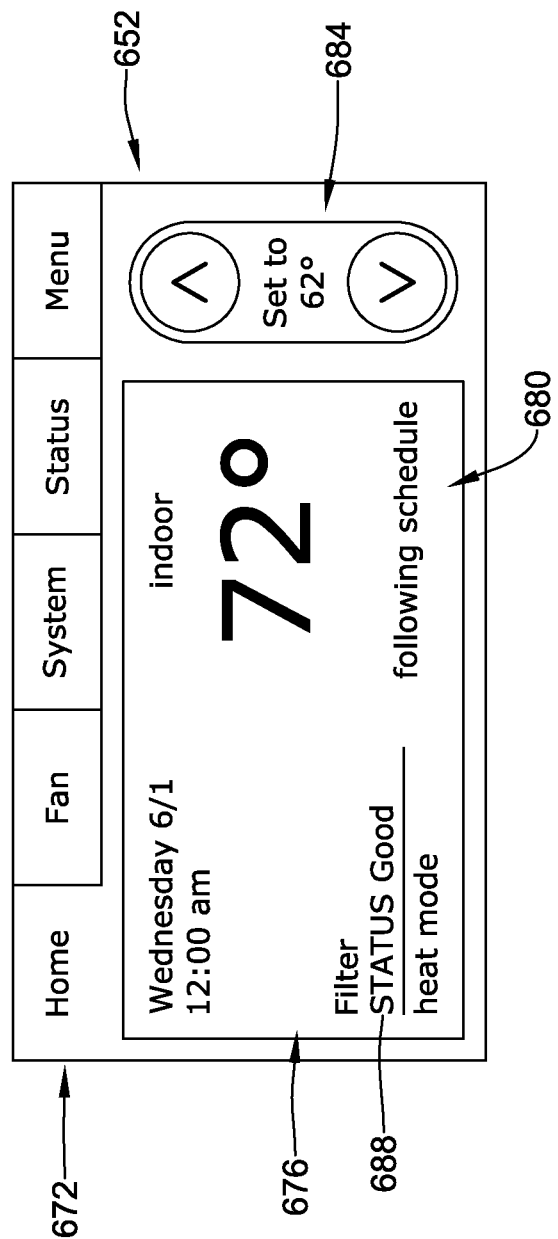
FIGS. 17A-17F provide illustrative examples of different screens that may be displayed by an HVAC controller that is configured to display a user alert according to a user alert system.

FIG. 17A shows an illustrative home screen 652 in which the filter status may be indicated as "Good." In some cases, the qualitative term displayed on the screen may be color coded (e.g. green). In other cases, the first region 676, either in part or in whole, may be color coded (e.g. green, yellow, red) to indicate the status of the filter. As indicated above, when the qualitative term indicates that the filter status is "Good", the associated color code may be green.

Figure 17B:
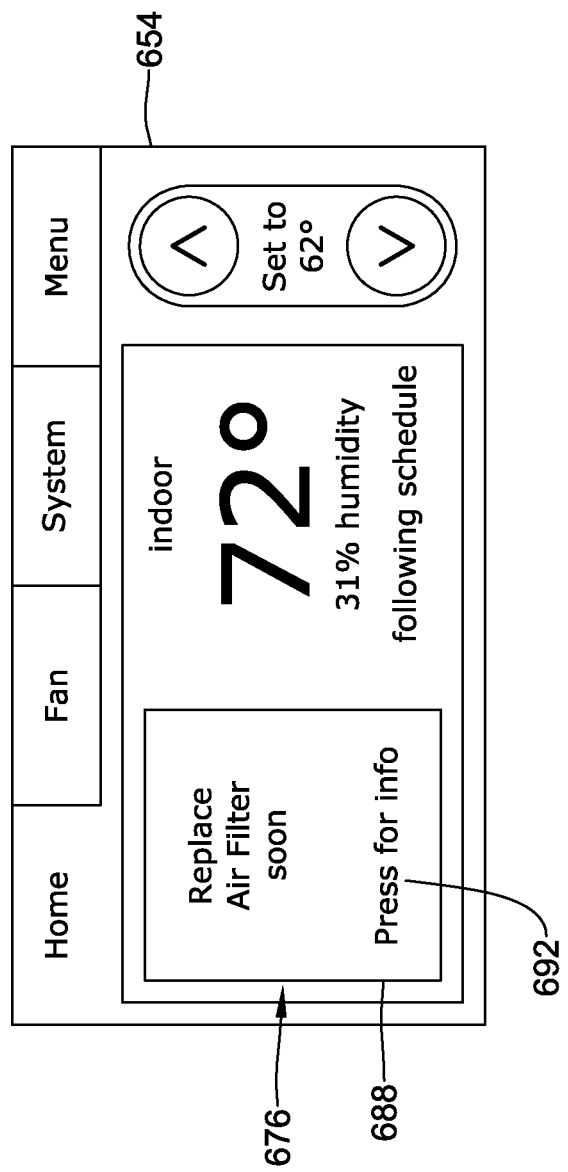

FIG. 17B provides an illustrative home screen 654 that may be displayed when the controller determines that a filter change may be needed soon. A filter status indicator 688 indicative of the air filter status may appear in the first region 676 of the home screen 654. As described above, when provided, one of many exemplary terms may be used to indicate the status of the air filter. In some cases, the air filter status indicator may display the term "Replace Air Filter Soon." Additionally, the air filter status indicator 688 may be color coded. Here, the color associated with the filter status indicator 688 may be yellow. As shown in FIG. 17B, the air filter status may cover the entire first region 676 and may block other useful information such as, for example, the current date and time from the user's view. This may annoy the user, prompting the user to take action more quickly than they otherwise would if they could more easily ignore the user alert. In addition to the qualitative terms and color coding, filter status indicator 688 may provide one or more characteristics or metrics of the one or more air filters 30 to facilitate a user replacing the dirty filter(s) in the HVAC system, as seen in FIG. 17F.

Figure 17C:
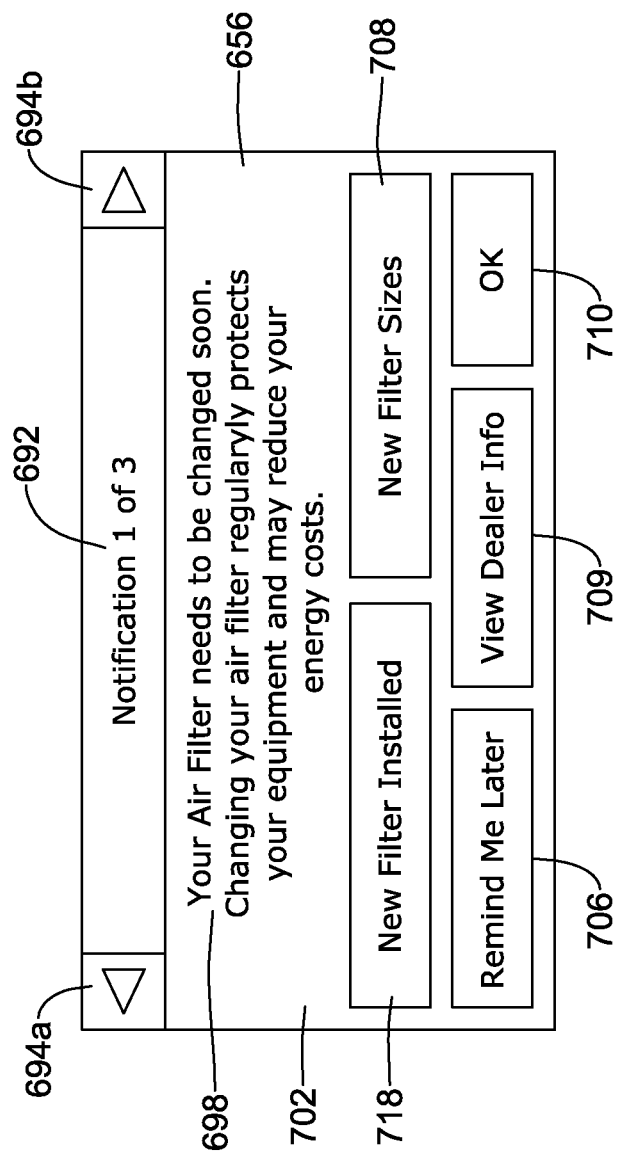

In some cases, the filter status indicator 688 may include a button, label, or tab 690 labeled "Press for more info." In response to the user selecting the button 690 labeled "Press for more info", the controller may display a first user notification screen 656 as depicted in FIG. 17C. The first user notification screen 656 may include a user notification bar 692 which may include navigational arrows 694a and 694b. The first user notification screen 656 may be configured to display a user notification or message 698 in a region 702 below the user notification bar 692. Additional user notifications or messages (not shown) may be displayed by using the navigational arrows 694a and 694b provided with the user notification bar 692. The user notification bar 692 may also be configured to identify which message is displayed and how many user notifications messages are available. For example, the user notification bar 692 of FIG. 17C may indicate that the user notification message that is displayed is the first of three available user notification messages.

The first user notification screen 656 additionally may include at least one additional button for accessing more additional information or another function of the controller. In some cases, the first user notification screen 656 includes at least a delay button 706 which, when selected, initiates a snooze function that may temporarily remove the user alert displayed in the first region 676 of the home screen 654 (FIG. 17B) for a predetermined period of time. The delay button 706 may be labeled "Snooze", "Remind me later", "Delay", "Dismiss", and the like. Additionally, the first user notification screen 656 may also include a button 708 labeled "View Filter Sizes" or "View Filter Info" that, when selected, may display the filter size, MERV rating(s), filter model numbers, the number of filters in HVAC system 4, and/or other information regarding the air filter. The first user notification screen 656 may also include at least one acknowledge button 710 that, when selected, may enable the user to acknowledge the user message 698 displayed on the screen 656. Button 710 may be labeled "OK", "Acknowledge", "Done", "Enter", or any other suitable label as desired. Additionally, selecting button 710 may return the user to the previous home screen such as, for example home screen 654 (FIG. 17B).

Figure 17D:
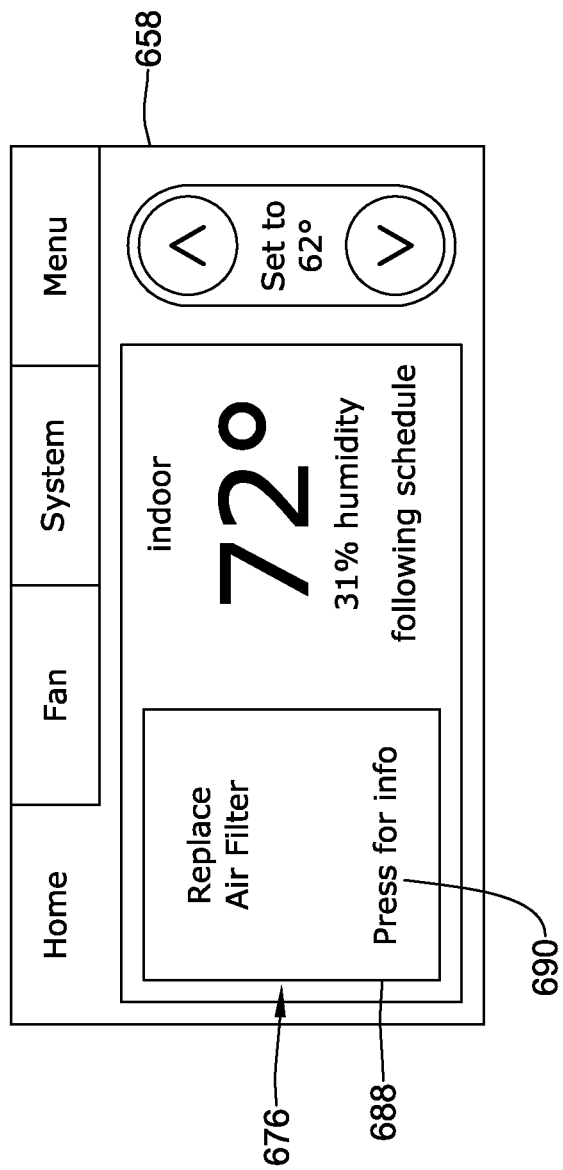
Figure 17E:
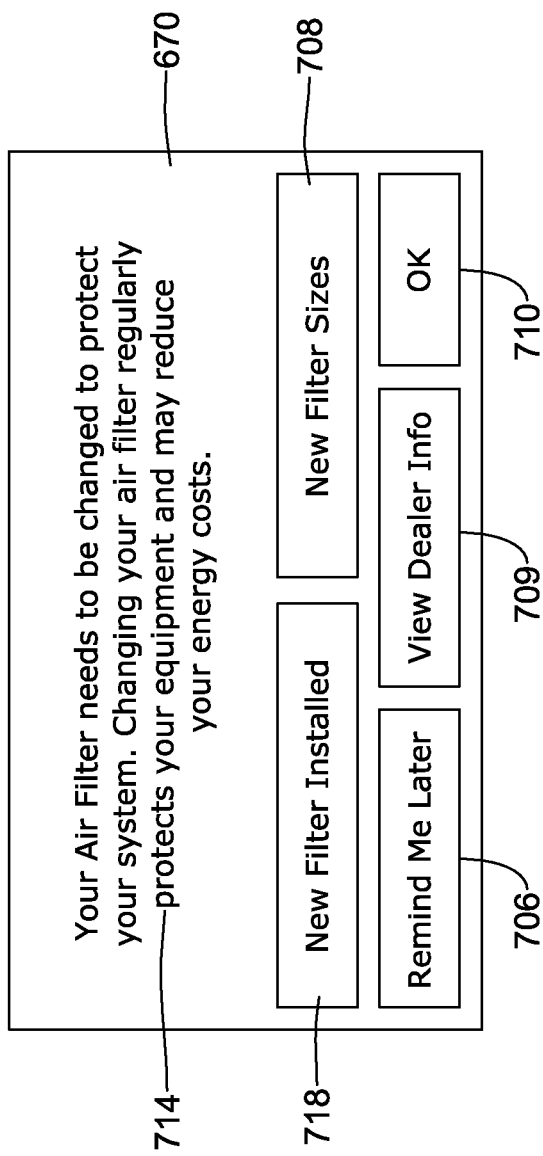
Figure 17F:
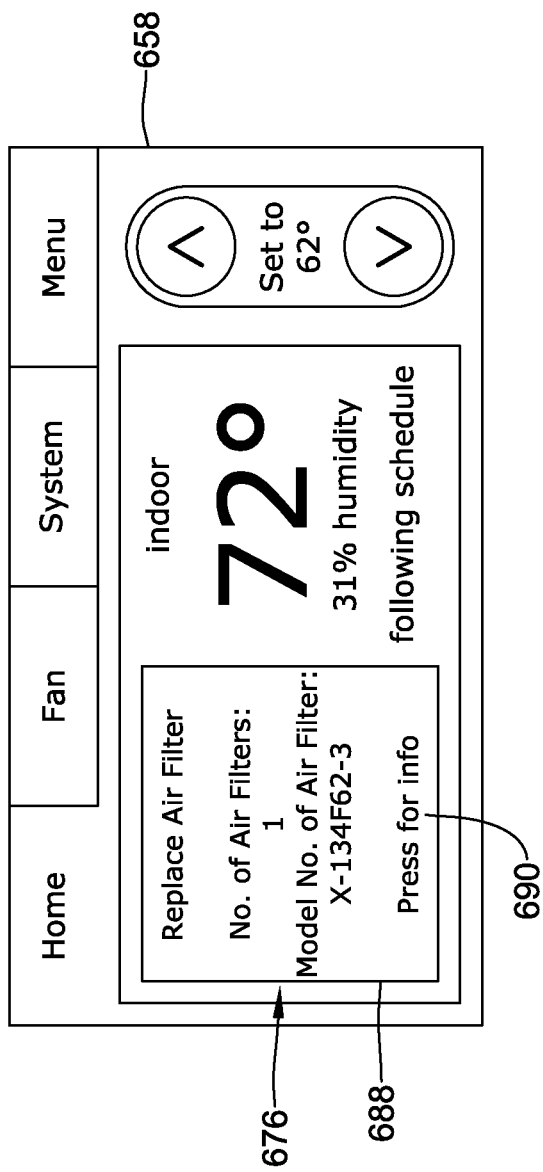

FIGS. 17D and 17F provide an example of a home screen 658 that is displayed when the controller determines that a filter change is necessary now and an air filter change notification has been triggered. A filter status indicator 688 indicative of the air filter 30 status may appear in the first region 676 of the home screen 658. In this case, the air filter status indicator 688 may display the term "Replace Air Filter Now", "Filter Change Required", or any other suitable label. Additionally, the air filter status indicator 688 may be color coded. Here, the color associated with the filter status indicator 688 may be red. As shown in FIG. 17D, the air filter indicator status 688 may cover the entire first region 676 and may block other useful information such as, for example, the current date and time from the user's view. In addition to the qualitative terms and color coding, filter status indicator 688 may provide one or more characteristics or metrics of the one or more air filters 30 to facilitate replacing the dirty filter(s) in the HVAC system. Alternatively, or in addition, one more of the characteristics or metrics of the one or more air filters 30 may be displayed after a user selects a more filter information button, or the like, via user interface 48 by pressing a PRESS FOR INFO button seen in at least FIGS. 17B, 17D, 17F.

In some cases, the filter status indicator 688 may include a button, label, or tab 690 labeled "Press for more info." In response to the user selecting the button 690 labeled "Press for more info", the controller may display a second user notification screen 670 as illustrated by FIG. 17E. The second user notification screen 670 may be configured to display a user notification or message 714 that may indicate to the user that the air filter needs to be changed. Additional information that may be useful to the user may be included in the user notification message 714. The second user notification screen 670 may also include at least one additional button for accessing more additional information or another function of the controller. In some cases, the second user notification screen 670 includes at least a delay button 706 which, when selected, initiates a snooze function and may temporarily remove the user alert displayed in the first region 676 of the home screen 654 (FIG. 17B). The delay button 706 may be labeled "Snooze", "Remind me later", "Delay", "Dismiss", and the like. In some cases, when the controller determines that a filter change is necessary now, the delay button 706 may be no longer available to the user for selection (e.g. it may not be provided, grayed out, or otherwise not available for selection).

Like above, the second user notification screen 670 may also include a button 708 labeled "View Filter Sizes" or "View Filter Info" that, when selected, may display the quantitative information including, but not limited to, filter size, MERV rating(s) of the filter that may be used with the HVAC system, filter model numbers, and/or the number of filters in HVAC system 4, and a button 709 that, when selected, may display dealer information. The second user notification screen 670 may also include at least one acknowledge button 710 that, when selected, may enable the user to acknowledge the user message 714 displayed on the screen 670. Button 710 may be labeled "OK", "Acknowledge", "Done", or "Enter."

Additionally, selecting button 710 may also return the user to the previous home screen such as, for example, home screen 658 (FIG. 17D).

The user may replace the filter in response to a user alert displayed by the controller. Upon replacement of the filter, the user may select a button 718 labeled "New Filter Installed" or "Test New Filter" found on the user notification screens 656 and 670 as illustrated in FIGS. 17C and 17E. The user may access either of the user notification screens 656 and 670 by selecting the button 690 labeled "Press for More Info" found on the filter status indicator 688 or by selecting the appropriate button from the menu navigation bar 672 that is displayed on the home screen 652, as illustrated in FIG. 17A.

In some cases, upon selection of button 718 labeled "New Filter Installed," the controller 18 may be configured to obtain a differential pressure measurement to verify that in fact a clean filter has been installed in the system. Additionally, the controller 18 may be configured to display a user alert if the differential pressure measurement obtained after a new filter has been installed is not below the air filter change threshold value. The differential pressure measurement obtained after a new filter has been installed may not be below the air filter change threshold value if a more restrictive filter (e.g., higher MERV rating) was installed, or if the user did not actually install a new and/or clean filter.

In some cases, the HVAC system 4 may be operating according to a predetermined schedule and/or mode in which the air filter monitor 34 may periodically perform a new differential pressure measurement. For example, prior to the filter change, the HVAC system may be operating in a heating mode, a cooling mode, a ventilation mode, a humidifying mode, a dehumidifying mode, and the like. In other cases, the HVAC system may be off. However, upon indication by the user that a new air filter has been installed, the controller 18 may be configured to obtain a new differential pressure measurement shortly (within a few minutes) after installation of the new air filter 30. This may provide relatively immediate feedback to the user regarding the installation of the new filter.

Figure 18:
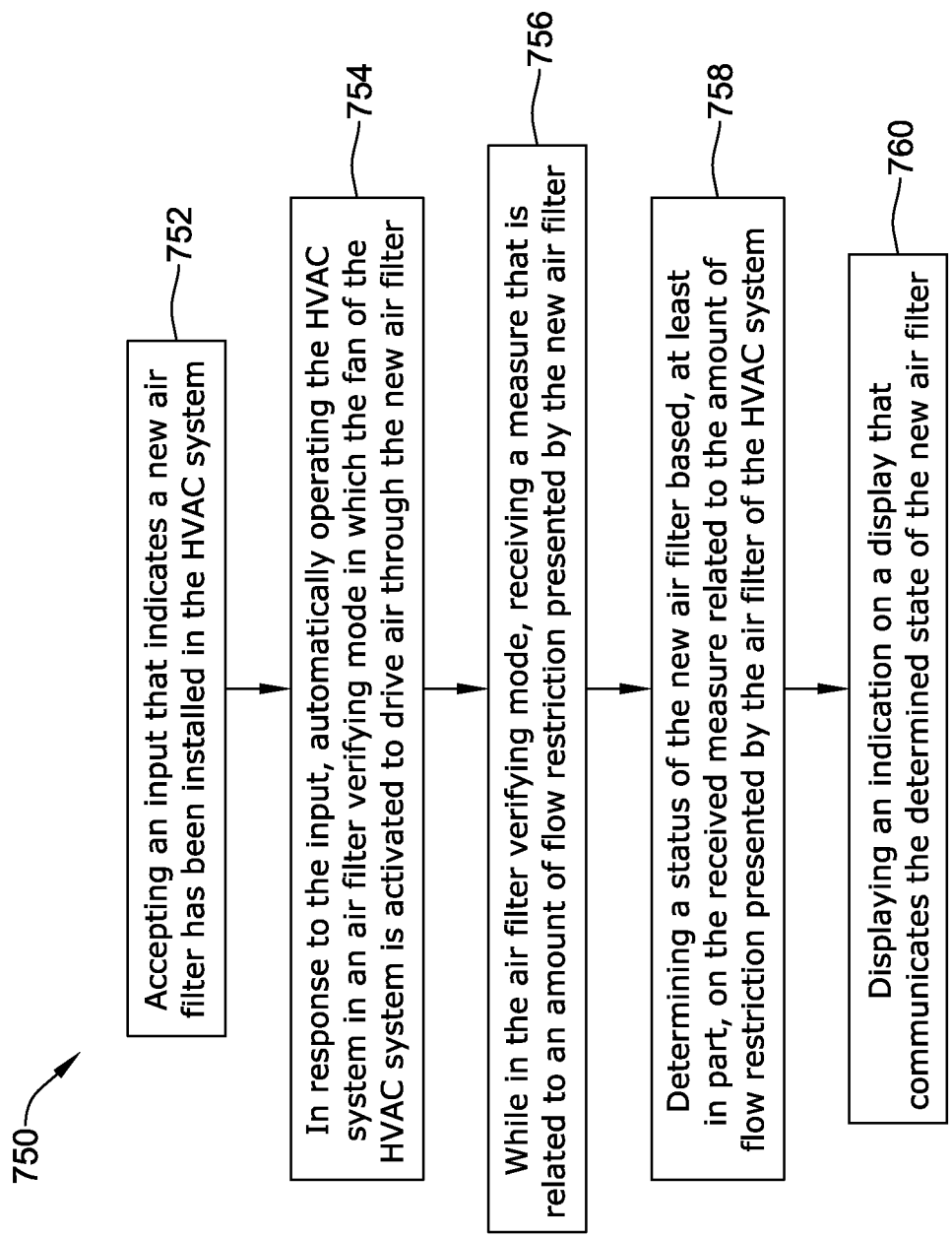
FIG. 18 is a flow chart of an example method of evaluating a new air filter.

FIG. 18 is a flow chart of a method 750 of evaluating a new air filter. In some cases, a user may install a new filter in the HVAC system. In some cases, the controller 18 may accept an input from the user indicating that a new air filter has been installed (Block 752). In response to the input, the controller 18 may be configured to automatically operate the HVAC system 4 in an air filter verifying state or mode before commanding the air filter monitor 34 to measure the differential pressure across the air filter 30 (Block 754). In many cases, prior to being operated in the air filter verifying state, at least one of the HVAC components was operated in a different state. In some cases, the controller 18 may operate the HVAC system in a "fan only" mode in the air filter verifying state. In such a "fan only" mode, all HVAC system equipment other than the fan may be placed in the "off state," and for a zoned system, all dampers may be placed in the "open" position.

Once the HVAC system 4 is in the air filter verifying mode, the controller 18 may command the air filter monitor 34 to obtain a differential pressure measurement across the air filter. The differential pressure measurement that is obtained may be related to an amount of air flow restriction presented by the new air filter. The air filter monitor 34 may transmit or deliver data indicative of the differential pressure measurement across the new air filter 30 to the controller 18. The controller 18 may receive the differential pressure measurement data from the air filter monitor and may store the data within the controller memory 52 (Block 756). The controller 18 and/or processor 44 may be adapted to use this data, at least in part, to determine whether or not a proper new filter has been installed (Block 758). In some cases, the differential pressure measurement used to determine whether or not a proper new filter has been installed may be adjusted by subtracting a sensor offset value from the measured differential pressure to produce a compensated differential pressure value obtained with the new filter installed. In some cases, the controller 18 and/or processor 44 may be programmed with an algorithm that compares the differential pressure measurement obtained using the new filter to a predetermined threshold value to determine whether or not a proper new air filter has been installed. In some instances, the predetermined threshold value may be determined using a clean air filter or an at least partially blocked air filter (e.g. blocking panel) according to one of the methods, as described herein.

If the differential pressure measurement obtained using a new filter is less than the predetermined threshold value, the controller 18 may automatically return the HVAC system to its previous operating mode. In some cases, the controller 18 may display a message to the user confirming the installation of the new filter was successful, and may then display a home screen (Block 760). If the differential pressure measurement obtained using the new filter is above the predetermined threshold value, the controller 18 may display an error message or other user alert. The user may then repeat the steps as outlined in Blocks 752, 754, 756, and 758 using the same or a different filter. The user may also access information about the appropriate filter(s) for the HVAC system through the user interface, as described above. This information may be useful in determining if the correct type of filter for the HVAC system has been installed. However, if the user simply re-installed the dirty filter, the controller may again display an error message or other user alert.

The HVAC system 4 may still continue to operate with a dirty filter; however, this may not provide adequate protection to the HVAC system components and may shorten their life expectancy. Regular replacement of the air filter may be recommended.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts, without exceeding the scope of the disclosure. The disclosure's scope is, of course, defined in the language in which the appended claims are expressed.

What is claimed is:

1. An HVAC controller for controlling an HVAC system, the HVAC system having one or more air filters, the HVAC controller comprising:
   a controller;
   a memory coupled to the controller;
   a user interface having a display, the user interface coupled to the controller;
   wherein the controller is configured to:
      display one or more screens on the display, wherein one or more of the screens solicit a user for one or more physical characteristics of the one or more air filters of an HVAC system;
      accept a user response;
   wherein the controller is further configured to adjust a length of time of an air filter change notification timer based on the user response to the solicitation for the one or more physical characteristics of the one or more air filters.

2. The HVAC controller of claim 1, wherein the one or more physical characteristics of the one or more air filters include a depth of one or more of the air filters, and wherein one or more of the screens solicit a user for information related to the depth of one or more of the air filters.

3. The HVAC controller of claim 1, wherein the one or more physical characteristics of the one or more air filters include a height and a width of one or more of the air filters, and wherein one or more of the screens solicit a user for information related to the height and the width of one or more of the air filters.

4. The HVAC controller of claim 1, wherein the one or more physical characteristics of the one or more air filters include a Minimum Efficiency Rating Value (MERV) of one or more of the air filters, and wherein one or more of the screens solicit a user for information related to the MERV rating of one or more of the air filters.

5. The HVAC controller of claim 1, further configured to solicit a user for a model number of one or more of the air filters, and wherein one or more of the screens solicit a user for information related to the model number of one or more of the air filters.

6. The HVAC controller of claim 1, wherein:
a first screen of a sequence of two or more screens solicits a user for a total number of air filters in the HVAC system; and
a second screen of the sequence of two or more screens solicits a user for information related to a height and a width of at least one of the one or more air filters.

7. The HVAC controller of claim 6, wherein the first screen of the sequence of two or more screens solicits a user for information related to a depth of at least one the one or more of the air filters.

8. The HVAC controller of claim 1, wherein when the air filter change notification timer expires, the controller is configured to:
display on the display a notification that indicates that air filter replacement is desired; and
display on the display one or more quantitative features for a suitable replacement air filter.

9. The HVAC controller of claim 8, wherein the one or more quantitative features for a suitable replacement air filter are displayed only after a user requests more filter information via the user interface.

10. The HVAC controller of claim 9, wherein the one or more quantitative features for a suitable replacement air filter include one or more of a depth, a width, a height, and a MERV rating.

11. An HVAC controller for controlling an HVAC system, the HVAC system having one or more replaceable components, the HVAC controller comprising:
a controller;
a memory coupled to the controller;
a user interface having a display, the user interface coupled to the controller;
wherein the controller is configured to:
accept from a user via the user interface of the HVAC controller one or more physical characteristics of the one or more replaceable components of the HVAC system;
identify when one or more replaceable components needs to be changed, and in response, display an indication on the user interface that indicates it is time to replace one or more of the replaceable components of the HVAC system and to provide one or more physical dimensions of one or more suitable replacement components.

12. The HVAC controller of claim 11, wherein:
the one or more replaceable component of the HVAC system includes one or more air filters of the HVAC system, and the controller is configured to identify when one or more of the air filters needs to be changed; and
the controller is configured to adjust a time at which the controller identifies when one or more of the air filters needs to be changed based on one or more of the physical characteristics accepted via the user interface.

13. The HVAC controller of claim 11, wherein:
the one or more replaceable component of the HVAC system includes one or more air filters of the HVAC system, and the controller is configured to compare a received measure related to a flow through the one or more air filters of the HVAC system to an air filter threshold value; and
the controller is configured to identify when one or more of the air filters needs to be changed when the received measure related to a flow through the one or more air filters of the HVAC system surpasses the air filter threshold value.

14. A method of configuring an air filter change notification feature of an HVAC controller, the filter change notification feature including an air filter change notification that is triggered when one or more air filters of an HVAC system is to be changed, the method comprising:
activating a guided programming routine;
once activated, the guided programming routine provides two or more queries to a user via a sequence of screens displayed via a user interface, where one or more of the queries solicit a user for information related to a characteristic of the one or more air filters of the HVAC system;
at least one of the queries includes soliciting the user for a depth of the one or more air filters via the user interface;
at least one of the queries includes soliciting a user for a width of the one or more air filters via the user interface;
at least one of the queries includes soliciting a user for a height of an air filter of the one or more air filters via the user interface;
using the user input indicative of one or more of the depth, width, and height of the air filter to adjust a length of time of an air filter change notification timer at which the air filter change notification is to be triggered;
updating in the HVAC controller the length of time at which the air filter change notification is to be triggered.

15. The method of claim 14, wherein in response to the air filter change notification being triggered, the controller displaying a user notification indicating it is time to replace an air filter of the HVAC system.

16. The method of claim 15, wherein the user notification provides quantitative information relating to the air filter that needs to be replaced.

17. The method of claim 16, wherein:
the user notification queries the user for selection of more air filter information, and if selected by the user, the controller displaying the quantitative features relating to the air filter that needs to be replaced.

18. The method of claim 14, wherein:
the time at which the air filter change notification is to be triggered is after the expiration of an air filter change notification timer, and a length of time before the air filter notification expires is adjusted based on the received the user input.

* * * * *